US010042901B2

(12) United States Patent
Stolte et al.

(10) Patent No.: US 10,042,901 B2
(45) Date of Patent: *Aug. 7, 2018

(54) SYSTEMS AND METHODS OF GENERATING A PLURALITY OF DATA VISUALIZATIONS IN A DATA VISUALIZATION REGION

(71) Applicant: Board of Trustees of the Leland Stanford Jr. University, Palo Alto, CA (US)

(72) Inventors: Chris Stolte, Seattle, WA (US); Diane L. Tang, Palo Alto, CA (US); Patrick Hanrahan, Portola Valley, CA (US)

(73) Assignee: The Board of Trustees of the Leland Stanford Jr. University, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/449,844

(22) Filed: Mar. 3, 2017

(65) Prior Publication Data
US 2017/0177678 A1   Jun. 22, 2017

Related U.S. Application Data

(63) Continuation of application No. 14/937,836, filed on Nov. 10, 2015, now Pat. No. 9,633,091, which is a
(Continued)

(51) Int. Cl.
*G06F 17/00* (2006.01)
*G06F 17/30* (2006.01)

(52) U.S. Cl.
CPC .... *G06F 17/30554* (2013.01); *G06F 17/3056* (2013.01); *G06F 17/30592* (2013.01); *G06F 17/30294* (2013.01); *G06F 17/30572* (2013.01)

(58) Field of Classification Search
CPC .......... G06F 17/30592; G06F 2216/03; G06F 17/30554; G06F 17/3056; G06F 17/30294;
(Continued)

(56) References Cited

U.S. PATENT DOCUMENTS 4,800,810 A   1/1989 Masumoto
5,036,314 A   7/1991 Barillari et al.
(Continued)

FOREIGN PATENT DOCUMENTS

HU            215657 B      1/1994
WO   WO 2006/060773 A2    6/2006

OTHER PUBLICATIONS

Becker, Trellis Graphics Displays: A Multi-dimensional Data Visualization Tool for Data Mining, Aug. 1997, 13 pgs.
(Continued)

*Primary Examiner* — Cheryl Lewis
(74) *Attorney, Agent, or Firm* — Morgan, Lewis & Bockius LLP

(57) ABSTRACT

An exemplary method of generating a plurality of data visualizations comprises displaying a graphical user interface that includes a schema information region and a data visualization region. The method further includes receiving user actions to associate first, second, and third fields included in the schema information region with a plurality of shelves of the data visualization region. The method further includes generating a plurality of data visualizations in the data visualization region in accordance with the received user actions, each data visualization includes a plurality of data marks corresponding to a respective retrieved tuple of data having the first, second, and third fields. Moreover, each of the data marks has an x-position and y-position defined according to data for the first and second fields, respectively.
(Continued)

In addition, each of the data visualizations corresponds to a respective unique value of the third field, and is displayed in a respective pane.

20 Claims, 26 Drawing Sheets

Related U.S. Application Data continuation of application No. 14/637,333, filed on Mar. 3, 2015, now Pat. No. 9,183,235, which is a continuation of application No. 14/231,477, filed on Mar. 31, 2014, now Pat. No. 8,972,457, which is a continuation of application No. 13/425,300, filed on Mar. 20, 2012, now Pat. No. 8,713,072, which is a continuation of application No. 13/019,227, filed on Feb. 1, 2011, now Pat. No. 8,140,586, which is a continuation of application No. 12/777,172, filed on May 10, 2010, now Pat. No. 7,882,144, which is a continuation of application No. 11/488,407, filed on Jul. 17, 2006, now Pat. No. 7,716,173, which is a continuation of application No. 10/453,834, filed on Jun. 2, 2003, now Pat. No. 7,089,266.

(58) Field of Classification Search
CPC ....... G06F 17/30572; Y10S 707/99943; Y10S 707/99945; Y10S 707/99942; Y10S 707/99944; Y10S 707/956; Y10S 707/959; Y10S 707/754
See application file for complete search history.

(56) References Cited

U.S. PATENT DOCUMENTS

| | | |
|---|---|---|
| 5,060,980 A | 10/1991 | Johnson et al. |
| 5,144,452 A | 9/1992 | Abuyama |
| 5,169,713 A | 12/1992 | Kumurdjian |
| 5,265,244 A | 11/1993 | Ghosh et al. |
| 5,265,246 A | 11/1993 | Li et al. |
| 5,377,348 A | 12/1994 | Lau et al. |
| 5,383,029 A | 1/1995 | Kojima |
| 5,560,007 A | 9/1996 | Thai |
| 5,577,241 A | 11/1996 | Spencer |
| 5,581,677 A | 12/1996 | Myers et al. |
| 5,664,172 A | 9/1997 | Antoshenkov |
| 5,664,182 A | 9/1997 | Nierenberg et al. |
| 5,668,987 A | 9/1997 | Schneider |
| 5,794,246 A | 8/1998 | Sankaran et al. |
| 5,864,856 A | 1/1999 | Young |
| 5,893,088 A | 4/1999 | Hendricks et al. |
| 5,933,830 A | 8/1999 | Williams |
| 6,031,632 A | 2/2000 | Yoshihara et al. |
| 6,032,158 A | 2/2000 | Mukhopadhyay et al. |
| 6,044,374 A | 3/2000 | Nesamoney et al. |
| 6,100,901 A | 8/2000 | Mohda et al. |
| 6,115,744 A | 9/2000 | Robins et al. |
| 6,154,766 A | 11/2000 | Yost et al. |
| 6,173,310 B1 | 1/2001 | Yost et al. |
| 6,188,403 B1 | 2/2001 | Sacerdoti et al. |
| 6,208,990 B1 | 3/2001 | Suresh et al. |
| 6,222,540 B1 | 4/2001 | Sacerdoti et al. |
| 6,247,008 B1 | 6/2001 | Cambot et al. |
| 6,253,257 B1 | 6/2001 | Dundon |
| 6,260,050 B1 | 7/2001 | Yost et al. |
| 6,269,393 B1 | 7/2001 | Yost et al. |
| 6,300,957 B1 | 10/2001 | Rao et al. |
| 6,301,579 B1 | 10/2001 | Becker |
| 6,317,750 B1 | 11/2001 | Tortolani et al. |
| 6,327,628 B1 | 12/2001 | Anuff et al. |
| 6,339,775 B1 | 1/2002 | Zamanian et al. |
| 6,377,259 B1 | 4/2002 | Tenev et al. |
| 6,397,195 B1 | 5/2002 | Pinard et al. |
| 6,400,366 B1 | 6/2002 | Davies et al. |
| 6,405,195 B1 | 6/2002 | Ahlberg |
| 6,405,208 B1 | 6/2002 | Raghavan et al. |
| 6,424,933 B1 | 7/2002 | Agrawala et al. |
| 6,490,593 B2 | 12/2002 | Proctor |
| 6,492,989 B1 | 12/2002 | Wilkinson |
| 6,522,342 B1 | 2/2003 | Gagnon et al. |
| 6,611,825 B1 | 8/2003 | Billheimer et al. |
| 6,643,646 B2 | 11/2003 | Su et al. |
| 6,707,454 B1 | 3/2004 | Barg et al. |
| 6,714,897 B2 | 3/2004 | Whitney et al. |
| 6,725,230 B2 | 4/2004 | Ruth et al. |
| 6,750,864 B1 | 6/2004 | Anwar |
| 6,768,986 B2 | 7/2004 | Cras et al. |
| 6,906,717 B2 | 6/2005 | Couckuyt et al. |
| 7,009,609 B2 | 3/2006 | Miyadai |
| 7,023,453 B2 | 4/2006 | Wilkinson |
| 7,089,266 B2 | 8/2006 | Stolte et al. |
| 7,117,058 B2 | 10/2006 | Lin et al. |
| 7,176,924 B2 | 2/2007 | Wilkinson |
| 7,290,007 B2 | 10/2007 | Farber et al. |
| 7,315,305 B2 | 1/2008 | Crotty et al. |
| 7,379,601 B2 | 5/2008 | Yang et al. |
| 7,426,520 B2 | 9/2008 | Gorelik et al. |
| 7,716,173 B2 | 5/2010 | Stolte et al. |
| 7,882,144 B1 | 2/2011 | Stolte et al. |
| 8,082,243 B2 | 12/2011 | Gorelik et al. |
| 8,140,586 B2 | 3/2012 | Stolte et al. |
| 8,442,999 B2 | 5/2013 | Gorelik et al. |
| 8,473,521 B2 | 6/2013 | Fot et al. |
| 8,620,937 B2 | 12/2013 | Jonas |
| 8,713,072 B2 | 4/2014 | Stotle et al. |
| 8,751,505 B2 | 6/2014 | Carmel et al. |
| 8,874,613 B2 | 10/2014 | Gorelik et al. |
| 8,972,457 B2 | 3/2015 | Stolte et al. |
| 9,183,235 B2 | 11/2015 | Stolte et al. |
| 9,336,253 B2 | 5/2016 | Gorelik et al. |
| 9,633,091 B2 * | 4/2017 | Stolte ................ G06F 17/30592 |
| 2002/0118192 A1 | 8/2002 | Couckuyt et al. |
| 2002/0123865 A1 | 9/2002 | Whitney et al. |
| 2002/0135610 A1 | 9/2002 | Ootani et al. |
| 2002/0154118 A1 | 10/2002 | McCarthy et al. |
| 2003/0200034 A1 | 10/2003 | Fellenberg et al. |
| 2004/0183800 A1 | 9/2004 | Peterson |
| 2004/0227759 A1 | 11/2004 | McKnight et al. |
| 2004/0243593 A1 | 12/2004 | Stolte et al. |
| 2005/0035966 A1 | 2/2005 | Pasquarette et al. |
| 2005/0035967 A1 | 2/2005 | Joffrain et al. |
| 2005/0060300 A1 | 3/2005 | Stolte et al. |
| 2005/0099423 A1 | 5/2005 | Brauss |
| 2006/0129913 A1 | 6/2006 | Vigesaa et al. |
| 2006/0136825 A1 | 6/2006 | Cory et al. |
| 2006/0206512 A1 | 9/2006 | Hanrahan et al. |
| 2007/0061344 A1 | 3/2007 | Dickerman et al. |
| 2007/0061611 A1 | 3/2007 | MacKinlay et al. |
| 2008/0016026 A1 | 1/2008 | Farber et al. |

OTHER PUBLICATIONS

Becker, Visualizing Decision Table Classifiers, 1998, 4 pgs.
Beers, Office Action, U.S. Appl. No. 11/787,761, dated Jun. 12, 2008, 12 pgs.
Beers, Office Action, U.S. Appl. No. 11/787,761, dated Dec. 17, 2008, 13 pgs.
Bosch, Performance Analysis and Visualization of Parallel Systems Using SimOS and Rivet: A Case Study , Jan. 2000, 13 pgs.
Bosch, Rivet: A Flexible Environment for Computer Systems Visualization, Feb. 2000, 9 pgs.
Brunk, MineSet: An Integrated System for Data Mining, 1997, 4 pgs.
Derthick, An Interactive Visual Query Environment for Exploring Data, 1997, 11 pgs.
Freeze, Unlocking OLAP with Microsoft SQL Server and Excel 2000, 2000, 220 pgs.
Fua, Navigating Hierarchies with Structure-Based Brushes, 1999, 7 pgs.
Goldstein, A Framework for Knowledge-Based Interactive Data Exploration, Dec. 1994, 30 pgs.

(56) References Cited

OTHER PUBLICATIONS

Gray, Data Cube: A Relational Aggregation Operator Generalizing Group-By, 1997, 24 pgs.
Hanrahan, Office Action, U.S. Appl. No. 11/005,652, dated Feb. 20, 2009, 11 pgs.
Hanrahan, Office Action, U.S. Appl. No. 11/005,652, dated Jul. 24, 2008, 11 pgs.
Hanrahan, Office Action, U.S. Appl. No. 11/005,652, dated Dec. 27, 2007, 11 pgs.
Hanrahan, Specification, U.S. Appl. No. 11/005,652, dated Dec. 2, 2004, 104 pgs.
Healey, On the Use of Perceptual Cues and Data Mining for Effective Visualization of Scientific Datasets, 1998, 8 pgs.
HU Search Report, HU P0700460, dated Oct. 9, 2007, 1 pg.
Joseph, Office Action, U.S. Appl. No. 13/734,694, dated Aug. 18, 2014, 9 pgs.
Keim, VisDB: Datatbase Exploration Using Multidimensional Visualization, Aug. 1994, 27 pgs.
Kohavi, Data Mining and Visualization, 2000, 8 pgs.
Livny, DEVise: Integrated Querying and Visual Exploration of Large Datasets, May 1997, 12 pgs.
MacDonald, Creating Basic Charts, 2006, 46 pgs.
MacKinlay, Automating the Design of Graphical Presentations of Relational Information, 1986, 34 pgs.
MacKinlay, Office Action, U.S. Appl. No. 11/223,658, dated May 21, 2008, 20 pgs.
MacKinlay, Office Action, U.S. Appl. No. 11/223,658, dated Feb. 23, 2009, 19 pgs.
MacKinlay, Specification, U.S. Appl. No. 11/223,658, dated Sep. 9, 2005, 58 pgs.
Perlin, An Alternative Approach to the Computer Interface, 1993, 11 pgs.
Rao, The Table Lens: Merging Graphical and Symbolic Representation in an Interactive Focus+Context Visualization for Tabular Information, Apr. 1994, 7 pgs.
Roth, Interactive Graphic Design Using Automatic Presentation Knowledge, Apr. 24-28, 1994, 7 pgs.
Roth, Visage: A User Interface Environment for Exploring Information, Oct. 28-29, 2006, 9 pgs.
Screen Dumps for Microsoft Office Excel 2003 SP2, figures 1-36, 2003, pp. 1-19.
Spenke, Focus: The Interactive Table for Product Comparison and Selection, Nov. 1996, 10 pgs.
Stevens, On the Theory of Scales of Measurement, Jun. 7, 1946, 4 pgs.
Stolte, Multiscale Visualization Using Data Cubes, 2002, 8 pgs.
Stolte, Notice of Allowance, U.S. Appl. No. 10/453,834, dated Mar. 27, 2006, 9 pgs.
Stolte, Notice of Allowance, U.S. Appl. No. 11/488,407, dated Dec. 29, 1999, 8 pgs.
Stolte, Notice of Allowance, U.S. Appl. No. 13/019,227, dated Nov. 10, 2011, 8 pgs.
Stolte, Notice of Allowance, U.S. Appl. No. 13/425,300, dated Dec. 10, 2013, 10 pgs.
Stolte, Office Action, U.S. Appl. No. 10/667,194, dated Jan. 7, 2008, 10 pgs.
Stolte, Office Action, U.S. Appl. No. 10/667,194, dated Feb. 9, 2009, 11 pgs.
Stolte, Office Action, U.S. Appl. No. 10/667,194, dated Aug. 14, 2007, 16 pgs.
Stolte, Office Action, U.S. Appl. No. 10/667,194, dated Aug. 14, 2008, 10 pgs.
Stolte, Office Action, U.S. Appl. No. 10/667,194, dated Jan. 18, 2007, 15 pgs.
Stolte, Office Action, U.S. Appl. No. 10/667,194, dated Jun. 26, 2006, 13 pgs.
Stolte, Office Action, U.S. Appl. No. 11/488,407, dated Apr. 3, 2009, 6 pgs.
Stolte, Office Action, U.S. Appl. No. 13/019,227, dated Apr. 18, 2011, 9 pgs.
Stolte, Office Action, U.S. Appl. No. 13/425,300, dated Mar. 15, 2013, 7 pgs.
Stolte, Office Action, U.S. Appl. No. 14/937,836, dated Oct. 7, 2016, 10 pgs.
Stolte, Notice of Allowance, U.S. Appl. No. 14/937,836, dated Mar. 1, 2017, 8 pgs.
Stolte, Polaris: A System for Query, Analysis, and Visualization of Multidimensional Relational Databases, Jan. 2002, 14 pgs.
Stolte, Query Analysis, and Visualization of Hierarchically Structured Data Using Polaris, Jul. 2002, 11 pgs.
Stolte, Specification, U.S. Appl. No. 10/453,834, dated Jun. 2, 2003, 114 pgs.
Stolte, Visualizing Application Behavior on Superscaler Processors, 1999, 9 pgs.
Tableau Software, IPRP, PCT/US2005/043937, dated Jun. 5, 2007, 9 pgs.
Tableau Software, IPRP, PCT/US2007/009810, dated Oct. 22, 2008, 7 pgs.
Tableau Software, ISR/WO, PCT/US2005/043937, dated Apr. 18, 2007, 9 pgs.
Tableau Software, ISR/WO, PCT/US2006/35300, dated Jul. 7, 2008, 6 pgs.
Tableau Software, ISR/WO, PCT/US2007/009810, dated Jul. 7, 2008, 8 pgs.
The Board of Trustees . . . Stanford, IPRP, PCT/US04/18217, dated Oct. 19, 2006, 4 pgs.
The Board of Trustees . . . Stanford, IPRP, PCT/US2004/30396, dated Apr. 19, 2007, 4 pgs.
The Board of Trustees . . . Stanford, ISR/WO, PCT/US04/18217, dated Feb. 7, 2006, 6 pgs.
The Board of Trustees . . . Stanford, ISR/WO, PCT/US2004/30396, dated Aug. 24, 2006, 5 pgs.
The Board of Trustees . . . Stanford, Supplementary ESR, EP 04754739.3, dated Dec. 17, 2007, 4 pgs.
Thearling, Visualizing Data Mining Models, 2001, 14 pgs.
Ward, XmdvTool: Integrating Multiple Methods for Visualizing Multi-Variate Data, 9 pgs.
Welling, Visualization of Large Multi-Dimensional Datasets, Aug. 11, 2000, 6 pgs.
Wilkinson, nViZn: An Algebra-Based Visualization System, Mar. 21-23, 2001, 7 pgs.
Wilkinson, Statistics and Computing—The Grammar of Graphics, 1999, 417 pgs.

\* cited by examiner

Fig. 8 y: Producttype +
Market =
{ (Products.Coffee),
(Products.Espresso),
(Products.HerbalTea),
(Products.Tea),
(Market.Central),
(Market.East),
(Market.South),
(Market.West) } x: Quarter =
{ (Time.Qtr1), (Time.Qtr2), (Time.Qtr3), (Time.Qtr4) }

720

| | Qtr1 | Qtr2 | Qtr3 | Qtr4 |
|---|---|---|---|---|
| Coffee | 17482 | 18990 | 20525 | 17480 |
| Espresso | 16854 | 16970 | 16909 | 17880 |
| HerbalTea | 14870 | 16340 | 16137 | 15905 |
| Tea | 12732 | 13312 | 13208 | 18031 |
| Central | 22847 | 23717 | 24395 | 22891 |
| East | 13493 | 15680 | 13294 | 14745 |
| South | 7717 | 7804 | 8482 | 8394 |
| West | 18082 | 18332 | 19388 | 18260 |

All of these cells are from the same projection of the data cube onto the two dimensions Time and Products.

All of these cells are from the same projection of the data cube onto the two dimensions Time and Market.

Fig. 10

(b) Drill down into the County level of detail

SYSTEMS AND METHODS OF GENERATING A PLURALITY OF DATA VISUALIZATIONS IN A DATA VISUALIZATION REGION

1. CROSS REFERENCE TO RELATED APPLICATIONS

This application is a continuation of U.S. patent application Ser. No. 14/937,836, filed Nov. 10, 2015, which is a continuation of U.S. patent application Ser. No. 14/637,333, filed Mar. 3, 2015, now U.S. Pat. No. 9,183,235, which is a continuation of U.S. patent application Ser. No. 14/231,477, filed Mar. 31, 2014, now U.S. Pat. No. 8,972,457, which is a continuation of U.S. patent application Ser. No. 13/425,300, filed Mar. 20, 2012, now U.S. Pat. No. 8,713,072, which is a continuation of U.S. patent application Ser. No. 13/019,227, filed Feb. 1, 2011, now U.S. Pat. No. 8,140,586, which is a continuation of U.S. patent application Ser. No. 12/777,172, filed May 10, 2010, now U.S. Pat. No. 7,882,144, which is a continuation of U.S. patent application Ser. No. 11/488,407, filed Jul. 17, 2006, now U.S. Pat. No. 7,716,173, which is a continuation of U.S. patent application Ser. No. 10/453,834, filed Jun. 2, 2003, now U.S. Pat. No. 7,089,266, each of which is incorporated by reference in its entirety.

This invention was made with Government support under contract W-7405-ENG-48 awarded by the Department of Energy. The Government has certain rights in this invention.

2. FIELD OF THE INVENTION

This invention relates generally to an interactive visual exploration tool that facilitates exploratory analysis of databases having a hierarchical structure.

3. BACKGROUND OF THE INVENTION

In the last several years, large databases have become common in a variety of applications. Corporations are creating large data warehouses of historical data on key aspects of their operations. Corporations are also creating many small databases using desktop applications that are created to examine some specific aspect of their business. International research projects such as the Human Genome Project and the Sloan Digital Sky Survey are generating massive scientific databases. One challenge with these databases is the extraction of meaning from the data they contain: to discover structure, find patterns, and derive causal relationships. The sheer size of these data sets complicates this task. Interactive calculations that require visiting each record are not plausible. It is also not feasible for an analyst to reason about or view the entire data set at its forest level of detail. Moreover, even when the data sets are small, their complexity often makes it difficult to glean meaning without applying aggregations or creating simplifying summaries.

Imposing meaningful hierarchical structure on databases provides levels of abstraction that can be leveraged by both the computer and the analyst. These hierarchies can come from several different sources. Some hierarchies are provided by the inherent nature of the database. Data mining algorithms, such as decision trees and clustering techniques that classify the data and thereby automatically derive hierarchies can be used to determine database hierarchy. Part of the analysis task when dealing with automatically generated hierarchies is in understanding and trusting the results. See, for example, 2001, Thearling et al., "Visualizing Data Mining Models" in Information Visualization in Data Mining and Knowledge Discovery, Fayyad, Grinstein and Wierse eds., Morgan Kaufman, which is hereby incorporated by reference in its entirety.

FIG. 9 illustrates the hierarchy for a time dimension. Within a time dimension, there are four levels. They are "All", year, quarter, and month. Simple hierarchies, like the one shown in FIG. 9, are commonly modeled using a star schema. The entire dimension hierarchy is represented by a single dimension table joined to the base fact table. In this type of hierarchy, there is only one path of aggregation. However, there are more complex dimension hierarchies where the aggregation path can branch. For example, a time dimension might aggregate from "day" to both week and "month".

To provide another illustration of the concept of a star schema, consider the case in which one wishes to analyze monthly total product sales for a department store by breaking down the data by region and store. Raw data can come in the form of product managers' (FIG. 1) and regional managers' (FIG. 2) quarterly sales reports. Once the data has been collected and refined, it may reside in a large base table. In addition, there may be adjunct lookup tables. A star schema for this base data is shown in FIG. 3. The table schema of FIG. 3 is called a star schema because the central fact table is depicted as surrounded by each of the dimension tables that describe each dimension. In this example, the base sales data table is the fact table and each lookup table is a dimension table.

The stores, weeks, and products columns in the fact table in FIG. 3 contain numeric values. Fact tables can grow to huge numbers of rows. The lookup tables contain hierarchy information relating each store, week, and product with its higher-level aggregations. For example store 1 in the base table of FIG. 3 connects with the "Store Lookup" table where it has the name Ridgewood and rolls up to the Northeast region. Product 2 in the base table connects with the "Product Lookup" table where it has the name olive oil soap and rolls up into the product type soap in the skin care products group. Thomsen, 1997, OLAP Solutions: Building Multidimensional Information Systems, Wiley Computer Publishing, New York, which is hereby incorporated by reference in its entirety.

The most common schemata found in databases are the star schema and snowflake schema. Each schema has a fact table containing data items of interest (measures) in the analysis for which the database is built. These data items might be transaction amounts such as the amount invested in a mutual fund or the profit on a sales transaction. The fact table is surrounded by dimension tables containing detailed information used to summarize the fact table in different ways. An illustration of a star schema has been provided (FIG. 3). FIG. 4 illustrates a snowflake schema that includes hierarchy. The snowflake and star schema provide a conceptual multidimensional view of the database. The database is a core set of measures characterized by a number of dimensions rather than a set of interrelated tables. This organization correlates directly with the typical analysis query that summarizes a few quantitative attributes (or measures) such as profit or sales by several characterizing attributes (or dimensions) such as product, location, or date over a large number of triples. The primary differences between the star and snowflake schema arise in how they model hierarchical structures on the dimensions.

When referring to values within a dimension hierarchy, a dotted notation can be used to specify a specific path from the root level "All" (FIG. 9) of the hierarchy down to the specified value. Specifically, to refer to a value on level m of a hierarchy, the dimension name is first optionally listed, then zero or more of the (m−1) intermediate ancestor values, and then finally the value on the mth level, all separated by periods. For example, the Jan node on the Month level in the time hierarchy that corresponds to January, 1998, can be referred to as 1998.Qtr1 Jan. When this notation is used, the reference is called a qualified value. When a value is simply described by its node value (without any path to the root node) the reference is called an unqualified value.

3.1 Types of Databases

One form of database is a relational warehouse, such as a structured query language (SQL) database. Relational warehouses organize data into tables. Each row in a table corresponds to a basic entity or fact and each column represents a property of that entity. See, for example, Thomsen, 1997, OLAP Solutions: Building Multidimensional Information Systems, Wiley Computer Publishing, New York. For example, a table may represent transactions in a bank, where each row corresponds to a single transaction. As such, each transaction may have multiple properties, such as the transaction amount, the account balance, the bank branch, and the customer. As used herein, a row in a table is referred to as a tuple or record, and a column in the relation is referred to as a field. Such tables are also referred to as relations. As such, a relation is defined as a database table that contains a set of tuples.

It is possible to create dimension tables and star schemas in relational warehouses. A single relational warehouse will contain many heterogeneous but interrelated tables. The fields (columns) within a table can be partitioned into two types: dimensions and measures. Dimensions and measures are similar to independent and dependent variables in traditional analysis. For example; the bank branch and the customer would be dimensions, while the account balance would be a measure.

Multidimensional databases are structured as n-dimensional data cubes. Each dimension in the data cube corresponds to one dimension in the relational schema (e.g., in the star schema, snowflake schema etc.). Each cell in the data cube contains all the measures in the relational schema corresponding to a unique combination of values for each dimension. The dimensions within a data cube are often augmented with a hierarchical structure. This hierarchical structure can be derived from the semantic levels of detail within the dimension or generated from classification algorithms. Using these hierarchies, the analyst can explore and analyze the data cube at multiple meaningful levels of aggregation calculated from a base fact table (e.g., a relation in the database with the raw data). Each cell in the data cube now corresponds to the measures of the base fact table aggregated to the proper level of detail.

The aggregation levels are determined from the hierarchical dimensions. Each dimension is structured as a tree with multiple levels. Each level corresponds to a different semantic level of detail for that dimension. Within each level of the tree there are many nodes. Each node corresponds to a value within the domain of the level of detail that the node is in. The tree forms a set of parent-child relationships between the domain values at each level of detail.

3.2 Data Exploration of Databases

Visualization is a powerful tool for exploring large data, both by itself and coupled with data mining algorithms. However, the task of effectively visualizing large databases imposes significant demands on the human-computer interface to the visualization system. The exploratory process is one of hypothesis, experiment, and discovery. The path of exploration is unpredictable, and analysts need to be able to easily change both the data being displayed and its visual representation. Furthermore, the analyst must be able to first reason about the data at a high level of abstraction, and then rapidly drill down to explore data of interest at a greater level of detail. Thus, the interface must expose the underlying hierarchical structure of the data and support rapid refinement of the visualization.

One tool known in the art is Polaris. See, for example, Stolte, Tang, and Hanrahan, 2002, IEEE Transactions on Visualization and Computer Graphics 8. Polaris is built upon an algebraic formalism for constructing visualizations of relations. The state of the user interface is a visual specification. This specification is interpreted according to the formalism to determine both the series of queries necessary to retrieve the requested data, as well as the mapping and layout of the resulting tuples (rows of data in the database) into graphical marks. However, the original form of Polaris does not make use of the structure of hierarchically structured dimensions that are found in a hierarchical database. Therefore, the original form of Polaris does not provide a satisfactory means for the exploratory analysis of databases having a hierarchical structure.

Other known art in the field can be broken down into two categories (i) the visual exploration of databases and (ii) the use of data visualization in conjunction with data mining algorithms. These two categories will be considered in turn.

3.2.1 Visual Data Exploration of Databases

Visual query tools such as VQE (Merthick et al., 1997, "An Interactive) Visualization Environment for Data Exploration," Proc. of Knowledge Discovery in Databases, p. 2-9), Visage (Roth et al. 1996, "Visage: A User Interface Environment for Exploring Information". in Proceedings of Information Visualization, p. 3-12), DEVise Livny et al, 1997, "DEVise: Integrated Querying and Visual Exploration of Large Datasets" in Proc. of ACM SIGMOD), and Tioga-2 (Woodruff et al, 2001, Journal of Visual Languages and Computing, Special Issue on Visual Languages for End-user and Domain-Specific Programming 12, p. 551-571) have focused on building visualization tools that directly support interactive database exploration through visual queries. Users can construct queries and visualizations directly through their interactions with the interface. These systems have flexible mechanisms for mapping gum results to graphs and support mapping database tuples to retinal properties of the marks in the graphs. Of these systems, only Tioga-2 provides built-in support for interactively navigating through and exploring data at different levels of detail. However, the underlying hierarchical structure must be created by the analyst during the visualization process. These visual query tools do not leverage the hierarchical structure that is already encoded in the database. Because of this drawback, VQE, Visage, DEVise, and Tioga-2 are not satisfactory tools for facilitating exploratory analysis of databases having a hierarchical structure.

Tools such as XrndvTool (Ward, 1994, "XmdvTool: Integrating multiple methods for visualizing multi-variate data," Proceedings of MER Visualization, pp. 326-336), Spotfire (BioNorth, Ottawa, Ontario, Canada, November, 2002) and Xgobi (Buja et al., 1996, Journal of Computational and Graphical Statistics 5, p. 78-99) provide the analyst with a set of predefined visualizations such as scatterplots and parallel coordinates. These systems are augmented with extensive interaction techniques (e.g., brushing and zooming) that can be used to refine the queries. However, such methods do not provide tools to interactively construct and refine a wide range of displays to suit the analysis process.

Furthermore, of these systems, only XmdvTool supports the exploration of hierarchically structured data. XmdvTool has been augmented with structure-based brushes (see Fual et al, Proc. of Information Visualization, October 1999, pp. 58-64) that allow the user to control the display's global level of detail (based on a hierarchical clustering of the data) and to brush records based on their proximity within the hierarchical structure. However, such an approach limits the user, in this case to viewing a single hierarchical structuring of the data and a single ordering of that hierarchy to make proximity meaningful. For this reason, XmdvTool, Spotfire, and Xgobi are not satisfactory tools for facilitating exploratory analysis of databases having a hierarchical structure.

Another known visualization system, VisDB (Keim and Kriegel, 1994, IEEE Computer Graphics and Applications 14, p. 40-49) focuses on displaying as many tuples (rows of data) as possible to provide feedback as users refine their queries. This system also displays tuples that do not satisfy the query, indicating their "distance" from the query criteria using spatial encodings and color. This approach helps the user avoid missing important data points that fall just outside of the selected query parameters. However, VisDB fails to take advantage of the hierarchical structure of databases. For example, VisDB does not provide an extensive ability to drill down and roll up data, thereby allowing the analyst to get a complete overview of the data set before focusing on detailed portions of the database. For this reason VisDB is not a satisfactory tool for facilitating exploratory analysis of databases having a hierarchical structure.

3.2.2 Visualization and Data Mining

Many research and commercial systems use visualization in conjunction with automated data mining algorithms. One common application of visualization together with data mining is in helping analysts understand models generated by the data mining process. For example, several researchers have developed techniques specifically for displaying decision trees, Bayesian classifiers, and decision table classifiers (Becker, 1998, Proc. of Information Visualization, p. 102-105), and these visualization techniques have been incorporated into products such as SGrs MineSet (Brunk et al., "MineSet: an integrated system for data mining," Proceedings of the 3rd International Conference on Knowledge Discovery and Data Mining, p. 135-138).

Other approaches to coupling visualization and data mining have traditionally been employed within focused domains. One approach is to use visualization to gain an initial understanding of a database and then apply algorithmic analysis to the identified areas of interest. See, for example, Kohavi, "Data Mining and Visualization," Frontiers of Engineering. Reports on Leading-Edge Engineering from the 2000 NAB symposium on Frontiers of Engineering, National Academy Press, 2001 as well as Therling et al., 2001, "Visualizing Data Mining Models," Information Visualization in Data Mining and Knowledge Discovery, Fayyad, Frinstein, and Wierse; eds., Morgan Kaufman. The other major approach is to use data mining to compress the size and dimensionality of the data and then use focused visualization tools to explore the results. See, for example, Healey, 1998, Proc. Graphics Interface, pp. 177-184 as well as Welling and Derthick, 2000, "Visualization of Large Multi-dimensional datasets," Proceedings of Virtual Observatories of the Future.

The drawback with the approaches described in this section is that they are focused on a particular algorithm or a single phase of the discovery process. For these reasons, known visualization and data mining tools do not provide a satisfactory way to explore and analyze databases that have a hierarchical structure.

3.2.3 Table Based Displays

Another area of related work is visualization systems that use table-based displays. Table displays such as scatterplot matrices (Hartigan, Journal of Statistical Computation and Simulation, 4, pp. 187-213) and Trellis displays (Becker, Displays: A Multi-Dimensional Data Visualization Tool for Data Mining, Third Annual Conference on Knowledge Discovery in Databases, August 1997) have been used extensively in statistical data analysis. However, the drawback of such visualization systems is that they present static graphics that the user cannot interact with in order to refine database queries or otherwise explore database content.

Interactive table displays have also been developed. Pivot tables allow analysts to explore different projections of large multi-dimensional datasets by interactively specifying assignments of fields to the table axes. However, pivot tables are limited to text-based displays.

The Table Lens (Rao and Card, The Table Lens: Merging Graphical and Symbolic Representations in an Interactive Focus+Context Visualization for Tabular Information, In Proc. of SIGCHI 1994, pp. 318-322) and FOCUS (Spenke et al. FOCUS: The Interactive Table for Product Comparison and Selection. In Proc. of the ACM Symposium on User Interface Software and Technology, November 1996) visualization systems provide table displays that present data in a relational table view, using simple graphics in the cells to communicate quantitative values. However, the Table Lens does not support queries. In addition, FOCUS is limited to object-attribute tables that do not have hierarchical structure.

3.3 Formal Graphical Presentations

In addition to various software programs, the known art further provides formal graphical presentations. Bertin's Semiology of Graphics, 1983, University of Wisconsin Press, Madison Wis. is an early attempt at formalizing graphic techniques. Bertin developed a vocabulary for describing data and the techniques for encoding the data into a graphic. Bertin identified the retinal variables (position, color, size, etc.) in which data can be encoded. Cleveland (The Elements of Graphing Data, 1985, Wadsworth Advanced Books and Software, Pacific Grove, Calif.; Visualizing Data, 1993, Hobart Press) used theoretical and experimental results to determine how well people can use these different retinal properties to compare quantitative variations.

Mackinlay's APT system (ACM Trans. Graphics, pp. 110-141, April 1986) is one of the first applications of formal graphical specifications to computer generated displays. APT uses a set of graphical languages and composition rules to automatically generate two-dimensional displays of relational data. The Sage system (Roth et al., 1994, Proc. SIGCHI '94, pp. 112-117) extends the concepts of APT, providing a richer set of data characterizations and generating a wider range of displays.

Livny et al. (Proc. ACM SIGMOD, May 1997) describe a visualization model that provides a foundation for database-style processing of visual queries. Within this model, the relational queries and graphical mapping necessary to generate visualizations are defined by a set of relational operators. The Rivet visualization environment (Bosch et al., 2000, Computer Graphics, pp. 68-73) applies similar concepts to provide a flexible database visualization tool. Wilkinson (The Grammer of Graphics, New York, Springer, 1999; U.S. Pat. No. 6,492,989) has developed a language for describing traditional statistical graphs. Further, Wilkinson proposes an interface for generating a subset of the specifications expressible within his language.

The drawback with these known formal graphical specifications is that they do not provide any tools for generating a database query. Furthermore, Bertin's work is purely theoretical and was never implemented as a computer program. APT assumes a given database structure and automatically generates a graphic with no user involvement or support for user involvement. As such, these known formal graphical specifications do not provide a satisfactory way to analyze databases.

3.4 State of the Known Art

Programs used to visually explore databases have been described. From this survey, it is apparent that known visualization and data mining tools do not provide a satisfactory way to explore and analyze databases that have a hierarchical structure. Thus, given the above background, what is needed in the art is an interactive visual exploration tool that facilitates exploratory analysis of databases having a hierarchical structure.

4. SUMMARY OF THE INVENTION

The present invention addresses the shortcomings of the known art. An interactive visual exploration tool that facilitates exploratory analysis of databases is provided. The systems and methods of the present invention are not focused on a particular algorithm, a single phase of the discovery process, or a narrow application domain. Rather, the systems and methods of the present invention can be used to gain an initial understanding of a database, to visually explore the database, to understand relationships between the fields of the database, to understand algorithm output, or to interactively explore a mining model. The systems and methods of the present invention provide an ability to encode a large number of dimensions in a table layout in order to help an analyst gain an initial understanding of how different dimensions relate as a precursor to automated discovery. Furthermore, the systems and methods of the present invention can be used directly as a visual mining tool. By integrating the decision trees and classification networks into the database as dimension hierarchies, the present invention can be used by analysts to gain an understanding of how these models classify the data.

The present invention takes advantage of the hierarchical structure of a database in order to provide extensive ability to drill down and roll up data. In instances where the database does not have an explicitly defined hierarchical structure, the present invention allows for construction of database hierarchy. In some cases, this is accomplished with user input. The methods of the present invention provide a novel formalism that allows an analyst to get a complete overview of the data set before focusing on detailed portions of the database. The present invention further supports both the simultaneous exploration of multiple hierarchies (derived from semantic meaning or algorithmic analysis) and the ability to reorder the hierarchy as needed.

One aspect of the invention provides a method for producing graphics. In the method, a hierarchical structure of a first database is determined. Then, a visual table, comprising one or more panes, is constructed by providing a specification that is in a language based on the hierarchical structure of the first database. The first database is queried to retrieve a set of tuples in accordance with the specification and a subset of this set of tuples is associated with a pane in the one or more panes. In some embodiments, the method further comprises encoding a tuple in the subset of the set of tuples in the pane as a graphical mark.

In some embodiments, the specification organizes the one or more panes into a plurality of rows and a plurality of columns that are optionally organized in a hierarchical manner. In some embodiments, specification organizes the one or more panes into a plurality of layers that are optionally hierarchically organized. In some embodiments, the specification organizes the one or more panes into separate pages that are hierarchically organized.

In some embodiments, the specification comprises an algebraic expression that includes an operand and the algebraic expression represents an operation on the hierarchical structure of said first database. This operand can be, for example, a type that appears in the hierarchical structure. The algebraic expression is evaluated thereby obtaining an ordered set of tuples. The ordered set of tuples is then mapped to a row, a column, or a layer in the visual table. In such instances, the row, the column, or the layer is presented in the same order that is in the ordered set of tuples. In some instances, the algebraic expression includes a relational operator such as cross product, union, selection or sorting. In some instances, a precedence of the relational operator is specified by a nesting operation (e.g., by the use of parentheses).

In some embodiments of the invention, the specification organizes the one or more panes into a plurality of rows and a plurality of columns and the specification comprises a first algebraic expression for the plurality of rows and a second algebraic expression for the plurality of columns. In such embodiments, at least one of the first algebraic expression and the second algebraic expression represents an operation on the hierarchical structure of the first database. In some embodiments, the specification further organizes the one or more panes into a plurality of layers and the specification further comprises a third algebraic expression for the plurality of layers.

In one aspect of the invention, a hierarchical structure of a second database is determined. In this aspect of the invention, the specification comprises an element of the hierarchical structure of the first database and an element of the hierarchical structure of the second database. Further, the specification includes an operand encoded as a type tuple that is derived from the first database or the second database.

In another aspect of the invention, a tuple in the subset of tuples associated with a pane in the visual table comprises a field. In some instances the field is mapped to a graphical attribute such as a color, a value, a size, a shape, a phrase, or a symbol. In some instances, the field is classified as quantitative or ordinal. The field is mapped to a first graphical attribute when the field is classified as quantitative. The field is mapped to a second graphical attribute when the field is classified as ordinal. Instill other instances, the field is classified as independent or dependent. The field is mapped to a first graphical attribute when the field is classified as independent. The field is mapped to a second graphical attribute when the field is classified as dependent. Here, the first graphical attribute and the second graphical attribute are each independently a color, a value, a size, a shape, a phrase, or a symbol.

In still another aspect of the invention, a group is created with all or a portion of the tuples in the set of tuples and a graphic is formed based on the group. This graphic can be, for example, a line that connects each tuple in the group. In another example, the graphic is an area that encloses each tuple in the group. In some embodiments multiple-tuple marks (e.g., for lines and polygons) are created in step 616.

In such instances, a single mark that is based off multiple tuples is created. For example, a polygon representing a U.S. state can be treated as a single mark.

In yet another aspect of the invention, the first database is queried with a query that is based upon the specification. In some embodiments in accordance with this aspect of the invention, the querying further comprises mapping the query to a relational algebra operator such as a structured query language (SQL) query or a datacube query (e.g., an MDX query). In some instances, the specification is processed thereby reducing a number of queries that are performed by the querying process of the invention. In one example, the query is processed by crossing an expression in the specification, converting an expression in the specification to a sum-of-terms, and forming a query from a term in the sum-of-terms.

In one aspect of the invention the hierarchical structure of each database in a plurality of databases is determined. Further, the specification is written in a language based on a hierarchical structure of one or more databases in the plurality of databases. In this aspect of the invention, the querying comprises accessing all or a portion of the databases in the plurality of databases.

In another aspect in accordance with the invention, a hierarchical structure of each database in a plurality of database is determined. Further, the language is based on a hierarchical structure of all or a portion of the databases in the plurality of database. All or a portion of the plurality of databases is queried. Further, the set of tuples includes tuples derived from all or a portion of the plurality of databases. In one embodiment in accordance with this aspect of the invention, the specification organizes the one or more panes into a plurality of layers and each layer in the plurality of layers is assigned to a tuple from a different database in the plurality of databases. In another embodiment in accordance with this aspect of the invention, the specification organizes the one or more panes into a plurality of columns and a plurality of rows and each column in the plurality of columns is assigned to a tuple from a different database in said plurality of databases. In still another embodiment in accordance with this aspect of the invention, the specification organizes the one or more panes into a plurality of columns and a plurality of rows and each row in the plurality of rows is assigned to a tuple from a different database in the plurality of databases. In yet another embodiment in accordance with this aspect of the invention, the specification organizes the one or more panes into a plurality of pages and each page in the plurality of pages is assigned to a tuple from a different database in the plurality of databases.

In yet another aspect of the invention, the hierarchical structure of the first database includes a plurality of schema fields. In this aspect of the invention, construction of the visual table further comprises assigning a schema field in the plurality of schema fields to a pane in the one or more panes based on the specification. Further, the subset of the set of tuples associated with the pane is determined by a selection function. In some embodiments, the selection function uses an identity of the schema field. In some embodiments, the selection function uses a relational operator (e.g., a selection operator or a grouping operator) to form the subset. In some embodiments, the selection function uses a relational operator (e.g., a sorting operator, an aggregation operator, a transforming operator, etc.) to create a new tuple from the subset of tuples that is associated with the pane.

In another aspect of the invention, the constructing of a visual table, the querying of the database, and the associating of a subset of tuples to a pane is repeated using a specification that is determined by the subset of the set of tuples associated with the pane. In some instances these steps are repeated using one or more tuples in the subset of tuples that are selected by a user.

In still another aspect of the invention, the first database has a schema and the language comprises a plurality of fields in this schema. Further, the visual table comprises a plurality of axes and each axis in the plurality of axes is represented by a shelf. The specification comprises one or more algebraic expressions. One such algebraic expression is created by dragging a field in the plurality of fields in the database schema onto a shelf that represents an axis of the visual table, thereby constructing an algebraic expression in the specification.

In still another aspect of the invention, the specification is stored (e.g., as a bookmark, an undo operation, a redo operation, etc.). In some embodiments, the first database is a flat file, a relational database, or an on-line analytical processing database. In some embodiments, the first database is a hierarchical on-line analytical processing data cube. In some embodiments, the first database does not have an explicitly defined hierarchy. When this is the case, data fields in the first database are analyzed to determine hierarchical structure within the database. In some embodiments, the first database has a star schema that is analyzed to determine the hierarchical structure of the database. In some embodiments, the first database is hosted by remote computer.

Yet another aspect of the invention provides a computer program product for use in conjunction with a computer system. The computer program product comprises a computer readable storage medium and a computer program mechanism embedded therein. The computer program mechanism comprises (i) a first database, (ii) a database hierarchy module comprising instructions for determining a hierarchical structure of the first database, (iii) a user interface module comprising instructions for constructing a visual table, comprised of one or more panes, by obtaining from a user a specification that is in a language based on the hierarchical structure of the first database, (iv) a data interpreter module comprising instructions for querying the first database to retrieve a set of tuples in accordance with the specification, and (v) a visual interpreter module comprising instructions for associating a subset of the set of tuples with a pane in the one or more panes.

Still another aspect of the invention provides a computer system for producing graphics. The computer system comprises a central processing unit and a memory coupled to the central processing unit. The memory stores (i) a first database, (ii) a database hierarchy module comprising instructions for determining a hierarchical structure of the first database, (iii) a user interface module comprising instructions for constructing a visual table, comprised of one or more panes, by obtaining from a user a specification that is in a language based on the hierarchical structure of the first database, (iv) a data interpreter module comprising instructions for querying the first database to retrieve a set of tuples in accordance with the specification, (v) and a visual interpreter module comprising instructions for associating a subset of the set of tuples with a pane in the one or more panes.

5. BRIEF DESCRIPTION OF THE DRAWINGS

Figures 1, 2:
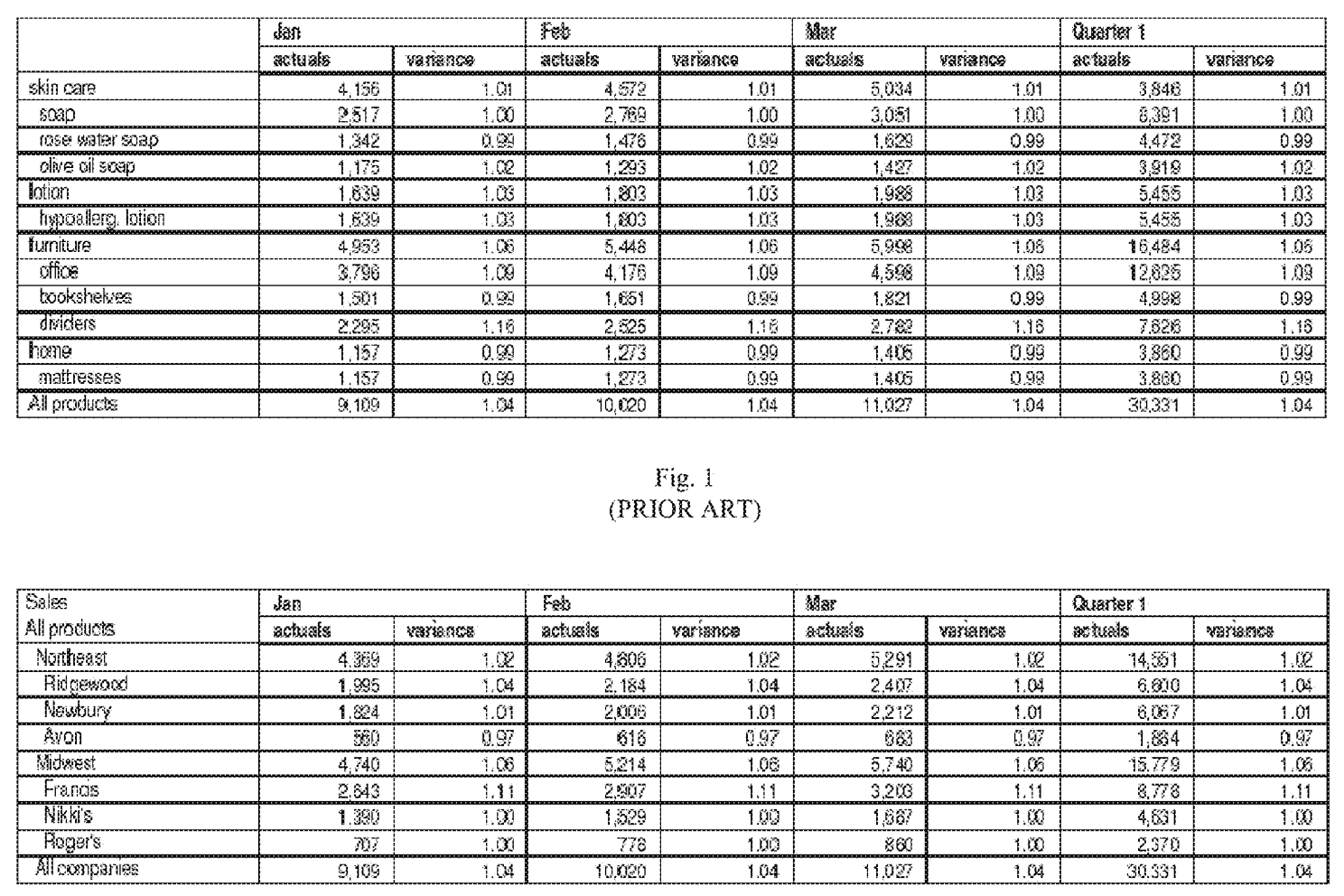

FIG. 1 illustrates raw data in the form of product managers' quarterly sales reports in accordance with the prior art.

FIG. 2 illustrates raw data in the form of regional managers' quarterly sales reports in accordance with the prior art.

FIG. 8 illustrates examples of the set interpretations and resulting table structures for representative expressions in accordance with one embodiment of the present invention.

FIG. 10 illustrates a table in accordance with the present invention.

Figure 11:
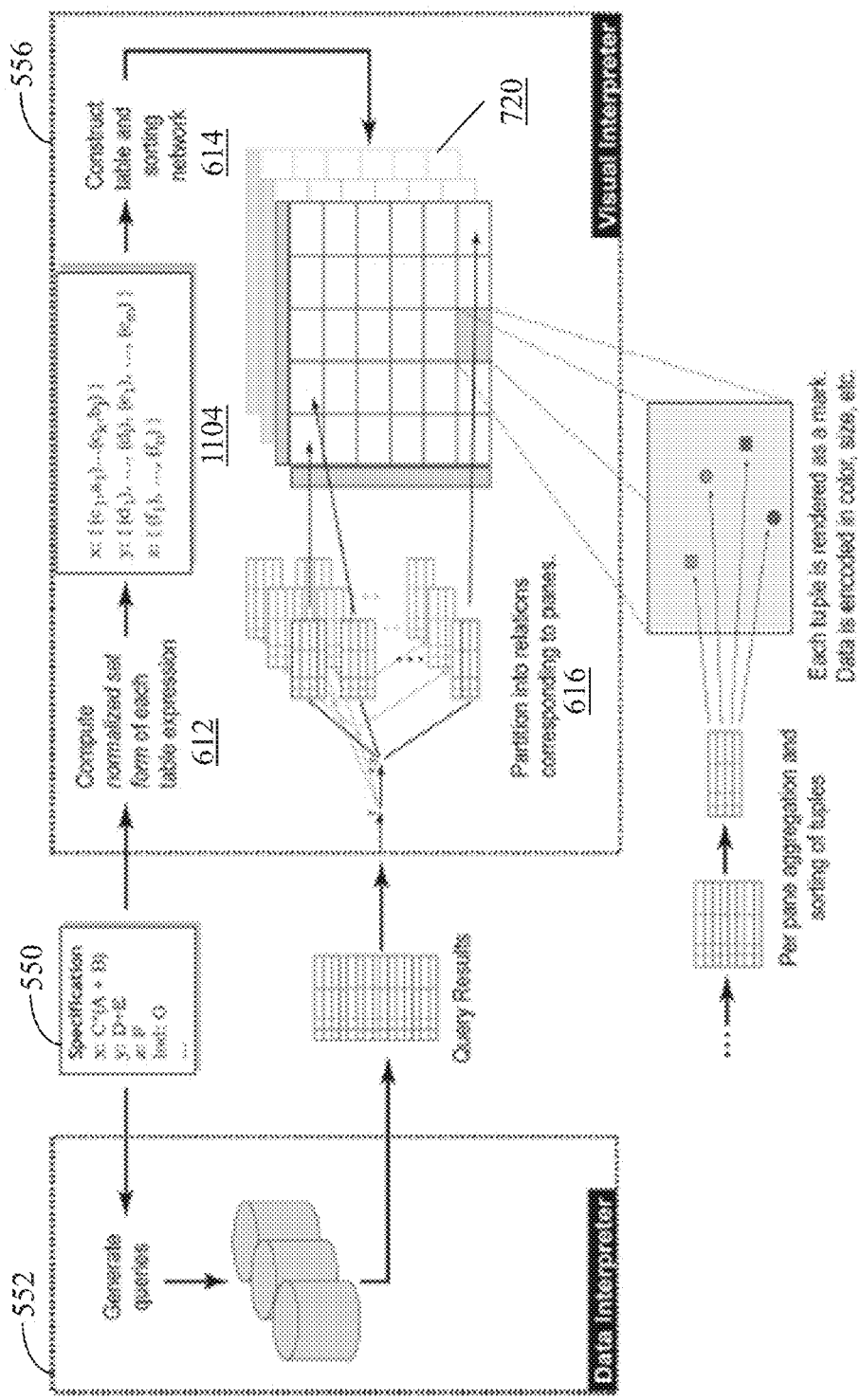

FIG. 11 provides an exemplary view of processing steps in accordance with one embodiment of the present invention.

Figure 12:
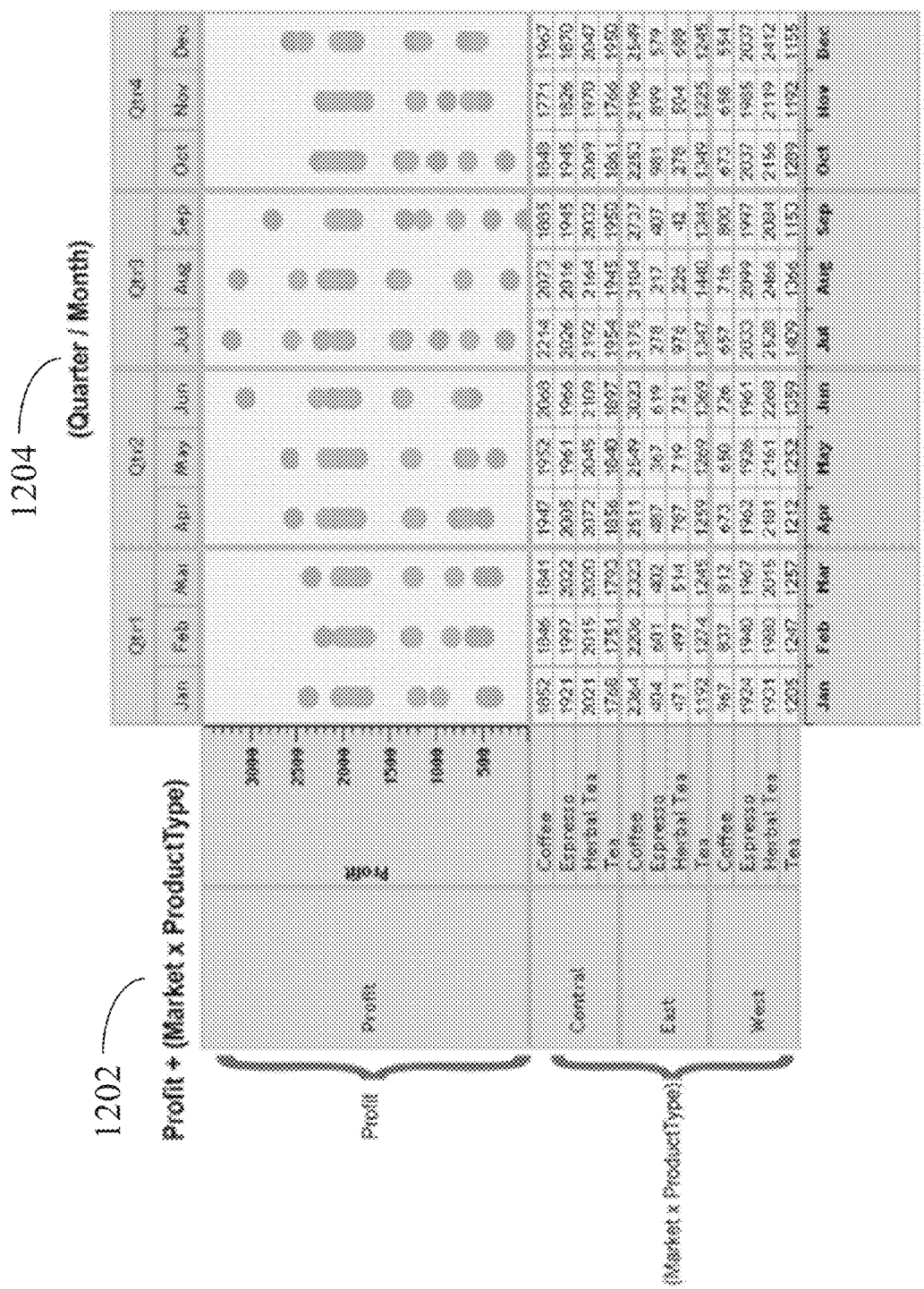

FIG. 12 illustrates the configuration for a table that has been generated from the normalized set form of a visual specification in accordance with one embodiment of the present invention.

Figure 13:
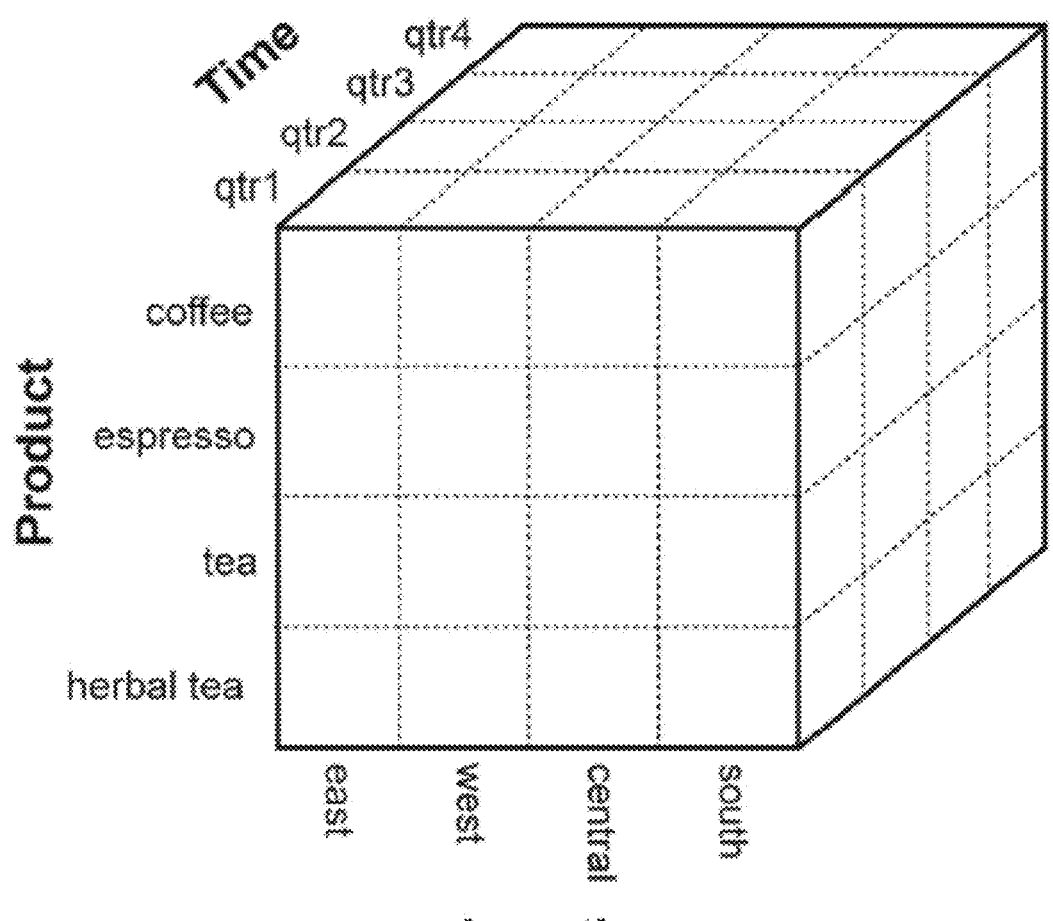

FIG. 13 illustrates a data cube for a hypothetical coffee chain in which each axis in the data cube corresponds to a level of detail for a dimension (product, location, time) in a database schema, in accordance with the prior art.

Figure 14:
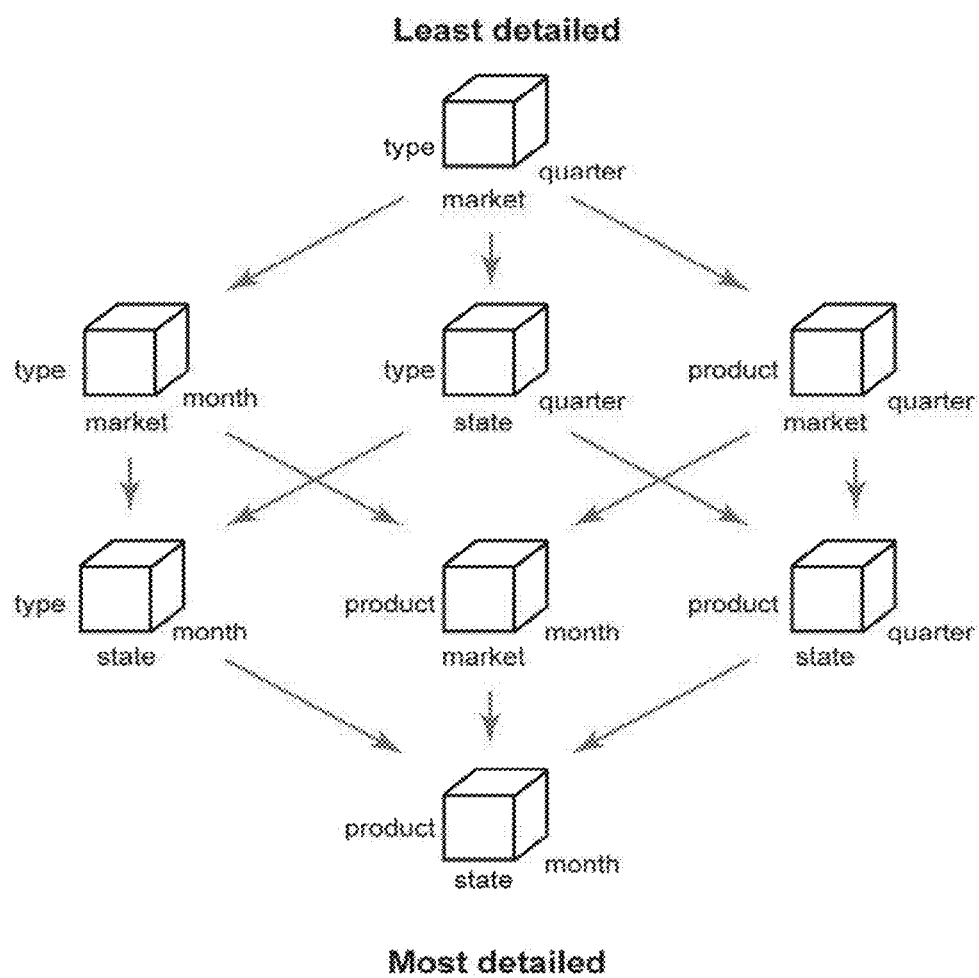

FIG. 14 illustrates a lattice of data cubes for a particular database schema in which each dimension has a hierarchical structure, in accordance with the prior art.

Figure 15:
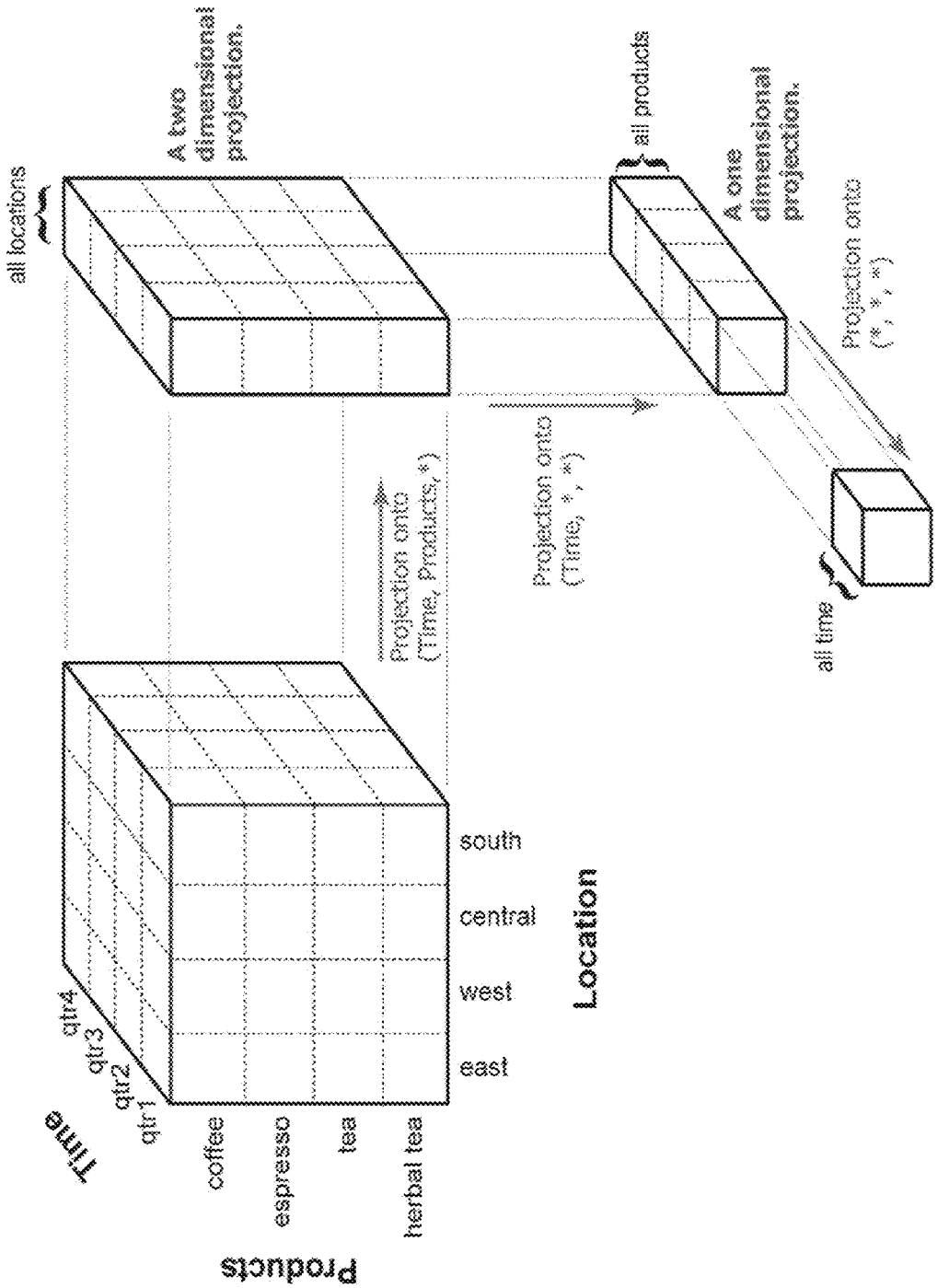

FIG. 15 illustrates the projection of a 3-dimensional data cube thereby reducing the dimensionality of the data cube by aggregating across dimensions that are not of interest to an analysis, in accordance with the prior art.

Figure 16:
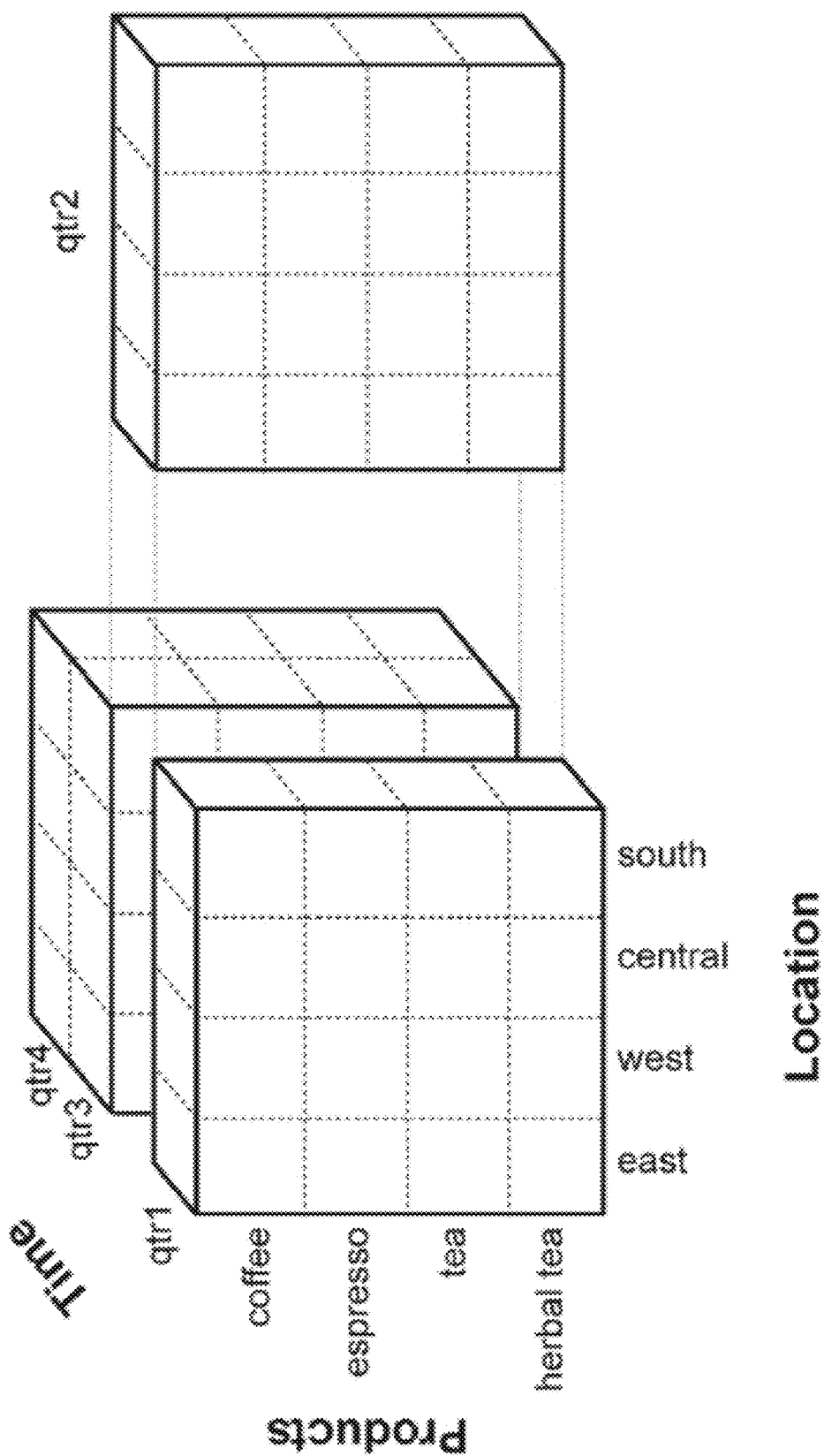

FIG. 16 illustrates the construction of a slice of a data cube by filtering the members of one or more dimensions of the cube, in accordance with the prior art.

Figure 17:
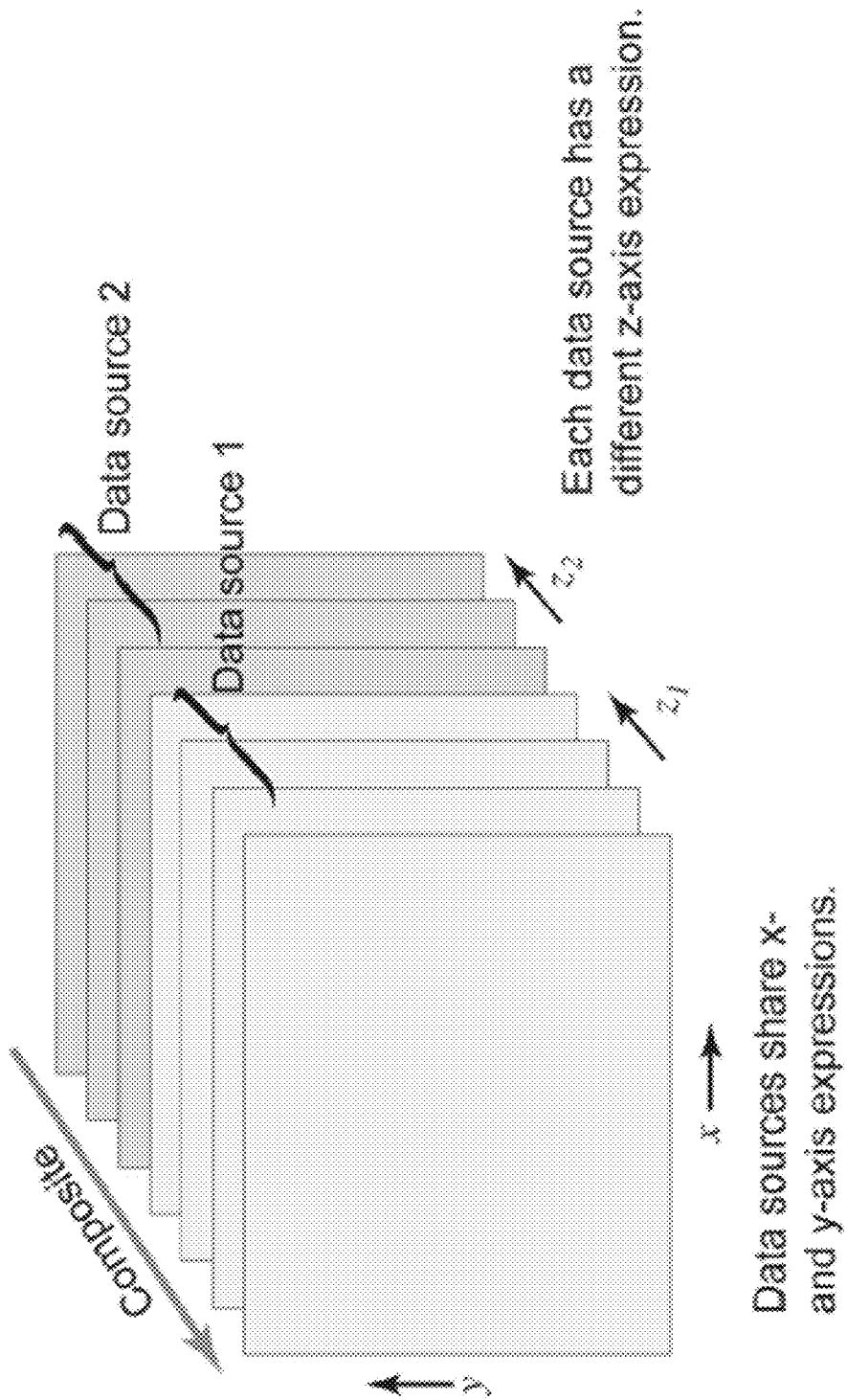

FIG. 17 illustrates the layering of multiple data sources and the partitioning of layers in accordance with one embodiment of the present invention.

Figure 18:
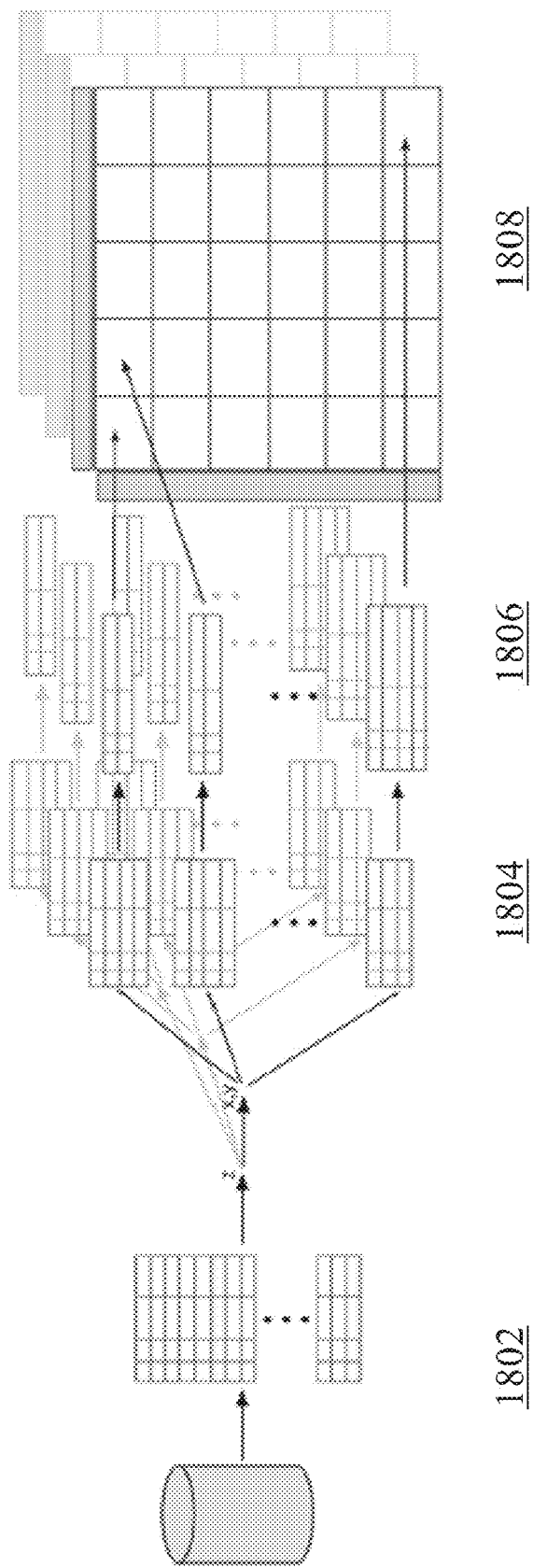

FIG. 18 illustrates the association of a subset of tuples with a pane in one or more panes in a visual table in accordance with one embodiment of the present invention.

Figure 19A:
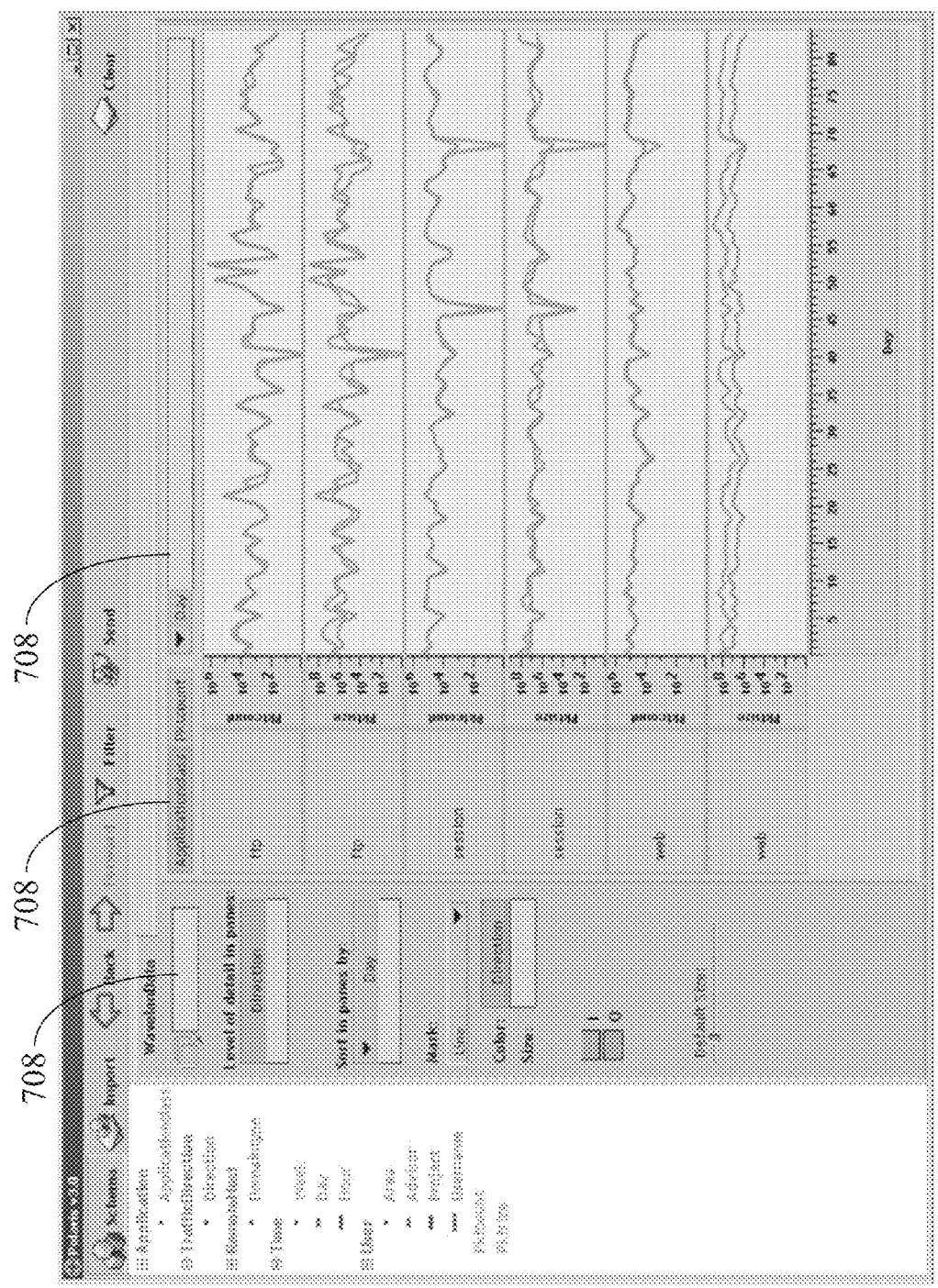
Figure 19B:
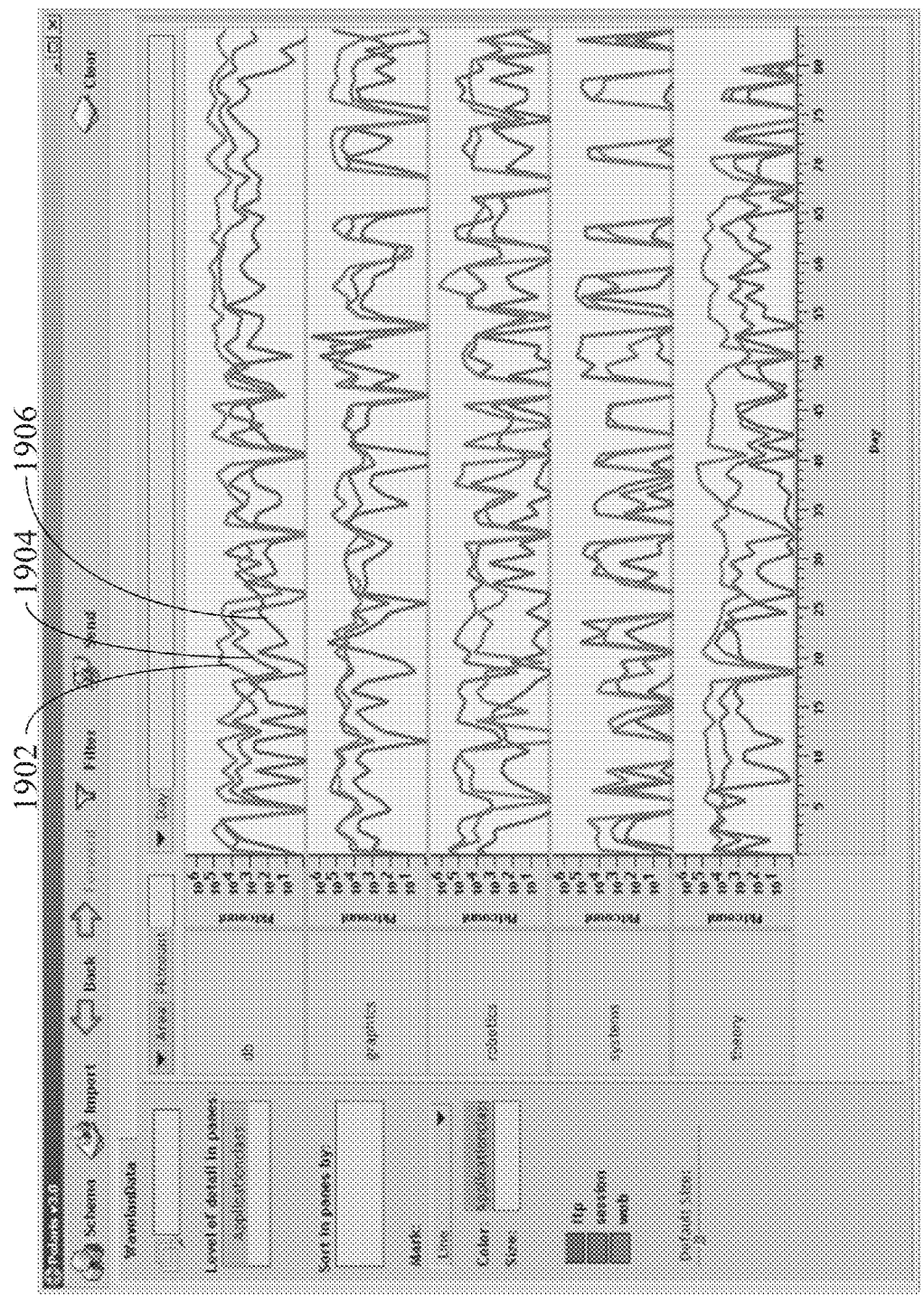
Figure 19C:
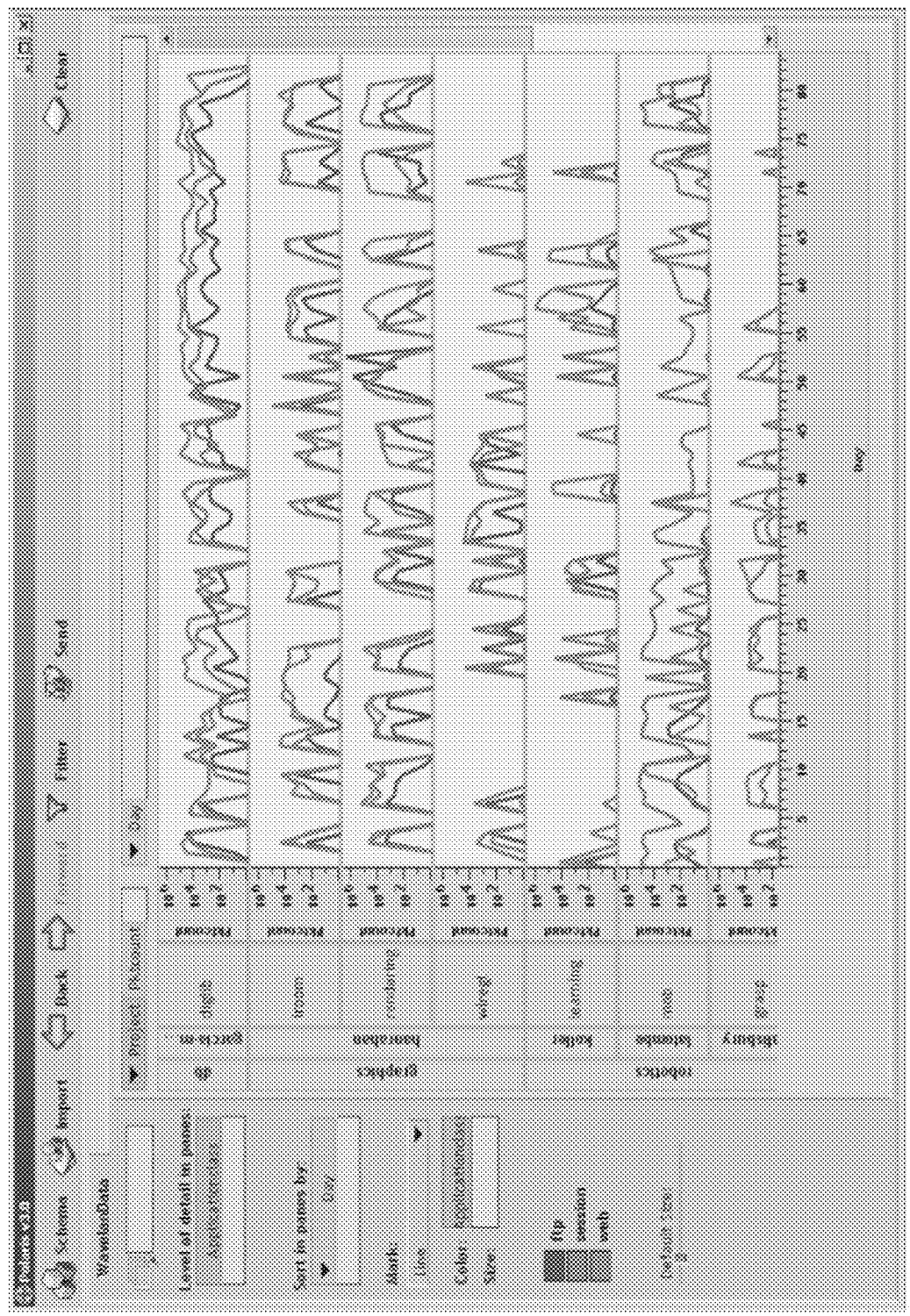

FIGS. 19A-19C illustrate an analysis of network usage in accordance with an embodiment of the present invention.

Figure 20A:
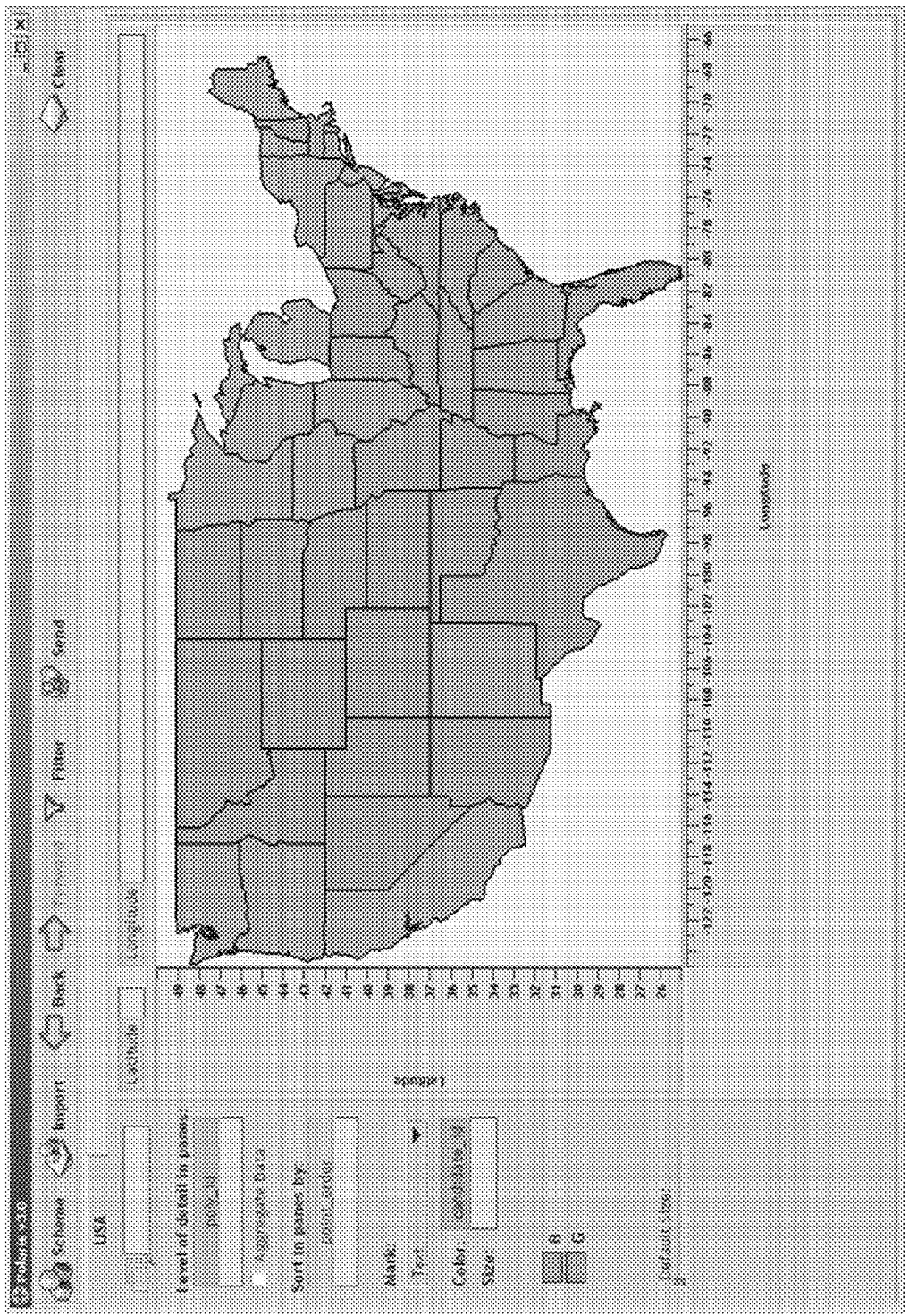
Figure 20B:
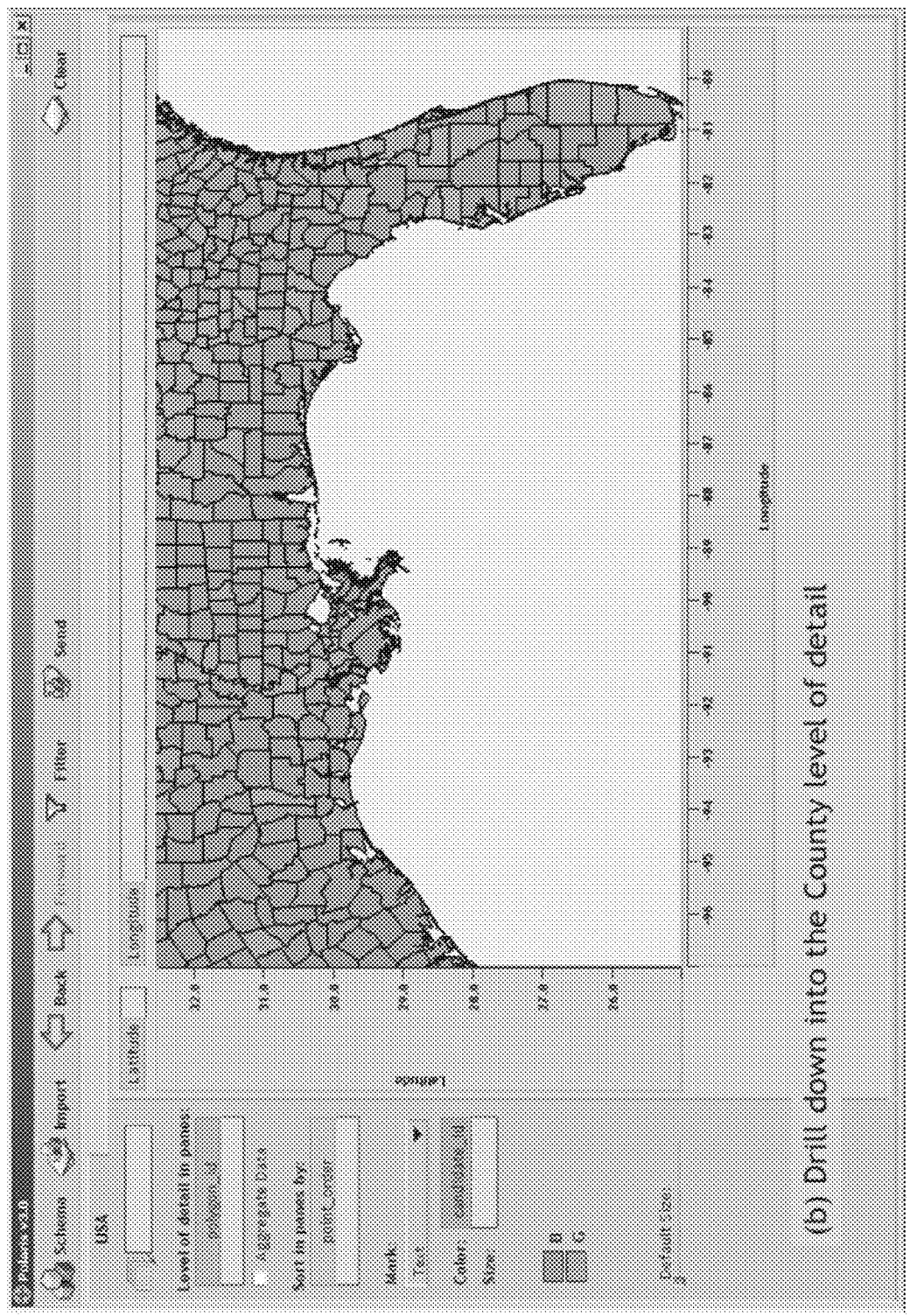
Figure 20C:
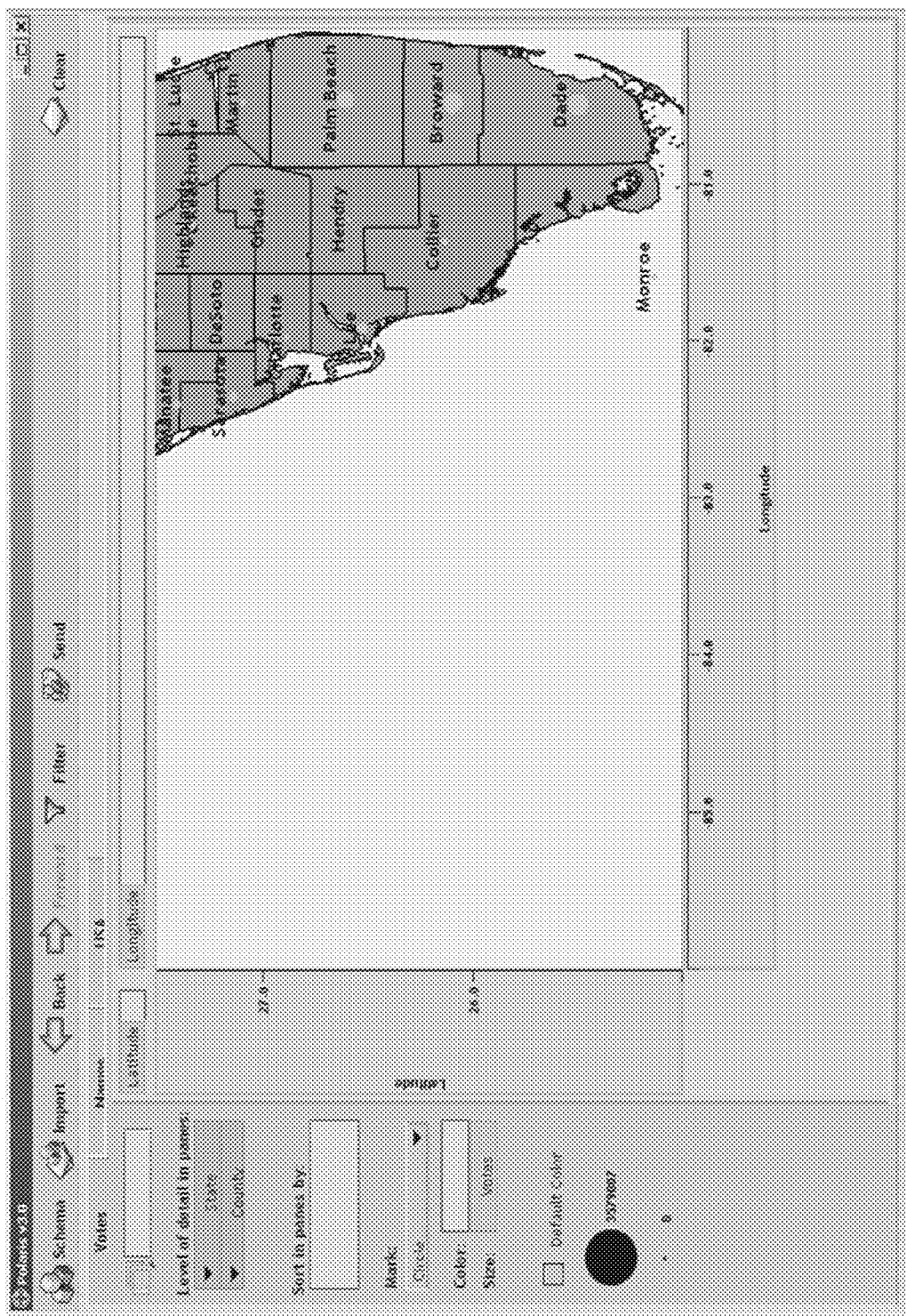

FIGS. 20A-20C illustrate an analysis of the results of the 2000 presidential election in accordance with an embodiment of the present invention.

Figure 21A:
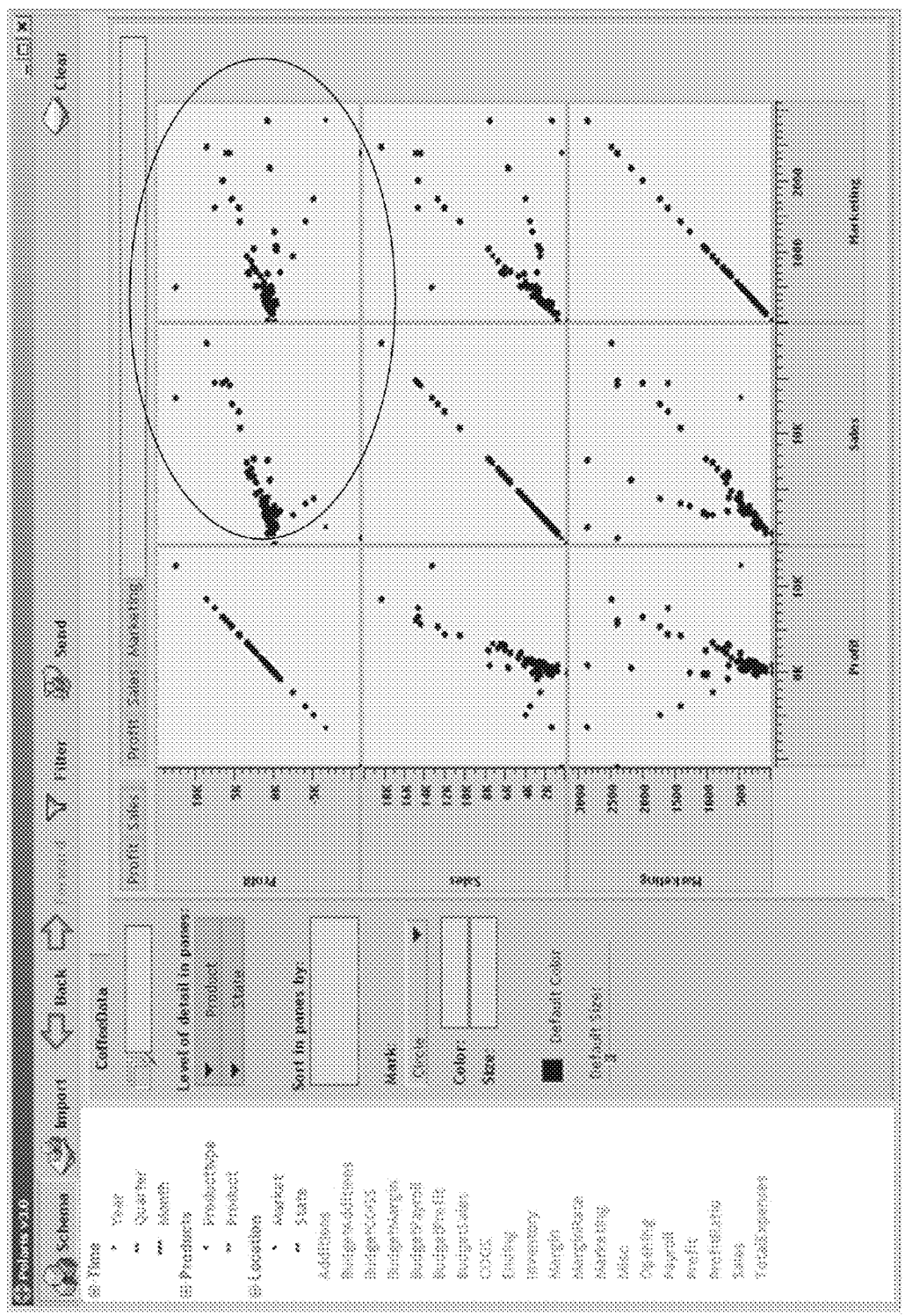
Figure 21B:
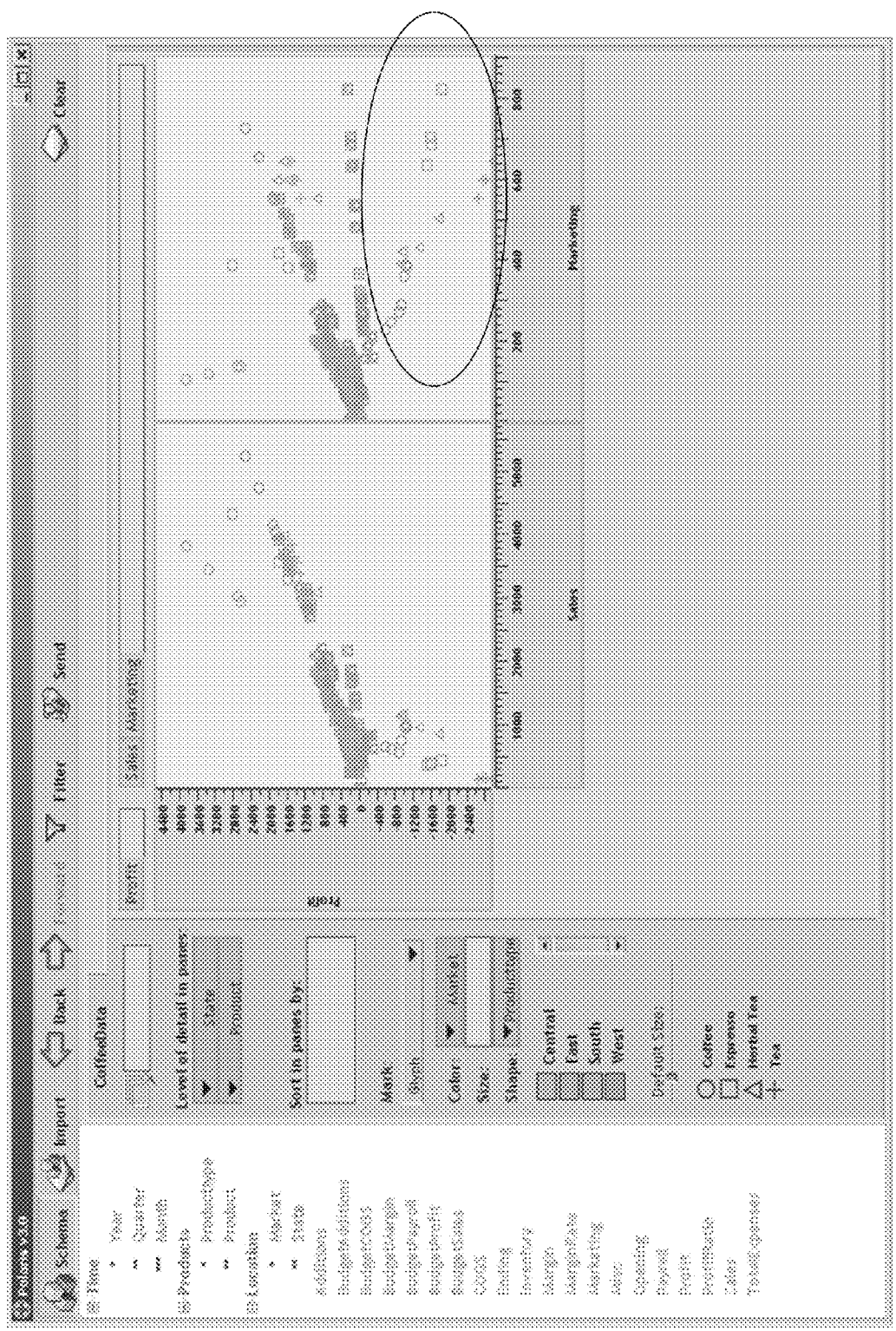
Figure 21C:
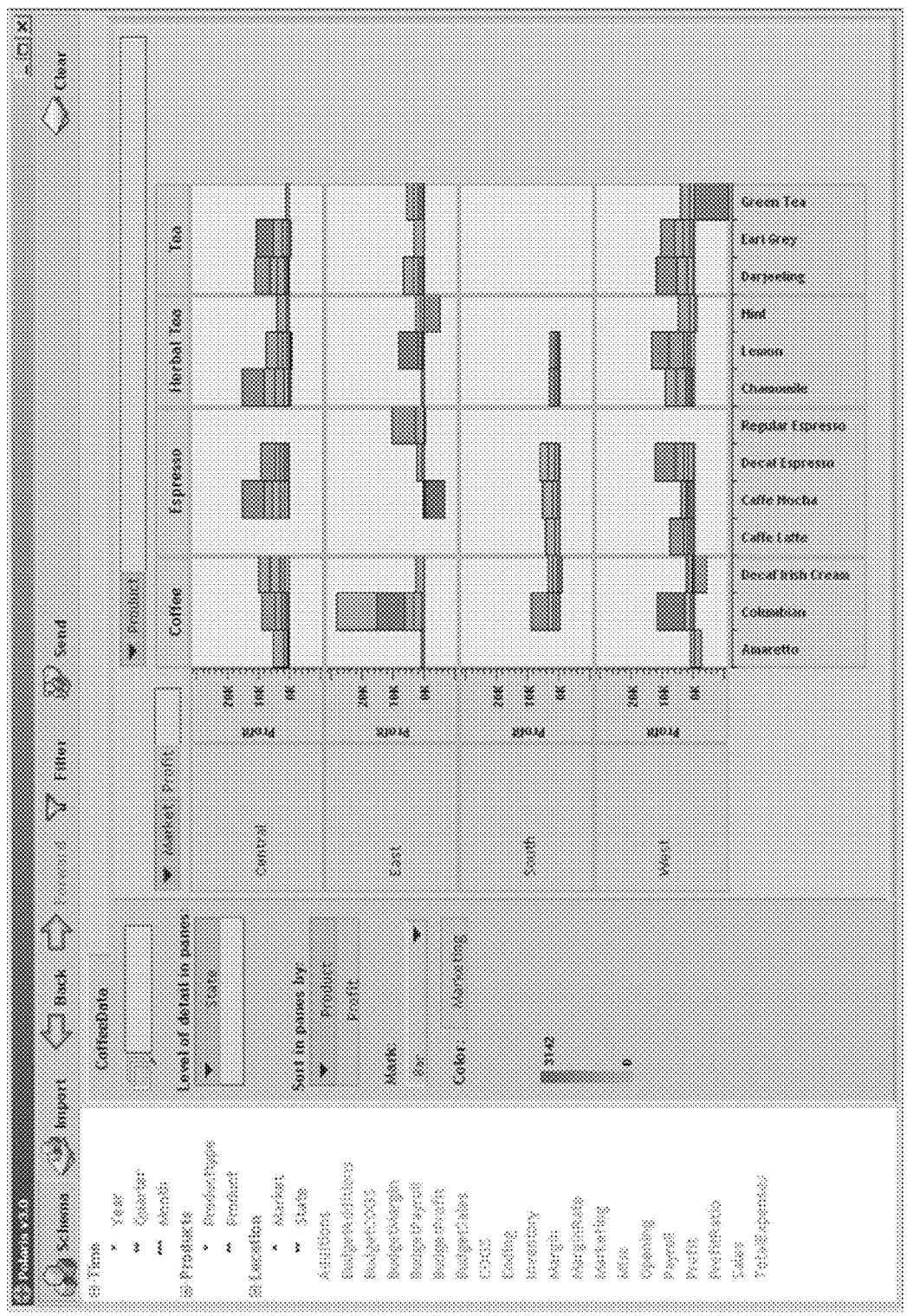

FIGS. 21A-21C illustrate an analysis of sales data for a hypothetical coffee chain in accordance with an embodiment of the present invention.

6. DETAILED DESCRIPTION OF THE INVENTION

The present invention provides a method for exploiting the hierarchical information present in databases in order to facilitate exploration of such databases. The present invention uses a novel formalism to accomplish this task. A user is allowed to enter a search query that is consistent with the novel formalism of the present invention. When such a search query is constructed, the systems and methods of the present invention take advantage of the formalism and the hierarchical information associated with the target database to service the query using fewer existence scans and other time consuming database functions than are found in known data exploration programs and techniques. Additional features and advantages of the present invention are disclosed in the following sections.

6.1 OVERVIEW OF AN EXEMPLARY SYSTEM

Figure 3:
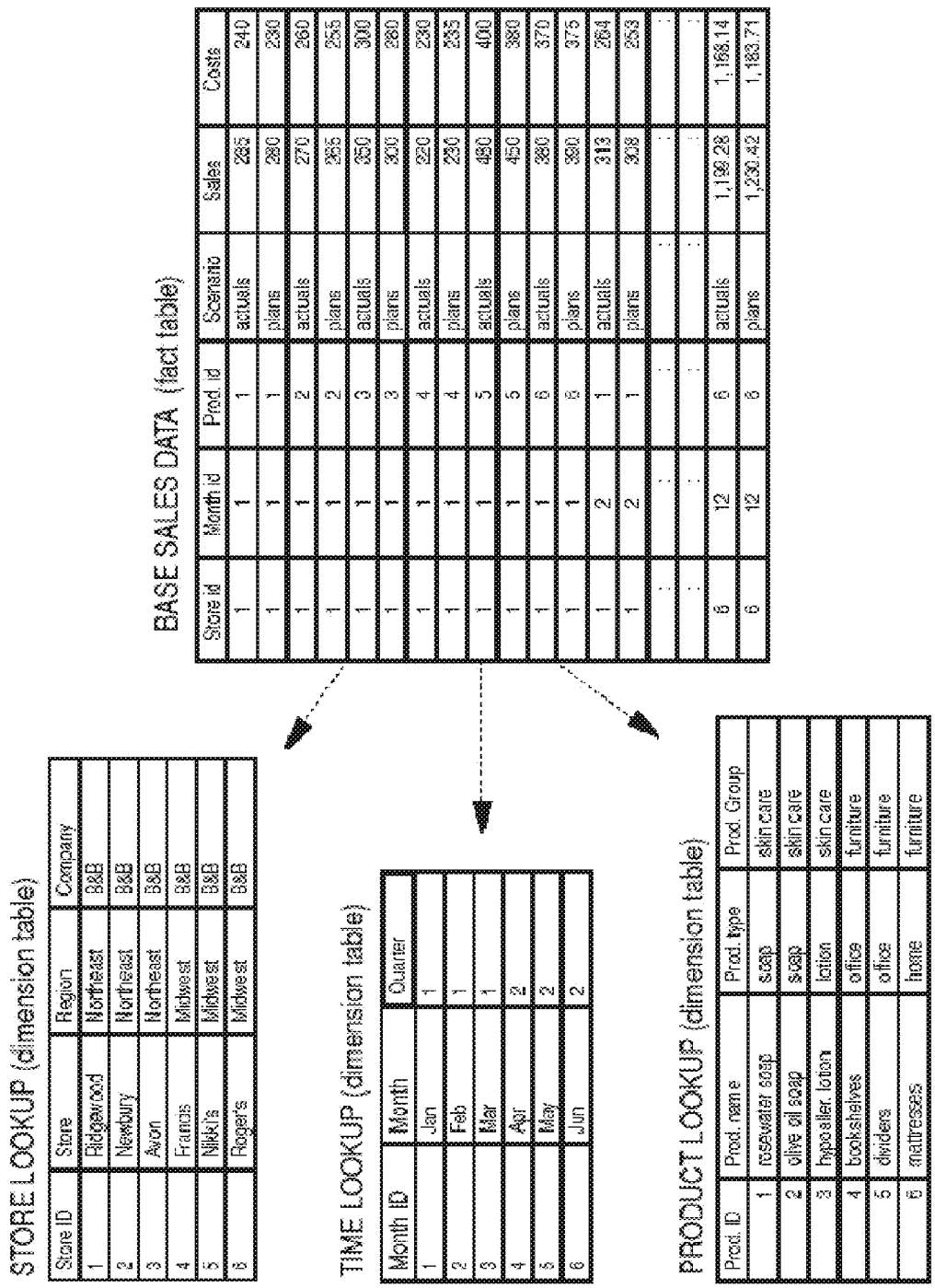
FIG. 3 illustrates a star schema for a database in accordance with the prior art.
Figure 4:
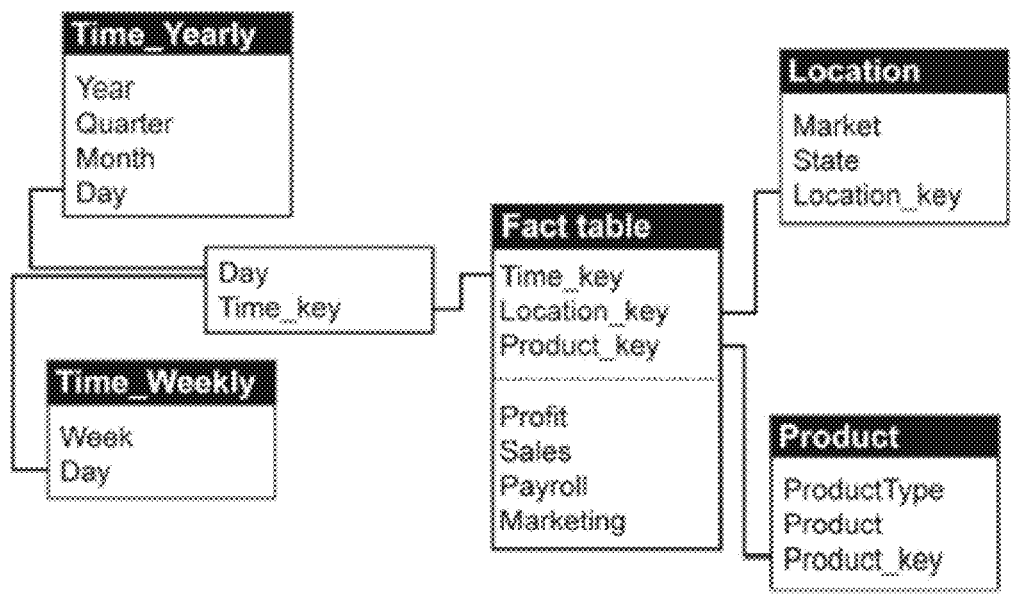
FIG. 4 illustrates a snowflake schema for a database in accordance with the prior art.
Figure 5:
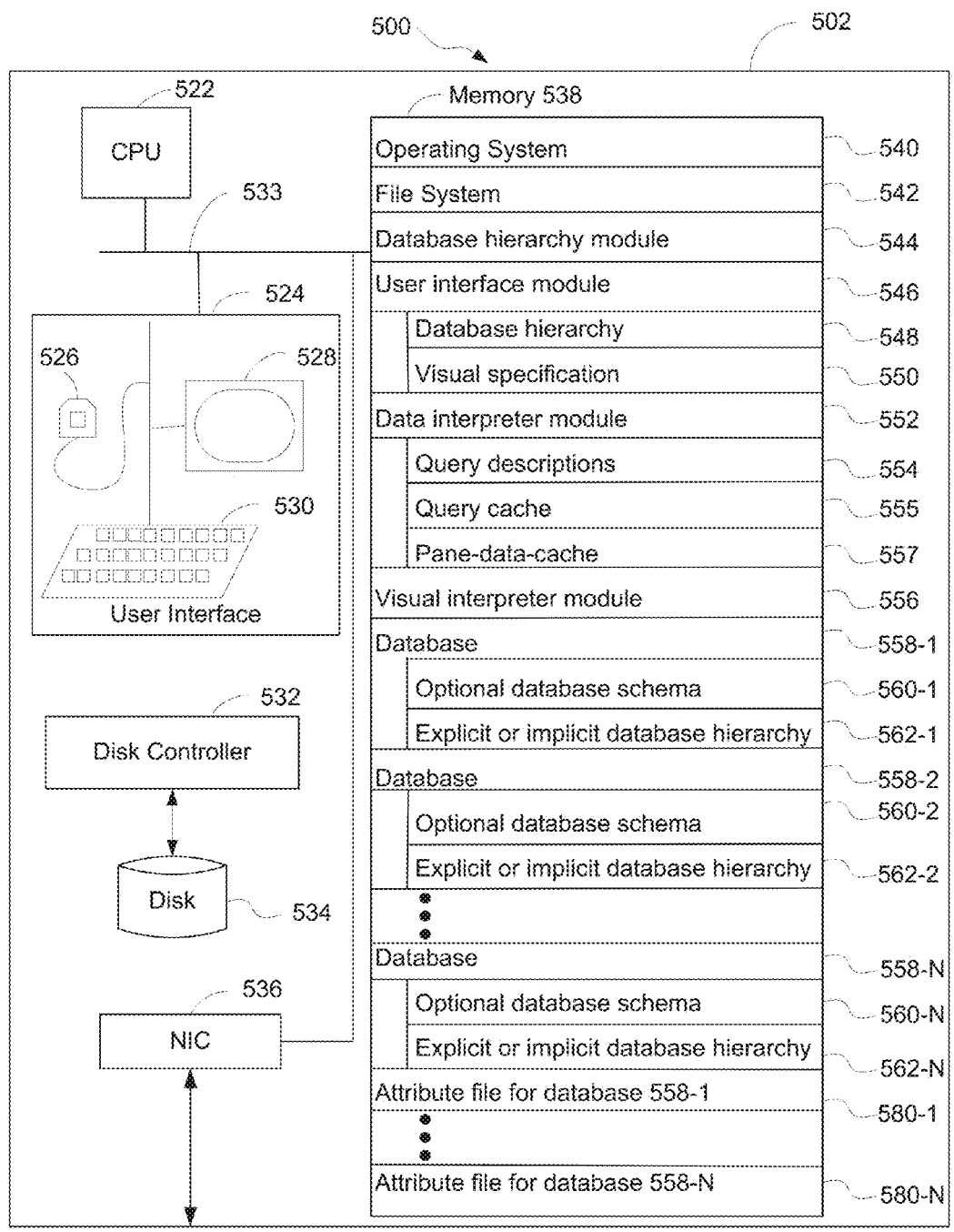
FIG. 5 illustrates a computer system that facilitates exploratory analysis of databases having a hierarchical structure in accordance with one embodiment of the present invention.

FIG. 5 shows a system 500 that facilitates exploratory analysis of databases, such as data warehouses, in accordance with one embodiment of the present invention.

System 500 preferably comprises a computer 502 that includes:

- a central processing unit 522;
- a main non-volatile storage unit 534, preferably including one or more hard disk drives, for storing software and data, the storage unit 534 typically controlled by disk controller 532;
- a system memory 538, preferably high speed random-access memory (RAM), for storing system control programs, data, and programs, including programs and data loaded from non-volatile storage unit 534; system memory 538 may also include read-only memory (ROM);
- a user interface 524, including one or more input devices, such as a mouse 526, a keypad 530, and a display 528;
- an optional network interface card 536 for connecting to any wired or wireless communication network; and
- an internal bus 533 for interconnecting the aforementioned elements of the system.

Operation of computer 502 is controlled primarily by operating system 540, which is executed by central processing unit 522. Operating system 540 can be stored in system memory 538. In addition to operating system 540, a typical implementation of system memory 538 includes:

- file system 542 for controlling access to the various files and data structures used by the present invention;
- database hierarchy module 544 for interpreting the hierarchy of a database 558 (e.g., by interpreting the database schema);
- user interface module 546 for obtaining a visual specification (specification) from the user (for constructing a visual table, comprised of one or more panes, by obtaining from a user a specification that is in a language based on the hierarchical structure of database 558);
- data interpreter module 552 for formulating database queries based on the specification (for querying database 558 to retrieve a set of tuples in accordance with the specification); and
- visual interpreter module 556 for processing database query results and displaying these results in accordance with the specification (for associating a subset of the set of tuples with a pane in the one or more panes).

In a preferred embodiment, user interface module 546 includes:

- a database hierarchy 548 that corresponds to the hierarchy of a database 558; and
- a visual specification 550 that specifies a formalism that can be used to determine the exact analysis, query, and drawing operations to be performed by the system.

In a preferred embodiment, data interpreter module 552 includes:

one or more query descriptions 554 that are used to query databases;

a query cache 555 that is used to store database query results; and a pane-data-cache 557 that is used to store a separate data structure for each pane 722 (FIG. 7) in a visual table 720 that is displayed by visual interpreter module 556.

System 500 includes one or more databases 558. In one embodiment, a database 558 is OLAP data that can be viewed conceptually as a multidimensional data cube. See, for example, Section 5.3. More generally, database 558 is any form of data storage system, including but not limited to a flat file, a relational database (SQL), and an OLAP database (MDX and/or variants thereof). In some specific embodiments, database 558 is-a hierarchical OLAP cube. In some specific embodiments, database 558 comprises star schema that is not stored as a cube but has dimension tables that define hierarchy. Still further, in some embodiments, database 558 has hierarchy that is not explicitly broken out in the underlying database or database schema (e.g., dimension tables are not hierarchically arranged). In such embodiments, the hierarchical information for the respective database 558 can be derived. For example, in some instances, database hierarchy module 544 reads database 558 and creates a hierarchy representing data stored in the database. In some embodiments, this external program is run with user input. In some embodiments, there is only a single database 558.

In typical embodiments, one or more of databases 558 are not hosted by computer 502. Rather, in typical embodiments, databases 558 are accessed by computer 502 using network interface 536. In some embodiments, an attribute file 580 is associated with each database 558. Attributes are discussed in Section 5.3.6, below.

It will be appreciated that many of the modules illustrated in FIG. 5 can be located on a remote computer. For example, some embodiments of the present application are web service-type implementations. In such embodiments, user interface module 546 can reside on a client computer that is in communication with computer 502 via a network (not shown). In some embodiments, user interface module 546 can be an interactive web page that is served by computer 502 to the client computer. Further, some or all of the components of visual interpreter module 556 can reside on the client computer so that the results of a query are displayed on the client computer. Thus, the present invention fully encompasses a broad array of implementations in which one or more users can explore one or more databases 558 using the techniques and methods of the present invention from a remote site. The illustration of the modules in FIG. 5 in a single central computer is merely presented to concisely illustrate certain software modules and data structures that are used in various embodiments of the present invention and in no way is limiting. Those of skill in the art will appreciate that numerous other configurations are possible and all such configurations are within the scope of the present invention.

Now that an overview of a system 500 in accordance with one embodiment of the present invention has been described, various advantageous methods in accordance with the present invention will now be disclosed in the following sections.

6.2 EXEMPLARY METHOD

Figure 6:
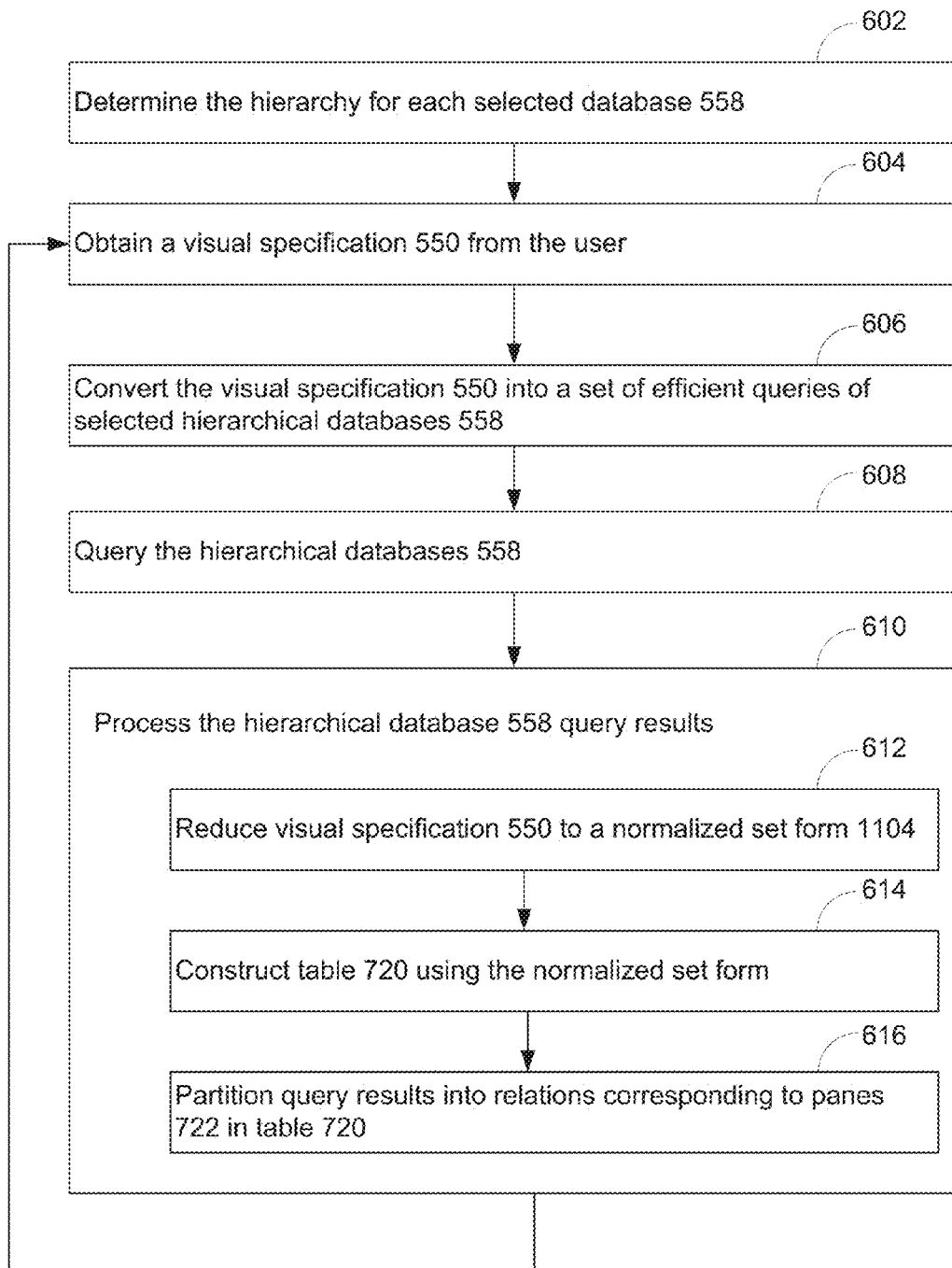
FIG. 6 illustrates processing steps in accordance with one embodiment of the present invention.

Referring to FIG. 6, an exemplary method in accordance with one embodiment of the present invention is illustrated.

Step 602. In step 602, the hierarchy for each selected database 558 is characterized. In embodiments in which selected databases 558 have a schema 560 that includes such hierarchical information; the schema 560 can be read directly by database hierarchy module 544 and the database hierarchy 562 in this schema 560 can be characterized. Section 5.3 discusses illustrative types of database hierarchy 562 and database organization. In some embodiments, a plurality of databases 558 is analyzed concurrently. In such embodiments, database schema 560 of each of the plurality of databases 558 is read directly by database module 544 and characterized. In some embodiments, selected databases 558 do not have a hierarchy that is explicitly defined in the underlying respective databases 558. In such embodiments, database hierarchy module 544 analyzes each selected database 558 and constructs database hierarchical information for each of the respective databases. In some instances, this analysis is assisted by input from a user and/or requires an analysis of the data stored in the database.

In some embodiments, the hierarchical structure of a database 558 is derived from a database schema for the database 558. This database schema comprises schema fields. In some embodiments each schema field has a type (e.g., a base type or an array type). Representative base types include, but are not limited to, character strings, integer, short integer, double integer, single precision floating number, double precision floating point number, and object handle. Representative array types include, but are not limited to an array of long integers, an array of short integers, an array of single precision floating point numbers, an array of double precision floating point numbers and an array of object handles.

Figure 7:
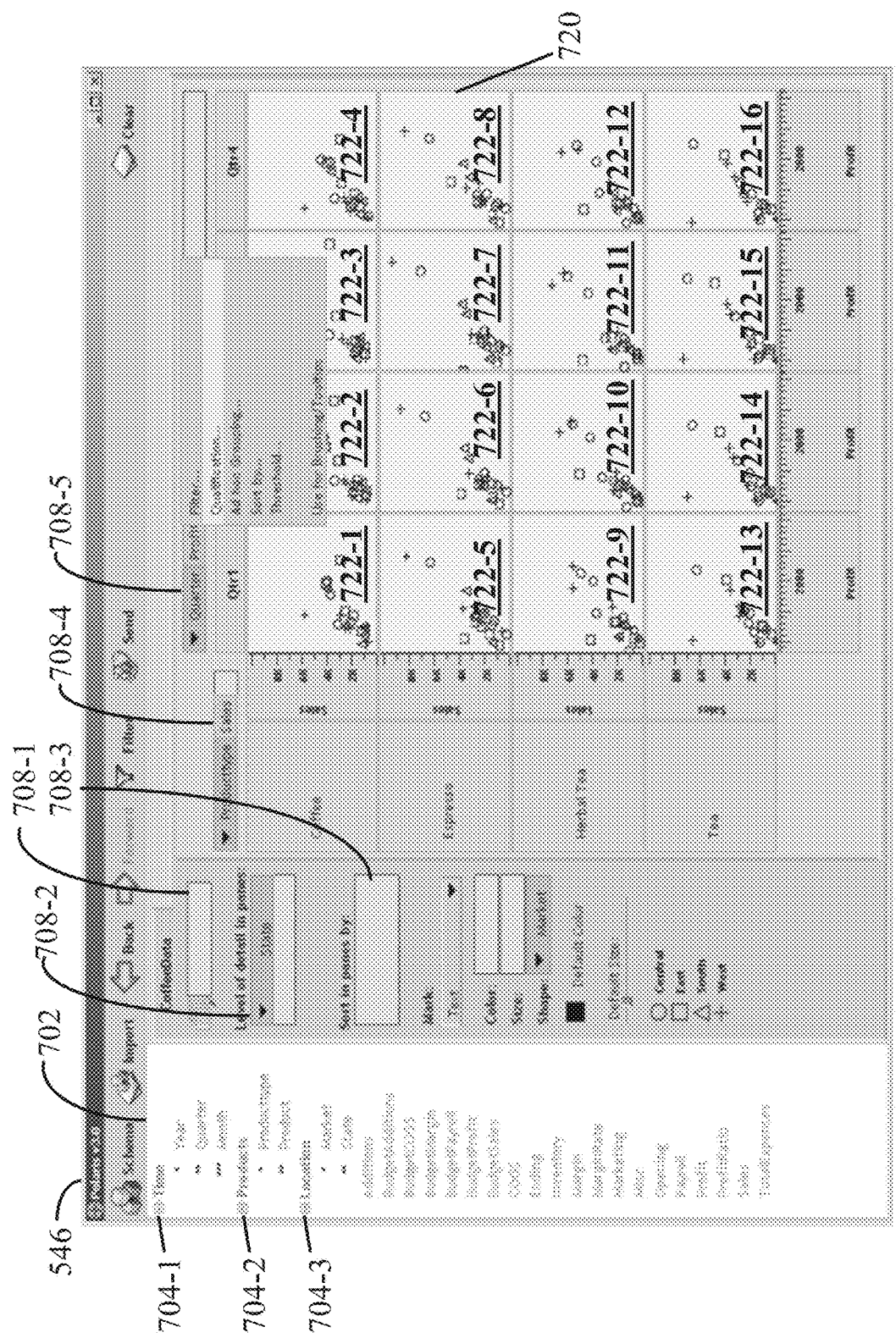
FIG. 7 illustrates a user interface for creating a visual specification in accordance with one embodiment of the present invention.

Step 604. In step 604, a visual specification (specification) 550 is obtained from the user by user interface module 546. In a preferred embodiment, visual specification 550 is created using a drag-and-drop interface provided by user interface module 546. An exemplary user interface module 546 is illustrated in FIG. 7. A user creates the visual specification by dragging operand names from schema box 702 to various shelves 708 throughout the interface. These operand names are derived from the hierarchical structure of each selected database 558 that was characterized in step 602. For example, one of the dimensions available for exploration in the database could be "time." Then, likely operand names available in schema box 702 would be "year", "quarter", "month", and "day". Each of these operand names is referred to as a type tuple. In some embodiments, more than one database 602 is characterized in step 602. Further, specification 550 can comprise a first element of the hierarchical structure of a first database 558 characterized in step 602 and a second element of the hierarchical structure of the second database characterized in step 602. The first element comprises a type tuple that is derived from the first database 558 and the second element comprises a type tuple that is derived from the second database 558.

Schema box 702 of FIG. 7 includes a representation of the database schema for each of the one or more databases 558 being analyzed. Schema box 702 includes each dimension 704 represented in each schema 560 of each database 558 that is being analyzed. For example, in FIG. 7, a single database that includes the dimensions "time" 704-1, "products" 704-2, and "location" 704-3 is analyzed. An ordered list of the dimension's levels is placed below each dimension. For example, in the case of time 704-1, the ordered list includes the dimension levels "year", "quarter", and "month". In the case of products, the ordered list includes the dimension levels "producttype" and "product". In the case of location, the ordered list includes the dimension levels "market" and "state".

A user can drop any dimension level into the interface of shelves 708. However, the dimensions 704 cannot be dragged into the shelves. Shelves 708-4 and 708-5 are the axis shelves. The operands placed on shelves 708-4 and 708-5 (e.g., year, quarter, month, producttype, product, market, state) determine the structure of visual table 720 and the types of graphs that are placed in each pane 722 of visual table 720. For example, in FIG. 7, the value "sales", which belongs to the dimension "Producttype" has been placed on shelf 708-4. Therefore, the y-axis of visual table 720 is a breakdown of the sales of each "producttype". Valid product types include "coffee", "espresso", "herbal tea", and "tea." Thus, the y-axis of visual table 720 represents the sale of each of these products. In FIG. 7, the value "profit", which belongs to the operand "Quarter" (which is part of the dimension "time") has been placed on shelf 708-5. Thus, the x-axis of visual table 720 represents profit. Level of detail shelf 708-2 has been set to state. Accordingly, each mark in each pane 722 in visual table 720 represents data for a particular state.

The configuration of operands on shelves 708 (FIG. 7) forms the visual specification 550 (FIG. 5). At a minimum, a visual specification 550 includes an x-axis expression and a y-axis expression. More typically, a visual specification 550 further includes a z-axis expression, which is placed on shelf 708-1, and a level of detail expression 708-2. A representative visual specification 550 is provided in FIG. 11 (element 550). The visual specification includes the following expressions:

$x: C^*(A+B)$ $y: D+E$ $z: F$ and the level of detail within each pane 722 is set to:
level of detail: G In some embodiments, a user can specify any of the algebra (e.g., ordinal concatenation, etc.) described in Section 5.4. In some embodiments, a user types in the algebra directly using a user interface such as the one illustrated in FIG. 7, includes it in a file that is then interpreted, or uses some other form of data entry known in the art.

In some embodiments, each shelf 708 that represents an axis of visual table 720 is translated into corresponding expressions in an automated manner. For example the contents of the shelf 708 that represents the x-axis is translated into an expression that represents the x-axis of visual table 720, the shelf 708 that represents the y-axis is translated into an expression that represents the y-axis of visual table 720, and the shelf 708 that represents layers is translated into an expression that represents the z-axis of visual table 720. The contents of each axis shelf 708 is an ordered list of database field names. In some embodiments, the order of the database field names is constrained such that all nominal and ordinal fields precede all quantitative fields in the shelf Exemplary nominal fields include, but are not limited to, products, regions, account numbers or people. Exemplary ordinal fields include, but are not limited to, dates or priority rankings. Exemplary quantitative fields include, but are not limited to, profit, sales, account balances, speed or frequency. In embodiments where the order of the database field names is constrained such that all nominal and ordinal fields precede all quantitative fields in the shelf 708, the nominal fields are assigned an ordering and treated as ordinal. This ordering is either a natural ordering (e.g., alphabetic, numeric) or an ordering specified by the user. Then, the list of fields in a respective shelf are transformed into an expression of the form $(O_1 \times O_2 \ldots \times O_n) \times (Q_1 \times Q_2 \ldots \times Q_m)$ In addition, if any two adjacent categorical fields represent levels of the same dimension then the cross "x" operator (see Section 5.4.22) between them is replaced with a dot "." operator (see Section 5.4.2.4). The specification is used to map data values from a database 558 to visual properties by visual interpreter module 556. Further shelves labeled "Group4 in panes by" (not shown) and "Sort in panes by" (708-3, FIG. 7) define the "Group" and "Sort Order" components of the visual specification.

In some embodiments, the specification is written in a language that is based on the metadata (e.g., hierarchical structure) of the one or more databases 558 that were characterized in step 602. At a minimum, this language comprises all or a portion of the dimension levels that make up the hierarchies of the one or more databases 558. Examples of dimension levels (e.g., year, quarter, month, etc.) have been described. Typically, these dimensional levels are displayed on user interface 524 as illustrated in FIG. 7. In some embodiments, the language further includes a table algebra, such as the algebra described in Section 5.4 below, that allows the user to form complex visual tables comprised of one or more panes 722 (FIG. 7). In embodiments where the specification 550 makes use of the table algebra in the form of an algebraic expression, the specification includes at least one operand. An operand is a dimension level or a measure/quantitative variable from the database schema (or other database metadata) that has been selected for inclusion in the algebraic expression. In addition to the at least one operand, the algebraic expression includes one or more operators that represent operations on the metadata of the one or more databases 558 that were characterized in step 602. Examples of such operators include, but are not limited to, relational operators such as cross product (Section 5.4.2.2), union, selection, or sorting. Other examples of operations include, but are not limited to, the nest operator (Section 5.4.2.3) and the dot operator (Section 5.4.2.4). The nest operator analyzes a fact table within a database whereas the dot operator analyses a dimension table (or equivalent data structure) associated with a database 558 that defines the database 558 hierarchy. Analysis of the fact table by the nest operator (Section 5.4.2.3) or the dimensional table (or equivalent data structure) by the dot operator (Section 5.4.2.4) represents an operation on the hierarchical structure of the associated database 558. The operations and operators within the algebraic expressions can be nested. For example, in one embodiment, parentheses are used to alter the order in which operators are considered.

In a preferred aspect of the present invention, visual specification 550 organizes panes 722 into a plurality of rows and a plurality of columns. In embodiments in accordance with this aspect of the invention, visual specification 550 includes a first algebraic expression for the plurality of rows and a second algebraic expression for the plurality of columns. Both the first algebraic expression and the second algebraic expression each represent an operation on the metadata of a database 558 (e.g., hierarchical structure) that was characterized in step 602. In some instances in accordance with this aspect of the invention, the specification further organizes one or more panes 722 into a plurality of layers. To accomplish this, the specification 550 further comprises a third algebraic expression for the plurality of layers. The third algebraic expression represents an operation on the metadata of one or more of the databases 558 that were characterized in step 602. For example, the first two algebraic expressions could cover revenue for all products whereas the third algebraic expression could add the dimension "State" such that each layer represents the revenue by product for each state.

Using the methods of the present invention, each visual specification 550 can be interpreted to determine the exact analysis, query, and drawing operations to be performed by system 500. In a preferred embodiment, drawing operations are performed independently in each pane 722 of visual table 720.

Visual table 720 includes three axes. The x and y axes are respectively determined by shelves 708-5 and 708-4, as discussed above. The z axis is determined by shelf 708-1 (FIG. 7). Each intersection of the x, y, and z-axis results in a table pane 722. Each pane 722 contains a set of records, obtained by querying a database 558, that are visually encoded as a set of marks to create a visual table. While shelves 708-1, 708-4, and 708-5 determine the outer layout of visual table 720, other shelves 708 in display 700 determine the layout within a pane 722. In some embodiments, this inner layout includes the sorting and filtering of operands, the mapping of specific databases 558 to specific layers in the z axis of visual table 720, the grouping of data within a pane 722 and the computation of statistical properties and derived fields, the type of graphic displayed in each pane 722 (e.g., circles, bars, glyphs, etc.), and the mapping of data fields to retinal properties of the marks in the visual tables (e.g., mapping "profit" to the size of the mark and mapping "quarter" to color).

Step 606. In step 606, a set of efficient queries is formed by data interpreter module 552 based on specification 550. Before generating database specific queries, data interpreter module 552 generates a set of one or more abstract query descriptions 554 that describe the required queries using the values specified in visual specification 550 (e.g., values placed on shelves 708-1; 708-4, and 708-5). Query descriptions 554 precisely describe the desired filtering, sorting, and grouping of tuples from database 558.

The number of distinct query descriptions 554 that are generated for a single visual specification 550 is determined by the level of detail specified in visual specification 550. For example, visual table 720 (FIG. 10) shows a simple-text based visual table 720 that requires two separate queries to generate because of the use of the concatenation operator in the y-axis expression. In some embodiments, the level of detail within a pane 722 in a visual table 720 is determined by both the level of detail shelf 708-2 and the table algebra expressions formed in shelves 708-1, 708-4, and 708-5 (FIG. 7).

Although it is possible for each pane 722 to correspond to a different level of detail, and thus a different query, the common situation is for a larger number of panes 722 (FIG. 7) to correspond to the same level of detail and differ only by how the tuples are filtered. For efficiency, it is preferred to consider panes 722 that require the same level of detail as a group and send a single query to a database 558 requesting the appropriate tuples. The tuples can then be partitioned into panes 722 locally in subsequent processing steps. Accordingly, in one aspect of the invention, database queries are grouped. In some embodiments, this is accomplished by algebraically manipulating visual specification 550 in order to determine the queries that are required for a given visual table 720. Of all the algebraic operators used in the algebra of the present invention (see, for example, Section 5.4, below), the operator that can produce adjacent panes 722 with differing projections or level of detail is the concatenate operator. Nest, cross, and dot, described in more detail in Section 5.4, below, include all input dimension levels in each output p-tuple. Concatenate does not. Thus, if each axis expression in the visual specification 550 is reduced to a sum-of-terms form, the resulting terms will correspond to the set of queries that need to be retrieved from one or more databases 558.

To illustrate the sum-of-terms reduction of each axis, consider exemplary visual specification 550 in FIG. 11, in which:

$$x: C*(A+B)$$

$$y: D+E$$

$$z: F$$

and the level of detail within each pane 722 is set to G. Crossing these expressions, in accordance with the table algebra specified in Section 5A, below, and then reducing to a sum-of-terms form yields:

$$(A*C*D*F*G)+(A*C*E*F*G)+(B*C*D*F*G)+(B*C*E*F*G)$$

Thus, in this example, the following four database queries are made:

| | |
|---|---:|
| $(A*C*D*F*G)$ | Query 1 |
| $(A*C*E*F*G)$ | Query 2 |
| $(B*C*D*F*G)$ | Query 3 |
| $(B*C*E*F*G)$ | Query 4 |

Most typical multidimensional query languages provide a mechanism for generating queries of the form found in queries 1-4. For example, each of queries 1-4 can be a single multidimensional expressions (MDX) query. MDX (Microsoft, Redmond Wash.), is a syntax that supports the definition and manipulation of multidimensional objects and data. MDX is similar to the structured query language (SQL) syntax, but is not an extension of the SQL language. As with an SQL query, each MDX query requires a data request (SELECT clause), a starting point (FROM clause), and a filter (WHERE clause). These and other keywords provide the tools used to extract specific portions of data from a hierarchical database (e.g., a cube) for analysis. In summary, each query can map to a relational algebra operator such as an SQP query or to a datacube query (e.g., an MDX query).

Now that an overview of how visual specification 550 is reduced to an efficient set of queries has been presented, a detailed algorithm used in one embodiment of the present invention will be described. The algorithm is set forth in the following pseudo code:

101: x-terms=List of terms from the sum-of-terms form of the x-axis expression
    102: y-terms=List of terms from the sum-of-terms form of the y-axis expression
    103: z-terms=List of terms from the sum-of-terms form of the z-axis expression
    104: for each layer {
    105: for each x-term in x-terms{
    106: for each y-term in y-terms {
    107: for each z-term in z-terms {

108: p-lookup PaneLookupDescriptor(x-term, y-term, z-term)
109: p-spec=The PaneSpecification that applies to p-lookup
110: qd=new QueryDescription
111: Add to qd all fields in x-term
112: Add to qd all fields in y-term
113: Add to qd all fields in x-term
114: Add to qd all level of detail fields in p-spec
115: Add to qd all drawing order fields in p-spec
116: Add to qd all encoding fields in p-spec
117: Add to qd all selection (brushing tooltips) fields in p-spec
118: Add to qd all filters in the visual specification involving the fields in qd
119: if (qd matches data in data-cache)
120: results=retrieve data from data-cache
121: else
122: results=retrieve data from database server
123: add results to data-cache indexed by qd
124: group-tic=create GroupingTransform
125: run group-tsf
126: Add each output data structure from group-tsf to pane-data-cache}}}

Lines 101 through 103 of the pseudo code represent the case in which each axis of visual specification 550 is reduced to the sum-of-terms. Then, lines 104 through 107 are used to individually consider each of the terms i. Individually, each term i describes either a set of rows, a set of columns, or a set of layers in visual table 720. Together, the terms define a set of panes 722 that appears as "for each x-term, y-term, z-term combination".

Lines 108 and 109 are used to find the pane specification, which defines the marks, encodings, etc., for the panes 722 defined by a particular x-term, y-term, z-term combination. This is done by testing p-lookup against the selection criteria predicate in each pane specification in the visual specification.

Lines 110 through 118 build a query for the particular x-term, y-term, z-term combination. Line 110 creates the variable "qd" to hold the query and lines 111 through 113 add all the fields in the x-term, the y-term, and the z-term in the particular x-term, y-term, z-term combination. Lines 114 through 118 add additional terms from visual specification 550, such as level of detail, to the query.

Next, in lines 119 through 122, a determination is made as to whether a query of the form built by lines 110 through 118 already exists in the data-cache (query cache 555, FIG. 5). If so, the result is retrieve from the data cache (line 120, from query cache 555, FIG. 5). If not, the server that hosts the target database 558 is queried (line 122) using the query built by lines 110 through 118. If such a database query is made, data interpreter module 552 will formulate the query in a database-specific manner. For example, in certain instances, data interpreter module 552 will formulate an SQL query whereas in other instances, data interpreter module 552 will formulate an MDX query. In line 123, the results of the query are added to the data-cache (to query cache 555, FIG. 5).

The data retrieved in the processing steps above can contain data for a set of panes 722. When this is the case, the data is partitioned into a separate data structure for each pane 722 using a grouping transform (lines 124-125) that is conceptually the same as a "GROUP BY" in SQL except separate data structures are created for each group rather than performing aggregation. In line 126, each output data structure from group-tsf is added to pane-data-cache 557 (FIG. 5) for later use by visual interpreter module 556.

Step 608. In step 608, the queries developed in step 608 are used to query one or more databases 558. Such databases 558 can be stored in memory 548. However, in a more preferred embodiment, these databases 558 are stored in a remote server.

Step 610. In step 610, visual interpreter module 556 processes queries that have been generated by data interpreter module 552. A number of steps are performed in order to process these queries. An overview of these steps is illustrated in FIG. 11. In step 612, visual specification 550 is reduced to a normalized set form 1104. In step 614, visual table 720 is constructed using the normalized set form. In step 616, the query results are partitioned into tuples corresponding to the panes 722 in visual table 720. Each of these steps will now be described in further detail so that the advantages of the present invention can be appreciated.

Step 612—reduction of the visual specification to the normalized set form. In step 604, visual specification 550 was obtained by user interface module 546. The visual specification 550 comprises the values of shelves 708 that have been populated by the user. In step 612, visual specification 550 is used to construct algebraic expressions that define how visual table 720 is partitioned into rows, columns, and layers, and additionally defines the spatial encodings within each pane 722 of visual table 720. In this way, visual specification 550 organizes one or more panes 722 into a plurality of rows and a plurality of columns. In some embodiments, the plurality of rows and plurality of columns is hierarchically organized. Further, in some embodiments specification 550 also organizes the one or more panes 722 into a plurality of layers that are optionally hierarchically organized. Further still, in some embodiments, the specification organizes the one or more panes 722 into separate pages that are, optionally, hierarchically organized.

A complete algebraic expression of visual table 720 is termed a "table configuration." In other words, in step 612, the three separate expressions of visual specification 550 that respectively define the x, y, and z axes of visual table 720 are normalized to set form (set interpreted) in order to partition the row, columns and layers of visual table 720. To produce the normalized set form, each operand in the three separate expressions is evaluated to set form. The operators in each expression define how to evaluate each set within an expression. Thus, normalization to set form results in a single set (the normalized set form), where each element in the normalized set form corresponds to a single row, column, or layer of visual table 720. In some embodiments, this normalization process is extended to yet another dimension, termed "pages".

Recall that each expression in the three separate expressions of visual specification 550 that define the x, y, and z axis are drawn from operands (e.g., fields) in the database schema. The algebra used to produce the normalized set form characterizes each of the operands in a database schema (or some other representation of database structure) into two types: dimension levels and measure. Whether an operand is a dimensional level or a measure depends on the type of the operand. The set interpretation of an operand consists of the members of the order domain of the operand. The set interpretation of the measure operand is a single-element set containing the operand name. For example, the set interpretation of the "Profit" operand is {Profit}.

Figure 8:
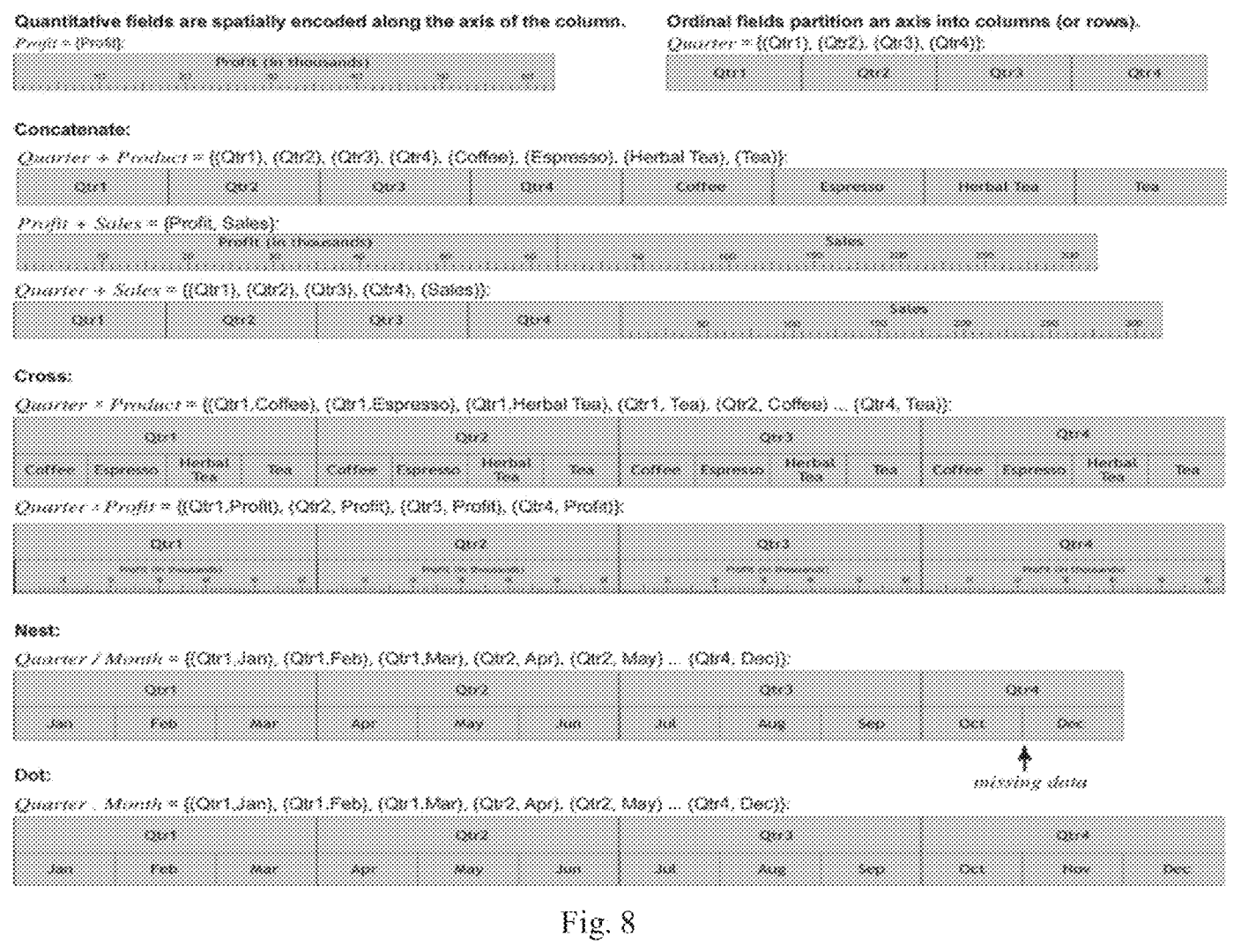

The assignment of sets to the different types of operands reflects the difference in how the two types of operands are encoded into the structure of visual table 720. Dimensional level operands partition the table into rows and columns, whereas measure operands are spatially encoded as axes within table panes. Examples of the set interpretations and resulting table structures for representative expressions are illustrated in FIG. 8.

A valid expression in the algebra used in the present invention is an ordered sequence of one or more operands with operators between each pair of adjacent operands. The operators in this algebra, in order of precedence are cross (x), nest (/), and concatenation (+). Parentheses can be used to alter the precedence. Because each operand is interpreted as an ordered set, the precise semantics of each operator is defined in terms of how they combine two sets (one each from the left and right operands) into a single set, as illustrated in FIG. 8.

Thus, every expression in visual specification 550 can be reduced to a single set, with each entry in the set being an ordered concatenation of zero or more dimension level values followed by zero or more measure operand names. For example, the normalized set form of the expression "Month×profit" is {(Jan, Profit), (Feb, Profit), . . . , (Dec, Profit)}. The normalized set form of an expression determines one axis of visual table 720. The table axis is partitioned into columns (or rows or layers) so that there is a one-to-one correspondence between columns and entries in the normalized set.

Now that an overview of step 612 has been described, an example will be given. Consider the exemplary visual specification 550 of FIG. 11:

$x: C*(A+B)$ $y: D+E$ $z: F$

Computation of the normalized set form of this visual specification, in accordance with step 612 provides:

$x: \{(c_1,a_1) \ldots (c_k,b_j)\}$ $y: \{(d_1), \ldots ,(d_l),(e_1), \ldots ,(e_m)\}$ $z: \{(f_1) \ldots (f_n)\}$ Advantageously, the algebraic formalisms of the present invention can make use of an operator, termed the dot operator, that is specifically designed to work with dimension levels. Thus, the algebraic formalisms provide direct support for the use and exploration of database hierarchy in the present invention. One of the advantages of the dot operator is that it can deduce hierarchical information without analyzing database fact tables. Further advantages of the dot operator are discussed in Section 5.4.2.4, below.

Step 614—construction of visual table 720 using the normalized set form. In step 614 (FIG. 6, FIG. 11), visual interpreter 556 constructs visual table 720 using the normalized set form of the expressions for the x, y, and z-axis obtained from visual specification 550. Each element in the normalized set form of the expressions for the x, y, and z-axis corresponds to a single row, column or layer.

FIG. 12 illustrates the configuration for a visual table 720 that has been generated from the normalized set form of a visual specification. FIG. 12 displays Profit information for the coffee chain data set (COFFEE). The y-axis is defined by the expression Profit+(Market×ProductType) and the x-axis is defined by the expression (Quarter/Month). The z-axis is not illustrated in FIG. 12.

As illustrated in FIG. 12, expressions 1202 and 1204 are composed of operands connected by operators. Each operand is evaluated to a mathematical sequence of p-tuples (the set interpretation). A mathematical sequence is an ordered list of elements that allows duplicate members. The operators between each operand define how to combine two sequences. Thus, each expression can be interpreted as a single sequence (the normalized set form), where each element in the sequence corresponds to a single row, column, or layer.

In some embodiments, the normalized set form generated in step 612 is more formally defined as p-entries and p-tuples. The set interpretation of an operand is a 0 finite (possibly empty) sequence of heterogeneous p-tuples. Each p-tuple in a set interpretation defines a row (or column or layer) of visual table 720. In other words, each p-tuple maps to a row, a column, or a layer in visual table 720. A p-tuple is a finite sequence of p-entries. A single p-tuple defines a single row (or column or layer). The entries of a p-tuple define the spatial encoding (axis) within the row and the selection criteria on the fact table of a database 558. A p-entry is an ordered "tag-value" pair where the tag defines the meaning and possible values of the value member of the pair. A p-entry will be written as tag:value; e.g., field:Profit. A tag can be a field, constant, or field name, as discussed in further detail in Section 5.4. In some embodiments, the panes 722 of the row, column, or layer to which an N:t ordered set of tuples (p-tuple) is mapped are ordered within the row, column, or layer in visual table 720 in the same order that is presented in the p-tuple.

In summary, each axis of visual table 720 is defined by an expression from visual specification 550 that has been rewritten in normalized set form. The cardinality of this normalized set determines the number of rows (or columns or 5 layers) along the axis, with the exception of when the normalized set is the empty sequence. In a preferred embodiment, when the normalized set is an empty sequence, a single row or column is created rather than zero rows or columns. Each p-tuple within the normalized set defines a row (or column or layer). The p-entries within each p-tuple define both a selection criterion on the database 558 fact table, selecting tuples to be displayed in the row, and the spatial encoding in the row, defining the positions of the graphical marks used to visualize the database tuples. More information on the set interpretation is found in Section 5.4, below.

In some embodiments visual table 720 is presented as a web interface. In some embodiments, all or portions of user interface Module 546 are run and displayed on a remote user computer in order to facilitate the presentation of visual table 720 as a web interface.

Step 616—partition query results into tuples corresponding to panes 722 in visual table 720. In step 616 (FIG. 6, FIG. 11) visual interpreter module 556 processes query results that are returned by data interpreter module 552. These query results are referred to as tuples. In some embodiments of the present invention visual interpreter module 556 performs the following algorithm:

201: x-set compute normalized set form of x-axis expression
    202: y-set compute normalized set form of y-axis expression
    203: z-set compute normalized set form of z-axis expression
    204: for each x-entry in x-set
    205: for each y-entry in y-set
    206: for each z-entry in z-set {
    207: p-lookup=new PaneLookupDescriptor(x-entry, y-entry, z-entry)

208: p-spec=The PaneSpecification that applies to p-lookup
209: create the pane graphic
210: create the primitive object for rendering tuples
211: create the encoding objects for the visual properties and add to primitive object
212: create the per-pane transform that sorts tuples into drawing order
213: retrieve the data from the pane-data-cache using p-lookup
214: bind the data from the pane-data-cache using p-lookup
215: bind the pane to the data}}}

Lines 201 through 203 are performed in step 612 (FIG. 6). Lines 204 through 206 are a triple "for" loop to individual consider each pane 722 in visual table 720. For each pane i, lines 207-214 are performed.

In lines 207 and 208, the pane specification for pane i is located. The pane specification is ultimately derived from visual specification 550. The pane specification for pane i defines the mark, encodings, etc., for the pane.

In lines 209-212, the pane graphic of pane i is created using the pane specification that applies to pane i, in line 210, primitive objects for rendering triples within pane i are created. An example of a pane primitive object is a bar in a bar chart. In line 211, the encoding objects for the visual properties of each respective primitive object created in line 210 are created and added to the corresponding primitive objects. Exemplary encoding objects in the case of a bar are color and size of the bar. In line 212, the per-pane transform that sorts tuples into drawing order is applied. In other words, the per-pane transform is used to describe how tuples will be displayed in pane i.

In line 213, the data for pane i is retrieved from pane-data-cache 557 using p-lookup. In lines 214-215, the data (e.g., a subset of the set of tuples that were retrieved from a query of database 558) for pane i is bound to pane i. In this way, data from a query of database 558 is bound to visual table 720 by visual interpreter module 556.

In other words, in lines 209-212 a tuple in a subset of tuples associated with pane i is encoded as a graphical mark. In some instances, the tuple in the subset of tuples comprises a field that is then mapped to a graphical attribute (e.g., a color, a value, a size, a shape, a phrase, or a symbol). In some embodiments, the field is classified as quantitative or ordinal and (i) when the field is classified as quantitative, it is mapped to a first graphical attribute and (ii) when the field is classified as ordinal it is mapped to a second graphical attribute. In some embodiments the field is classified as independent or dependent and (i) when the field is classified as independent, it is mapped to a first graphical attribute and (ii) when the field is classified as dependent it is mapped to a second graphical attribute. The first and second attribute are each independently a color, a value, a size, a shape, a phrase or a symbol.

In some embodiments, the subset of tuples associated with pane i is determined by a selection function. In some embodiments, the selection function uses an identity of a schema field that is present in the metadata of the database 558 characterized in step 602 to form the subset of tuples. For example, the specification may assign all tuples that belong to a specific schema field type to pane i. In some embodiments, the selection function uses a relational operator (e.g., a selection operator or a grouping operator) to form the subset of tuples associated with pane i. Further, the ordering of rows and columns in visual table 720 can be controlled and filtered as well.

The algorithm described in lines 201 through 215 assumes that each query of 558 is available in a pane-data-cache 557. Recall that an important advantage of the present invention is that queries are typically grouped across several panes. Thus, queries need to be partitioned into a separate table for each pane and then placed in the pane-data-cache 557. While the present invention imposes no limitation on which software module performs this grouping transformation, in one embodiment of the present invention, the grouping transformation is performed by data interpreter module 552 as part of a generalized algorithm for querying databases 558. See, for example, the algorithm described in step 606, above.

In some embodiments of the present invention, step 608 returns a set of tuples. Next, in step 610 a new tuple is derived from the set of tuples. This new tuple is then incorporated into the set of tuples for possible association with one or more panes 722 in the graphic that is specified by visual specification 550. In some instances a relational operator (e.g., a sorting operator, an aggregation operator, or a transforming operator) is used to create the new tuple. An example of this is an additional transformation that is performed to augment the query language. For example, it is known that an MDX query can easily aggregate all twelve months of a year into year total and then, say, aggregate multiple years into a multi-year total because this aggregation occurs up and down the hierarchy. But MDX cannot easily aggregate across a hierarchy (e.g., the totals for all Januaries regardless of the year). The present invention allows for aggregation across a hierarchy by applying one or more local transformations to a set of returned tuples (e.g., a set of tuples returned from one or more MDX queries). For example, in order to obtain totals for all Januaries regardless of year, one or more MDX queries are made to obtain the relevant tuples and then the month of January is aggregated across respective years in the MDX query results.

In some embodiments of the present invention, step 608 returns a set of tuples. A group is formed using all or a portion of the tuples in the set of tuples. Then a graphic based on the group is formed. Such embodiments are useful in instances where a multi-pane graphic is constructed. Examples of such graphics include a line that connects each tuple in a group or an area that encloses each tuple in the group.

In some embodiments, specification 550 organizes one or more panes 722 into a plurality of layers and each layer in the plurality of layers is assigned a tuple from a different database 558 that was characterized in step 602. In some embodiments, the specification 550 organizes one or more panes 722 into a plurality of columns and a plurality of rows and each column in the plurality of columns is assigned a tuple from a different database 558 that was characterized in step 602. In still other embodiments, the specification organizes the one or more panes into a plurality of columns and a plurality of rows and each row in the plurality of rows is assigned to a tuple from a different database 558 that was characterized in step 602. In still further embodiments, the specification organizes the one or more panes into a plurality of pages and each page in the plurality of pages is assigned to a tuple from a different database 558 that was characterized in step 602.

An overview of the steps performed in accordance with one embodiment of the present invention has been provided. The invention is highly advantageous because it takes advantage of the underlying hierarchy of one or more target database 558 in order to allow a user to more efficiently explore databases 558. A user can rapidly drill down hierarchical layers within each target database 558. For example, in one embodiment of the invention, the interface includes a "▼" icon (FIG. 7). When the user presses the "▼" icon, the user is presented with a listing of all the levels of the dimension (including diverging levels in complex dimensional hierarchies in the target databases). When a new level is selected, this is interpreted as a drill down (or roll up) operation along that dimension and the current level is automatically replaced with the selected level (with the same qualification). Thus, the present invention allows the user to rapidly move between different levels of detail along a dimension, refining the visual specification 550 as the user navigates. At each level, the present invention forms efficient database queries using the novel table algebra of the present invention. Another advantage of the present invention is that a subset of tuples associated with a pane in step 616 can be used as a visual specification 550 in a new iteration of steps 605 through 616. For example, the user can select one or more tuples in the subset of the tuples associated with the pane as a basis for a new specification. Then, steps 606 through 616 can be repeated using the new specification. Still another advantage of the present invention is that each specification 550 can be expressed in a form that can be stored for later usage. Storage of specifications 550 allow for services such as the bookmarking of favored specifications as well as support for specification "undo" and "redo". In a specification "undo", for example, the specification 550 that was used in a previous instance of step 604 is obtained and used to perform steps 606 through 616.

6.3 ILLUSTRATIVE TYPES OF DATABASE HIERARCHY AND DATABASE ORGANIZATION

The present invention provides visualization techniques for the exploration and analysis of multidimensional analytic data stored in databases 558. One form of databases 558 is a data warehouse. Data warehouses are typically structured as either relational databases or multidimensional data cubes. In this section, aspects of relational databases and multidimensional data cubes that are relevant to the present invention are described. For more information on relational databases and multidimensional data cubes, see Berson and Smith, 1997, Data Warehousing, Data Mining and OLAP, McGraw-Hill, New York; Freeze, 2000, Unlocking OLAP with Microsoft SQL Server and Excel 2000, IDG Books Worldwide, Inc., Foster City, Calif.; and Thomson, 1997, OLAP Solutions: Building Multidimensional Information Systems, Wiley Computer Publishing, New York. In addition, it will be appreciated that in some embodiments database 558 does not have a formal hierarchical structure. In such embodiments, hierarchical structure for the database is derived by analyzing the database using user interface module 544.

6.3.1 Data Organization

Databases have typically been used for operational purposes (OLTP), such as order entry, accounting and inventory control. More recently, corporations and scientific projects have been building databases, called data warehouses or large on line analytical processing (OLAP) databases, explicitly for the purposes of exploration and analysis. The "data warehouse" can be described as a subject-oriented, integrated, time-variant, nonvolatile collection of data in support of management decisions. The key aspect of the data warehouse is that it is a repository for analytic data rather than transactional or operational data. The data contained in the data warehouse usually represents historical data, e.g., transactions over time, about some key interest of the business or project. This data is typically collected from many different sources such as operational databases, simulations, data collection tools (e.g., tqdump), and other external sources.

Data warehouses are built using both relational databases and specialized multidimensional structures called data cubes. In this subsection, the organization of the data within these databases, such as the database schemas, the use of semantic hierarchies, and the structure of data cubes, is explained. In the next subsection, the difference between the organization of OLAP databases and OLTP databases is described.

6.3.2 Relational Databases

Relational databases organize data into tables where each row corresponds to a basic entity or fact and each column represents a property of that entity. For example, a table may represent transactions in a bank, where each row corresponds to a single transaction, and each transaction has multiple attributes, such as the transaction amount, the account balance, the bank branch, and the customer. The table is referred to as a relation, a row as a tuple, and a column as an attribute or field. The attributes within a relation can be partitioned into two types: dimensions and measures. Dimensions and measures are similar to independent and dependent variables in traditional analysis. For example, the bank branch and the customer would be dimensions, while the account balance would be a measure. A single relational database will often describe many heterogeneous but interrelated entities. For example, a database designed for a coffee chain might maintain information about employees, products, and sales. The database schema defines the relations (tables) in a database, the relationships between those relations, and how the relations model the entities of interest.

6.3.3 Hierarchical Structure

Figure 9:
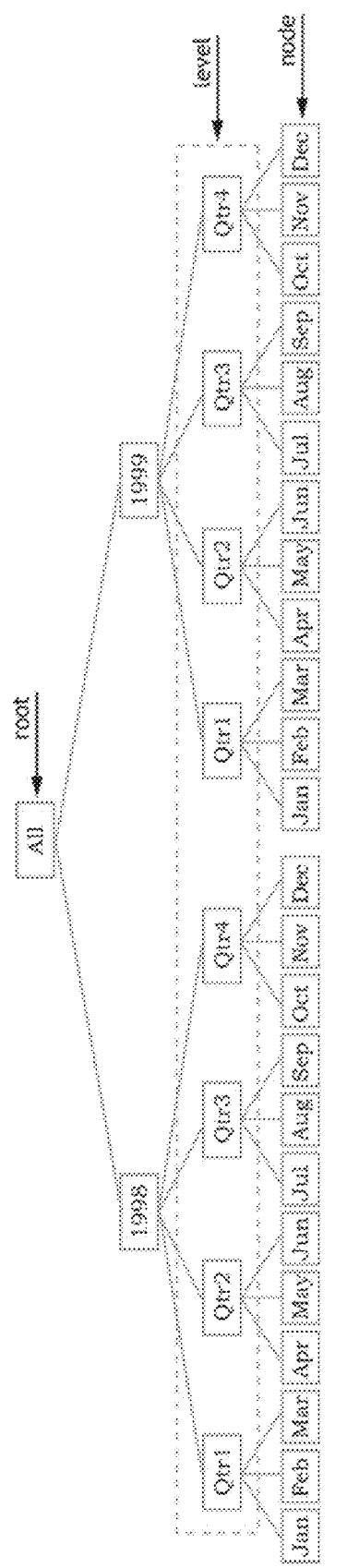
FIG. 9 illustrates a hierarchy for time.

Most dimensions in a database have a hierarchical structure. This hierarchical structure can be derived from the semantic levels of detail within the dimension or generated from classification algorithms. The systems and methods of the present invention use these hierarchies to provide tools that an analyst can use to explore and analyze data at multiple levels of detail calculated from the fact table. For example, rather than having a single dimension "state", a hierarchical dimension "location" that has three levels, one each for country, state, and county, can be used. Then, the analyst can aggregate the measures of interest to any of these levels. The aggregation levels are determined from the hierarchical dimension, which is structured as a tree with multiple levels. The highest level is the most aggregated and the lowest level is the least aggregated. Each level corresponds to a different semantic level of detail for that dimension. Within each level of the tree, there are many nodes, with each node corresponding to a value within the domain of that level of detail of that dimension. The tree forms a set of parent-child relationships between the domain values at each level of detail. These relationships are the basis for aggregation, drill down, and roll up operations within the dimension hierarchy. FIG. 9 illustrates the dimension hierarchy for a Time dimension. Simple hierarchies, like the one shown in FIG. 9, are commonly modeled using a star schema. The entire dimensional hierarchy is represented by a single dimension table. In this type of hierarchy, there is only one path of aggregation. However, there are more complex dimension hierarchies in which the aggregation path can branch. For example, a time dimension might aggregate from Day to both Week and Month. These complex hierarchies are typically represented using the snowflake schema, as described in Section 2, which uses multiple relations (tables) to represent the diverging hierarchies.

6.3.4 Data Cubes

A data warehouse can be constructed as a relational database using either a star or snowflake schema and will provide a conceptual model of a multidimensional data set. However, the typical analysis operations such as summaries and aggregations are not well supported by the relational model. The queries are difficult to write in languages such as SQL and the query performance is not ideal. As a result, typically, the fact tables and dimension tables are not used directly for analysis but rather as a basis from which to construct a multidimensional database called a data cube.

Each axis in the data cube corresponds to a dimension in the relational schema and consists of every possible value for that dimension. For example, an axis corresponding to states would have fifty values, one for each state. Each cell in the data cube corresponds to a unique combination of values for the dimensions. For example, if there are two dimensions, "State" and "Product", then there would be a cell for every unique combination of the two, e.g., one cell each for (California, Tea), (California, Coffee), (Florida, Tea), (Florida, Coffee), etc. Each cell contains one value per measure of the data cube. So if product production and consumption information is needed, then each cell would contain two values, one for the number of products of each type consumed in that state, and one for the number of products of each type produced in that state. FIG. 13 illustrates a data cube for a hypothetical nationwide coffee chain data warehouse. Each cell in the data cube summarizes all measures in the base fact table for the corresponding values in each dimension.

Dimensions within the data warehouse are often augmented with a hierarchical structure. The systems and methods of the present invention use these hierarchies to provide tools that can be used to explore and analyze the data cube at multiple meaningful levels of aggregation. Each cell in the data cube then corresponds to the measures of the base fact table aggregated to the proper level of detail. If each dimension has a hierarchical structure, then the data warehouse is not a single data cube but rather a lattice of data cubes, where each cube is defined by the combination of a level of detail for each dimension (FIG. 14). In FIG. 14, the hierarchical structure of each dimension (time, product, location) defines the lattice of cubes. Within the lattice, each cube is defined by the combination of a level of detail for each dimension. The cubes at the bottom of the lattice contain the most detailed information whereas the cubes at the top of the lattice are the most abstract.

6.3.5 OLAP Versus OLTP

The previous section described how both relational databases and data cubes could be organized and used for analytical purposes (OLAP). Traditionally, however, relational databases have been used for day-to-day operational purposes. These OLTP databases address different issues than OLAP databases or data warehouses and, as a result, have schemas and usage patterns that are quite different. It is necessary to understand the differences between these two types of databases in order to understand the issues affecting the design of OLAP visualization tools.

OLTP databases are optimized for performance when processing short transactions to either query or modify data, possibly interfacing with more than one system and supporting many simultaneous connections. Furthermore, query performance is typically secondary to issues like avoiding data redundancy and supporting updates. Typical OLTP queries retrieve a few dozen tuples from only a few relations and then update some of the tuples. For example, a typical query might retrieve a single customer's record based on their account number, or add a single transaction to a sales relation when a sale occurs. Database schema definitions for operational databases focus on maximizing concurrency and optimizing insert, update, and delete performance. As a result, the schema is often normalized, resulting in a database with many relations, each describing a distinct entity set.

In contrast, rather than being used to maintain updateable transaction data, users need to be able to interactively query and explore OLAP databases. The queries for OLAP are very different in that they typically retrieve thousands of rows of information and modify none of them. The queries are large, complex, ad hoc, and data-intensive. Because an operational schema separates the underlying data into many relations, executing these analytical queries on a database based on an operational schema would require many expensive join computations. Since analysis databases are typically read-only, and because query performance is the primary concern, OLAP databases sacrifice redundancy and update performance to accelerate queries, typically by denormalizing the database into a very small number of relations using a star or snowflake schema. External tools can typically view an OLAP database as either a data cube or a single large relation (table).

6.3.6 Multidimensional Analysis Operations

In some embodiments database 558 is typically quite large, consisting of many dimensions each with hierarchical structure and often many members. To navigate the resulting lattice of data cubes and perform dimensional reduction to extract data for analysis, there are a number of multidimensional analysis operations that are used. This section describes such operations.

Drill down refers to the process of navigating through the lattice of data cubes in the direction of more detail. It is the technique used to break one piece of information into smaller and more detailed parts. Roll up is the inverse of drill down, aggregating detailed data into coarser elements. Projection (illustrated in FIG. 15) reduces the dimensionality of an n-dimensional data cube to (n–1) by aggregating across a dimension. For example, in FIG. 15, the first projection summarizes across "Location", reducing the 3-dimensional cube to a 2-dimensional cube.

Where projection reduces dimensionality via aggregation, slicing (illustrated in FIG. 16) reduces dimensionality by filtering a dimension to a single value. In other words, one dimension is held constant to generate a slice across that dimension. In the example illustrated in FIG. 16, a 2-dimensional slice corresponding to data for "Qtr 2" has been taken from the "Time" dimension.

6.3.7 Data Characterization for Visualization

Having described how the OLA data used by some embodiments of the present invention is organized, additional data characterization used to support some visualization processes of the present invention is now discussed. For the purposes of visualization, more about an attribute than is usually captured by a database system is needed. Databases typically provide limited information about a field, such as its name, whether a field is a dimension or measure, and its type (e.g., time, integer, float, character).

In some embodiments of the present invention, a determination is made as to whether a database field (operand) is nominal, ordinal, or quantitative in order to determine how to encode the field in a visual table using visual properties. Representative visual properties include, but are not limited to, color, size, or position. This characterization is based on a simplification of Stevens' scales of measurement. See Stevens, On the theory of scales of measurement, In Science, (103), pp. 677-680. In some embodiments, this characterization is further simplified depending on if the context emphasizes tire difference between discrete data and continuous data or if the context emphasizes whether the field has an ordering. In one example, when encoding a field spatially, the emphasis is on whether a field has discrete values. Furthermore, when a field is assigned to an axis, it has an ordering. Thus, in this context, nominal fields that do not normally have an ordering are assigned one and then treated as an ordinal field in some embodiments of the present invention. The resulting characterization is called categorical. In contrast, when assigning visual properties such as color to a field, then the important distinguishing characterization is order. In this context, the ordinal and quantitative fields are treated as a single characterization and nominal fields are considered separately, in some embodiments of the present invention. In addition, attributes have associated units and semantic domains. For example, attributes can encode time, geographic units such as latitude, or physical measurements. If this information is available, it can also be used to generate more effective visual encodings and aid in determining the geometry (e.g., aspect ratio) of a visual table 720. For example, knowing that the x and y axis of a visual table 720 correspond to latitude and longitude, rather than profit and sales, will affect the determination of the appropriate geometry.

Databases also typically only store the current domain of a field—the values that currently exist within the database without any ordering. However, for analysis it is important to understand the actual domain of a field, such as the possible values and their inherent (if applicable) ordering. To encode an attribute as an axis of a visual table 720, all possible values and their ordering need to be determined so that an indication of when data is missing can be made and to present data within its semantic context rather than using some arbitrary ordering, e.g., alphabetic. In some embodiments, this additional data characterization is captured in an attributed file 580 (e.g., an XML document) that is associated with database 558 (FIG. 5).

6.4 ALGEBRA

As discussed above, a complete table configuration consists of three separate expressions. Two of the expressions define the configuration of the x- and y-axes of a visual table 720, partitioning the table into rows and columns. The third expression defines the z-axis of visual table 720, which partitions the display into layers of x-y tables that are composited on top of one another. This section sets forth an algebra, including its syntax and semantics, that is used in these three expressions in some embodiments of the present invention. As discussed above, each expression in the algebra used in some embodiments of the invention is composed of operands connected by operators. Operands and operators will be discussed in turn in the following sections.

6.4.1 Operands

The operands in the table algebra described in this section are the names of the fields (field operands) of the database 558 and the names of predefined constant sequences of p-tuples (constant operands). In some embodiments, the categorization of field types is reduced to ordinal and quantitative by assigning a default alphabetic ordering to all nominal fields and then treating them as ordinal. Thus, in such embodiments, there are three classes of operands: (1) ordinal field operands, (2) quantitative field operands, and (3) constant operands. Throughout the remainder of this section, the terms A and B represent ordinal field operands, P and Q represent quantitative field operands, C represents a constant operand, and X, Y, and Z represent expressions.

6.4.1.1 Set Interpretations

Set interpretations are assigned to each operand symbol in the following manner. Ordinal fields are assigned the members of the ordered domain of the field. Quantitative fields are assigned the single element set containing the field name. Constant operands are assigned their predefined set interpretation.

$$A = \text{domain}(A) = <(A:a), \ldots, (A:a_n)>$$

$$P = <(\text{field}:P)>$$

$$C = <(\text{constant}:c), \ldots, (\text{constant}:c_m)>$$

For simplicity of exposition, tags are not included in the remaining set interpretations within this section except where necessary.

The assignment of sets to field operands reflects the difference in how the two types of fields will be encoded in the structure of visual tables 720. Ordinal fields partition visual table 720 (and the database triples) into rows and columns, whereas quantitative fields are spatially encoded as axes within panes 722.

6.4.1.2 Constant Operands

Constant operands define neither selection criteria nor spatial encodings. Instead, they can be used to generate additional rows without partitioning database tuples. This facilitates the layering of heterogeneous databases. In some embodiments, constant operands are treated as ordinal field operands by defining a virtual fact table and then defining operators relative to this virtual fact table. Let $(C, \ldots, Cn)$ be a set of constant operands, Rc be a relation with a single attribute (Ci) whose domain corresponds to the predefined set interpretation of Ci, and FT be the fact table for database 558. The virtual fact table VFT is defined relative to the given set of constant operands as:

$$\text{VFT} = \text{FT} \times R_c, \ldots \times R_{ci}$$

This algebra contains one predefined constant operand, the empty sequence.

6.4.1.3 Filtering and Sorting of Field Operands

If a field is to be filtered (or sorted), the filtered and sorted domain is listed directly after the field operand in the expression, in effect specifying a set interpretation for the operand. Given an ordinal field A with domain $(A) = <(a), \ldots (an)>$, the operand can be filtered and sorted within an expression by stating the filtered and sorted domain $(<b, \ldots, bj>, bi > \varepsilon \text{ domain } (A))$ directly after the ordinal operand and the set interpretation is the listed domain:

$$A[b, \ldots, b_j] = <(b), \ldots, (b_j)>$$

Similarly, a filtered domain can be specified for a quantitative field by listing the minimum and maximum values of the desired domain. This information is included in the generated set interpretation:

$$P[\min,\max] = <(\text{field}:P[\min,\max])>$$

Having defined the operands and the generation of their set interpretations, the four operators in the algebra of the present invention can be defined.

6.4.2 Operators

As stated above, a valid expression in the algebra is an ordered sequence of one or more operands with operators between each pair of adjacent operands. The operators in this algebra, in order of precedence, are dot (.), cross (x), nest (/), and concatenation (+). Parentheses can be used to alter precedence. Because each operand is interpreted as a sequence, the precise semantics of each operator is defined in tams of how it combines two sequences (one each from the left and right operands) into a single sequence. Definitions of the dot, cross, nest and concatenation operators are provided below. The exact definitions provides below are merely exemplary and other definitions that are consistent with the features of each operator are within the scope of the present invention.

6.4.2.1 Concatenation

The concatenation operator performs an ordered union of the set interpretations of the two operands and can be applied to any two operands or expressions:

$$A + B = \langle (a), \ldots, (a_n) \rangle U \langle (b), \ldots, (b_m) \rangle$$
$$= \langle (a), \ldots, (a_n)(b), \ldots, (b_m) \rangle$$

$$P + Q = \langle (P) \rangle U \langle (Q) \rangle$$
$$= \langle (P), (Q) \rangle$$

$$A + P = \langle (a), \ldots, (a_n) \rangle U \langle (P) \rangle$$
$$= \langle (a), \ldots, (a_n), (P) \rangle$$

$$P + A = \langle (P) \rangle > U \langle (a), \ldots, (a_n) \rangle$$
$$= \langle (P), (a), \ldots, (a_n) \rangle$$

$$X + Y = \langle (x, \ldots, x_i), \ldots, (x_j, \ldots, x_{ik}) \rangle$$
$$U \langle (y, \ldots, y_m), \ldots, (y_n, \ldots, y_{no}) \rangle$$
$$= \langle (x, \ldots, x_i), \ldots, (x_j, \ldots, x_{ik}), (y, \ldots, y_m), \ldots, (y_n, \ldots, y_{no}) \rangle$$

The only algebraic property that holds for the concatenation operator is associatively:

$$(X + Y) + Z = (\langle (x, \ldots, x_i), \ldots, (x_j, \ldots, x_{ik}) \rangle$$
$$U \langle (y, \ldots, y_m), \ldots, (y_n, \ldots, y_{no}) \rangle)$$
$$U \langle (x, \ldots, z_p), \ldots, (z_q, \ldots, x_{gr}) \rangle$$
$$= \langle (x, \ldots, x_i), \ldots, (x_j, \ldots, x_{ik}) \rangle$$
$$U (\langle (y, \ldots, y_m), \ldots, (y_n, \ldots, y_{no}) \rangle$$
$$U \langle (z, \ldots, z_p), \ldots, (z_p, \ldots, x_{qr}) \rangle)$$
$$= X + (Y + Z)$$

The concatenation operator is not commutative because the ordered union of two sequences is not commutative.

6.4.2.2 Cross

The cross operator performs a Cartesian product of the sets of the two symbols:

$$A + B = \langle (a), \ldots, (a_n) \rangle x \langle (b), \ldots, (b_m) \rangle$$
$$= \langle (a, b), \ldots, (a, b_m), \ldots, (a_n, b), \ldots, (a_n, b_m) \rangle$$

$$A + P = \langle (a), \ldots, (a_n) \rangle x \langle (P) \rangle$$
$$= \langle (a, P), \ldots, (a_n, P) \rangle$$

$$X + Y = \langle (x, \ldots, x_i), \ldots, (x_j, \ldots, x_{ik}) \rangle$$
$$x \langle (y, \ldots, y_m), \ldots, (y_n, \ldots, y_{no}) \rangle$$
$$= \langle (x, \ldots, x_i, y, \ldots, y_m), \ldots, (x_j, \ldots, x_{ik}, y_m, \ldots, y_m) \rangle$$
$$\ldots$$
$$(x_j, \ldots, x_{ik}, y, \ldots, y_m), \ldots, (x_j, \ldots, x_i y_n, \ldots, y_{no}) \rangle$$

Quantitative fields and expressions may appear only as right-hand side operands when the cross operator is applied. The cross operator is also associative but not commutative (because the ordered Cartesian product is not commutative):

$$(X + Y) + Z = (\langle (x, \ldots, x_i), \ldots, (x_j, \ldots, x_{ik}) \rangle x \langle (y, \ldots, y_m), \ldots,$$
$$(y_n, \ldots, y_{no}) \rangle) x$$
$$\langle (x, \ldots, z_p), \ldots, (z_q, \ldots, x_{qr}) \rangle$$
$$= \langle (x, \ldots, x_i), \ldots, (x_j, \ldots, x_{ik}) \rangle x$$
$$(\langle (y, \ldots, y_m), \ldots, (y_n, \ldots, y_{no}) \rangle x$$
$$(\langle z, \ldots, z_p), \ldots, (z_p, \ldots, x_{qr}) \rangle)$$

6.4.2.3 Nest

The nest operator is similar to the cross operator, but it only creates set entries for which there exist database tuples with the same domain values. If VFT is defined to be the virtual fact table of the database being analyzed relative to all constant operands in the expressions X and Y, t to be a tuple, and t(X ... Xa) to be the values of the fields X through X, for the tuple 1, then the nest operator can be defined as follows:

$$A / B = \langle a, b \rangle \mid \exists\, t\varepsilon VFT\ st$$
$$= ((a)\varepsilon A)\ \&(t(A) = a)\ \&((b)\varepsilon B)\ \&(t(B) = b) \rangle$$

$$X / A = \langle (x, \ldots, x_n, a) \mid \exists\, t\varepsilon VFT\, st$$
$$= ((x, \ldots, x_n)\varepsilon X)\ \&(t(X, \ldots, X_n) = (x, \ldots, x_n))\ \&$$
$$= ((a)\varepsilon A)\ \&(t(A) = a)) \rangle$$

$$A / Y = \langle (a, y, \ldots y_m) \mid \exists\, t\varepsilon VFT\, st$$
$$= ((a)\varepsilon A)\ \&(t(A) = (a))\ \&$$
$$= ((y, \ldots, y_m)\varepsilon Y)\ \&(t(Y, \ldots, Y_m) = (y, \ldots, y_m)) \rangle$$

$$X / Y = \langle (x, \ldots, x_n, y, \ldots, y_m) \mid \exists\, t\varepsilon VFT\, st$$
$$= ((x, \ldots, x_n)\varepsilon X)\ \&(t(X, \ldots, X_n) = (x, \ldots, x_n))\ \&$$
$$= ((y, \ldots, y_m)\varepsilon Y)\ \&(t(Y, \ldots, Y_m) = (y, \ldots, y_m)) \rangle$$

The ordering of the p-tuples in a sequence generated by application of the nest operator is the same as it would be in the sequence generated by the application of the cross operator to the same operands.

The intuitive interpretation of the nest operator is "B within A". For example, given the fields Quarter and Month, the expression Quarter/Month would be interpreted as those months within each quarter, resulting in three entries for each quarter (assuming data exists for all months in the fact table). In contrast Quarter×Month would result in 12 entries for each quarter. The nest operator may only be applied to ordinal operands and expressions. Nest is an associative operator.

6.4.2.4 Dot

The cross and nest operators provide tools for generating ad hoc categorical hierarchies. However, data warehouses often contain dimensions with explicit semantic hierarchies. The dot operator provides a mechanism for exploiting these hierarchical structures in the algebra of the present invention. The dot operator is similar to the nest operator but is "hierarchy-aware".

If DT is defined to be a relational dimension table defining a hierarchy that contains the levels A and B, and A precedes B in the schema of DT, then:

$$A \cdot B = \langle (a,b) / \exists t \in DT s t t(A) = a \& t(8) = b \rangle$$

Similarly, dot can be defined relative to an expression X involving only the dot operator and levels from the same dimension hierarchy. DT is defined to be the relational dimension table defining the dimension that contains all levels in X and the dimension level A. In addition, all levels in X must appear in the schema of DT in the order they appear in X and they must precede A in the schema of DT. Then:

$$X \cdot A = \langle (x, \ldots, x_n, a) / \exists t \in DT s t t(X, \ldots, x_n) = (x, \ldots, x_n) \& t(A) = a \rangle$$

The dot operator is also associative but not commutative.

Nest could be used for drilling down into a hierarchy but this usage would be flawed. The nest operator is unaware of any defined hierarchical relationship between the dimension levels; instead, it derives a relationship based on the tuples in the fact table. Not only is this approach inefficient, as fact tables are often quite large, but it can also yield incorrect results. For example, consider the situation where no data was logged for November. Application of the nest operator to Quarter and Month would result in an incorrectly derived hierarchy that did not include November as a child of Quarter 4.

The dot operator provides a particularly advantageous method for working with database 558 hierarchy. This is because the dot operator uses the hierarchical information that is either (i) defined in database 558 dimension tables or (ii), in instances where database 558 does not have dimension tables, is constructed by database hierarchy module 544 (with possible user intervention). In contrast, the nest operator is unaware of the defined hierarchical relationship between dimension levels and/or the hierarchy that is constructed by database hierarchy module 542. Instead, the nest operator works by deriving hierarchical type relationships within the database based on existence scans of tuples in database 558 fact tables. This is an inefficient way of deriving hierarchical information because the fact tables can be quite large. Advantageously, the dot operator does not derive hierarchical type relationships within the database based on existence scans. Rather, the dot operator uses the metadata associated with the database 558 that defines the database hierarchy. The form of this metadata will be dependent upon the exact nature of databases 558. In some instances the metadata will comprise, for example a star schema. In instances where the database 558 does not have such defined hierarchical relationships (for example in the case where database 558 is a flat file) the metadata will be constructed by database hierarchy module.

6.4.2.5 Summary

Using the above set semantics for each operator, every expression in the algebra can be reduced to a single set with each entry in the set being an ordered p-tuple. We call this set evaluation of an expression the normalized set form. The normalized set form of an expression determines one axis of the table: the table axis is partitioned into columns (or rows or layers) so that there is a one-to-one correspondence between set entries in the normalized set and columns: FIG. 8 illustrates the axis configurations resulting from several expressions.

6.4.3 Algebraic Properties

In the present invention, an algebraic expression is interpreted as a set for two purposes (i) to determine the underlying tabular structure of a visual table 720 and (ii) to determine the tuples to be retrieved from database 558. In the former case, the ordering of the p-tuples in the normalized set form is meaningful because it determines the ordering of the columns, rows, and layers of visual table 720. As a result, the only algebraic property that holds for our operators is associativity. Commutative or distributive operators would allow algebraic manipulations that change the ordering of the normalized set form. However, when performing interpretation to determine which database tuples to retrieve, these constraints on the properties of the operators can be relaxed since the ordering of the p-tuples in the set interpretation is not meaningful in the context of database queries. Specifically, for this purpose only, the set interpretations are treated as bags instead of sequences (thus discarding ordering) and allow the following algebraic properties:

Associative $$(A+B)+C = A+(B+C)$$

$$(A \cdot B) \cdot C = A \cdot (B \cdot C)$$

$$(A \times B) \times C = A \times (B \times C)$$

$$(A/B)/C = A/(B/C)$$

Distributive $$A \times (B+C)(A \times B)+(A \times C)$$

$$A/(B+C) = (A/B)+(A/C)$$

Commutative $$A+B = B+A$$

$$A \times B = B \times A$$

$$A/B = B/A$$

If the operators are changed to allow these algebraic properties, they can be used to quickly determine the database queries or data cube projections required to generate a visual table 720.

6.4.4 Syntax Revisited

In the previous sections, the syntax of an algebra in accordance with the present invention was defined as a sequence of operands separated by operators. Some constraints on the applications of the operators were also provided. In this section, the syntax is made precise by using a grammar. To define a grammar, four things are defined: a set of terminal symbols, a set of non-terminals, a set of production rules, and a start symbol. As such, the grammar in accordance with the present invention has ten terminal symbols:

| Symbol | Definition |
| --- | --- |
| $q_{field}$ | The name of a quantitative field |
| $O_{field}$ | The name of an ordinal field |
| $q_{dim}$ | The name of a quantitative dimensional level |
| $O_{dim}$ | The name of an ordinal dimensional level |

-continued

| Symbol | Definition |
|---|---|
| C | A constant operand |
| .x/+ | The operators of the algebra |
| ( ) | Parentheses |

The following are the production rules for the grammar (E is the start symbol):

$$E \rightarrow O_{expr}/Q_{expr}$$

$$O_{expr} \rightarrow (O_{expr})/Q_{expr} + Q_{expr}/O_{expr} \times O_{expr}/O_{expr}/O_{expr}/O$$

$$Q_{expr} \rightarrow (O_{expr})/E + Q_{expr}/O_{expr} + E/(O_{expr} \times O_{expr}/Q$$

$$O \rightarrow Q_{hter}/O_{field}/c$$

$$O_{hter} \rightarrow Q_{hter} \cdot O_{dim}/O_{dim}$$

$$Q \rightarrow Q_{hter}/O_{field}$$

$$Q_{hter} \rightarrow Q_{hter} \cdot q_{dim}/q_{dim}$$

The following are the main syntactic constraints on the operators that are expressed in this grammar:

Cross: Quantitative operands, or expressions containing quantitative operands, can only be right-hand side operands of the cross operator.

Nest: The nest operator can only be applied to ordinal operands or expressions.

Dot: The dot operator can only be applied to dimension levels. Furthermore, a quantitative field can only appear as the right-most operand of a dot operator, since quantitative dimension levels are only possible as the leaf level of a dimension hierarchy.

Concatenate: Concatenate can be applied to any operand.

Thus far, how the algebraic expressions partition tables into rows and columns has been discussed. How the algebraic expressions handle layers will now be discussed.

6.4.5 Layers

In the present invention a layer in a visual table 720 is a single x-y table whose structure is defined by the x- and y-axes expressions. Every layer in a specification is composited together back-to-front to form the final visualization. A single visualization can combine multiple data sources. Each data source is mapped to a distinct layer or set of layers. While all data sources and layers share the same configuration for x- and y-axes of the table, each data source can have a different expression (the z-axis) for partitioning its data into layers. Layering of multiple data sources and the partitioning of layers are illustrated in FIG. 17. In some embodiments of the present invention, each data source in a visualization is mapped to a distinct layer. The layers for a data source can be partitioned into additional layers by the z-axis expression for that data source. All the layers in a specification are composited together back-to-front to form the final visualization.

Constant operands are an important aspect of layering. A single visualization may be composed of multiple heterogeneous databases 558, each mapped to a distinct layer, and all layers must share the same expressions for the x- and y-axes. However, sometimes it is desirable to include ordinal fields in the x- and y-axes expressions that exist in only a subset of the visualized databases. When this occurs, constant operands are generated for the other layers with a predefined set interpretation that matches the domain of the ordinal field in the layer in which the field does appear. Thus, the expressions can be properly evaluated for each layer.

The z-axis expression for a data source is more constrained than the expressions for the x and y-axes. Specifically, since layering must be discrete, a z-axis expression can contain only ordinal operands; not quantitative operands. In other words, a z-axis expression is constrained to the $O_{expr}$ production rule in the grammar of the present invention.

6.4.6 Summary

The algebra of the present invention provides a succinct yet powerful notation for describing the underlying structure of visual tables 720. The algebraic expressions define how the table is partitioned into rows, columns, and layers, and additionally defines the spatial encodings within each pane 722 of the table.

At this point, it is useful to consider the conceptual data flow. As well as defining visual table 720's structure, the algebraic expressions of the visual specification (formed on shelves 708-1, 708-4, and 708-5) define which tuples of the database 558 should be selected and mapped into each pane 722. When a specification is interpreted, one or more queries are generated to retrieve topics from the database (FIG. 6, step 608; FIG. 18, step 1802). The resulting tuples are partitioned into layers and panes (FIG. 18, step 1804). Then, tuples within each pane are grouped, sorted and aggregated (FIG. 18, step 1806). Once the tuples have been sorted into panes 722, they are then mapped to graphic marks to generate a perceivable display (FIG. 18, step 1808).

6.5 EXEMPLARY VISUAL SPECIFICATION

To understand the advantages of the dot operator, the problems that dimension levels create will be explained. Consider the Month dimensional level in the time hierarchy illustrated in FIG. 9. One possible way to evaluate the Month dimensional level would be to list each node value, including its path to the root for uniqueness, ordered by depth first traversal of the dimension hierarchy; e.g., [1998.Qtr1.Jan, . . . , 1999.Qtr4, Dec}. Although this approach provides a unique set interpretation for each dimensional level, it limits the expressiveness of the algebra. Any visual table 720 constructed to include Month must also include Year. It is not possible to create displays that summarize monthly values across years, a useful view that should be supported in a robust system. Interestingly, however, summarizing monthly values across years is not a standard projection of a hierarchical database, such as a datacube, as it requires aggregating across a hierarchical level.

The solution to the problem of how to reduce a dimensional level to a single set is the dot (".") operator. If DT is defined to be the dimensional table defining the hierarchy that contains the levels A and B, and A precedes B in the schema of DT, then:

$$A \cdot B = \{(a \cdot b) / \exists r \in DrstA(r) = a \& B(r) = b\}$$

where r is a record and A(r) is the value of operand A for record r. Thus, the dot produces a set of single-valued tuples, each containing a qualified value. If the two operands are not levels of the same dimension hierarchy (or set interpretations of operations on levels of the same hierarchy), or A does not precede B in the schema of DT (e.g., A must be an ancestor level in the tree defined by DT), then the dot operator evaluates to the empty set. With this definition, the two expressions "Month" and "Year.Month" are not equivalent "Month" is interpreted as (Jan, Feb, . . . , Dec) whereas "Year.Month" is interpreted as (1998.Jan, 1998.Feb, . . . , 1999.Dec). With a fully populated fact table, Year.Month is equivalent to Year/Month (where "r is the nest operator' defined in Section 5.4).

6.6 EXAMPLES

Each of the following examples demonstrates how database analysis can progress from a high level of abstraction to detailed views of the data. Furthermore, each example shows the importance of being able to easily change the data being viewed, pivot dimensions, and drill down database hierarchy during the analysis process.

6.6.1 Example 1—Mobile Network Usage

FIG. 19 shows an analysis of a 12-week trace of every packet that entered or exited the mobile network in the Gates building at Stanford University. For more information on this trace, see Tang and Baker, "Analysis of a Local-Area Wireless Network", Proc. of the International Conference on Mobile Computing and Networking, August 2000, pp. 1-10. Over the 12 weeks, 78 million packet headers were collected. The analysis goal is to understand usage patterns of the mobile network. This data is stored in a data cube with many different dimensions (User, Time, Remote host, Traffic direction, and Application), each with multiple levels of detail. In this analysis, the queries generated when the user dropped a field on a shelf took one to two seconds to execute and returned several hundred to tens of thousands of tuples.

To start the analysis, the analyst first sees if any patterns in time can be spotted by creating a series of line charts in FIG. 19A showing packet count and size versus time for the most common applications, broken down and colored by the direction of the traffic. In these charts, the analyst can see that the web is the most consistently used application, while session is almost as consistent. File transfer is the least consistent, but also has some of the highest peaks in both incoming and outgoing ftp traffic. Note the log scale on the y-axes.

Given this broad understanding of traffic patterns, the next question posed by the analyst is how the application mix varies depending on the research area. The analyst pivots the display to generate a single line chart of packet count per research area over time, broken down and colored by application class (FIG. 19B, where curve 1902 is web, curve 1904 is session, and curve 1906 is ftp). From this breakdown, the analyst can see that the graphics group was responsible for the large incoming and outgoing file transfers and that the systems group had atypically high session traffic.

Curious, the analyst then drills down further to see the individual project groups (FIG. 19C), discovering that the large file transfers were due to the rendering group within the graphics lab, while the robotics lab had vastly different behavior depending on the particular group (the mob group dominated by session traffic, while the learning group had more web traffic, for example).

6.6.2 Example 2—Year 2000 Presidential Election Results

FIG. 20 shows the systems and methods of the present invention being used to explore and analyze the results of the 2000 presidential election. This data is particularly interesting because the visualizations used to explore it are created from two separate data sets. The first data set is a relational database of approximately 500,000 tuples (stored in Microsoft's SQLServer) describing detailed polygonal outlines of the states and counties in the USA. Additional levels of detail have been constructed by polygon simplification, and the resulting levels of detail form a Location hierarchy. The second data set is stored as a data cube (in Microsoft's Analysis Server) and contains detailed county-by-county vote results (also with a Location dimension). In the first two visualizations (FIGS. 20A and 20B), these data sets are explicitly joined prior to analysis. In the final visualization (FIG. 20C) the ability of the present invention to visually join data sets using layers is relied upon. In this analysis, the execution time for the queries varied from less than one second for the overview visualizations to two seconds for the detailed visualizations, where the retrieved relation included tens of thousands of tuples.

In FIG. 20A, the analyst has generated an overview of the entire country at the State level in the Location hierarchy, coloring each state by which candidate won that state. The analyst is interested in more detailed results for the state of Florida, so the analysis filters on the Latitude and Longitude measures to focus on Florida and changes the level of detail to County, generating FIG. 20B. In the final visualization, shown in FIG. 20C, the analyst further focuses on the southern tip of Florida (by again filtering the Latitude and Longitude measures). Furthermore, the analysis adds two additional layers to the visualization (read directly from the data cube) and displays both the name and the total number of votes counted in each county.

6.6.3 Example 3—Historical Profit/Sales for a Coffee Chain

The example is illustrated in FIG. 21. The data being analyzed is two years of business metrics for a hypothetical nationwide coffee chain, comprising approximately 5,000 tuples stored in a data cube. The data is characterized by three main dimensions (Time, Products, and Location), each with multiple levels of detail. We consider a scenario where the analyst is concerned with reducing marketing expenses and is trying to identify products that are not generating profit and sales proportional to their marketing costs. The typical query time for the visualizations created in this scenario was between 0.1 and 0.2 seconds.

The first visualization created, FIG. 21A, is an overview of three key measures (Profit, Sales, and Marketing) as a scatterplot matrix. The analyst has drilled down using the Level of Detail shelf to the Product and State level. The two circle charts circled that several of the distributions do not reflect the positive correlations that the analyst was expecting. To further investigate, the analyst reduces the scatterplot matrix to two graphs and colors the records by Market and Producttype (FIG. 21B), thus identifying espresso products in the East region and tea products in the West region (circled in FIG. 21B) as having the worst marketing cost to profit ratios.

In the final visualization, FIG. 21C, the analyst drills down into the data to get a more detailed understanding of the correlations by creating a small multiple set of stacked bar charts, one for each Market and Producttype. Within each chart, the data is further drilled down by individual Product and State. Finally, each bar is colored by the Marketing cost. As can be seen in the visualization, several products such as "Calle Mocha" in the East have negative profit (a descending bar) with high marketing cost. Having identified such poorly performing products, the analyst can modify the marketing costs allocated to them.

6.7 REFERENCES CITED

All references cited herein are incorporated herein by reference in their 'entirety and for all purposes to the same extent as if each individual publication or patent or patent application was specifically and individually indicated to be incorporated by reference in its entirety for all purposes.

6.8 ALTERNATIVE EMBODIMENTS

The present invention can be implemented as a computer program product that comprises a computer program mechanism embedded in a computer readable storage medium. For instance, the computer program product could contain the program modules shown in FIG. 5. These program modules may be stored on a CD-ROM, magnetic disk storage product, or any other computer readable data or program storage product. The software modules in the computer program product can also be distributed electronically, via the Internet or otherwise, by transmission of a computer data signal (in which the software modules are embedded) on a carrier wave.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

What is claimed is:

1. A method of generating a plurality of data visualizations, the method comprising:
at a computer having a display, one or more processors, and memory storing one or more programs configured for execution by the one or more processors:
displaying a graphical user interface on the display, wherein the graphical user interface includes:
a schema information region with a plurality of fields from a multidimensional database that includes at least one data hierarchy; and
a data visualization region with a plurality of shelves;
receiving user actions to: (i) associate a first field of the plurality of fields with a first shelf of the plurality of shelves; (ii) associate a second field of the plurality of fields with a second shelf of the plurality of shelves; and (iii) associate a third field of the plurality of fields with one of the plurality of shelves;
determining a number of unique values for the third field; and
generating the determined number of data visualizations in distinct panes in the data visualization region in accordance with the received user actions, each pane: (i) corresponding to a respective unique value of the third field, and including a respective plurality of data marks, wherein:
each data mark corresponds to a respective retrieved tuple of data from the multidimensional database, and each retrieved tuple includes the first, second, and third fields;
each of the data marks has an x-position defined according to data for the first field in the respective tuple;
each of the data marks has a y-position defined according to data for the second field in the respective tuple; and
each of the data marks is assigned to a respective pane according to data for the third field in the respective tuple.

2. The method of claim 1, wherein the third field is an ordinal field and the unique values of the third field are discrete ordinal values.

3. The method of claim 1, further comprising receiving an additional user action to associate a fourth field with a fourth shelf that specifies data mark encoding;
wherein generating the plurality of data visualizations includes displaying the data marks according to values of the fourth field.

4. The method of claim 3, wherein:
each retrieved tuple includes the first, second, third, and fourth fields;
the fourth shelf specifies color encoding of data marks; and
each data mark is displayed with a color corresponding to a value of the fourth field.

5. The method of claim 3, wherein:
each retrieved tuple includes the first, second, third, and fourth fields;
the fourth shelf specifies size encoding of data marks; and
each data mark is displayed with a size corresponding to a value of the fourth field.

6. The method of claim 3, wherein:
each retrieved tuple includes the first, second, third, and fourth fields;
the fourth shelf specifies label encoding of data marks; and
each data mark is displayed with an adjacent label corresponding to a value of the fourth field.

7. The method of claim 1, wherein generating the plurality of data visualizations comprises horizontally arranging the plurality of data visualizations in the data visualization region.

8. The method of claim 1, wherein generating the plurality of data visualizations comprises vertically arranging the plurality of data visualizations in the data visualization region.

9. The method of claim 1, wherein:
the data visualization region includes a plurality of superimposed pages in which only one of the pages is visible at a time; and
each of the pages displays a unique one of the panes.

10. A computer system for generating data visualizations, comprising:
a display;
one or more processors;
memory; and
one or more programs stored in the memory and configured for execution by the one or more processors, the one or more programs comprising instructions for:
displaying a graphical user interface on the display, wherein the graphical user interface includes:
a schema information region with a plurality of fields from a multidimensional database that includes at least one data hierarchy; and
a data visualization region with a plurality of shelves;
receiving user actions to: (i) associate a first field of the plurality of fields with a first shelf of the plurality of shelves; (ii) associate a second field of the plurality of fields with a second shelf of the plurality of shelves;

and (iii) associate a third field of the plurality of fields with one of the plurality of shelves; and determining a number of unique values for third field; and generating the determined number of data visualizations in distinct panes in the data visualization region in accordance with the received user actions, each pane: (i) corresponding to a respective unique value of the third field, and (ii) including a respective plurality of data marks, wherein:

each data mark corresponds to a respective retrieved tuple of data from the multidimensional database, and each retrieved tuple includes the first, second, and third fields;

each of the data marks has an x-position defined according to data for the first field in the respective tuple;

each of the data r arks has a y-position defined according to data for the second field in the respective topic; and each of the data marks is assigned to a respective pane according to data for the third field in the respective tuple.

11. The computer system of claim 10, wherein the third field is an ordinal field and the unique values of the third field are discrete ordinal values.

12. The computer system of claim 10, further comprising instructions for receiving an additional user action to associate a fourth field with a fourth shelf that specifies data mark encoding;

wherein generating the plurality of data visualizations includes displaying the data marks according to values of the fourth field.

13. The computer system of claim 12, wherein:
each retrieved tuple includes the first, second, third, and fourth fields;
the fourth shelf specifies color encoding of data marks; and
each data mark is displayed with a color corresponding to a value of the fourth field.

14. The computer system of claim 12, wherein:
each retrieved tuple includes the first, second, third, and fourth fields;
the fourth shelf specifies size encoding of data marks; and
each data mark is displayed with a size corresponding to a value of the fourth field.

15. The computer system of claim 12, wherein:
each retrieved tuple includes the first, second, third, and fourth fields;
the fourth shelf specifies label encoding of data marks; and
each data mark is displayed with an adjacent label corresponding to a value of the fourth field.

16. The computer system of claim 10, wherein generating the plurality of data visualizations comprises horizontally arranging the plurality of data visualizations in the data visualization region.

17. The computer system of claim 10, wherein generating the plurality of data visualizations comprises vertically arranging the plurality of data visualizations in the data visualization region.

18. The computer system of claim 10, wherein:
the data visualization region includes a plurality of superimposed pages in which only one of the pages is visible at a time; and
each of the pages displays a unique one of the panes.

19. A non-transitory computer-readable storage medium storing one or more programs configured for execution by a computer system having a display, one or more processors, and memory, the one or more programs comprising instructions for:

displaying a graphical user interface on the display, wherein the graphical user interface includes:
a schema information region with a plurality of fields from a multidimensional database that includes at least one data hierarchy; and
a data visualization region with a plurality of shelves;
receiving user actions to: (i) associate a first field of the plurality of fields with a first shelf of the plurality of shelves; (ii) associate a second field of the plurality of fields with a second shelf of the plurality of shelves; and (iii) associate a third field of the plurality of fields with one of the plurality of shelves; and
determining a number of unique values for the third field; and
generating the determined number of data visualizations in distinct panes in the data visualization region in accordance with the received user actions, each pane: (i) corresponding to a respective unique value of the third field, and (ii) including a respective plurality of data marks, wherein:
each data mark corresponds to a respective retrieved tuple of data from the multidimensional database, and each retrieved topic includes the first, second, and third fields;
each of the data marks has an x-position defined according to data for the first field in the respective tuple;
each of the data marks has a y-position defined according to data for the second field in the respective tuple; and
each of the data marks is assigned to a respective pane according to data for the third field in the respective tuple.

20. The non-transitory computer-readable storage medium of claim 19, wherein the third field is an ordinal field and the unique values of the third field are discrete ordinal values.

* * * * *